US010350492B2

(12) United States Patent
Beppu et al.

(10) Patent No.: US 10,350,492 B2
(45) Date of Patent: Jul. 16, 2019

(54) SERVER, INFORMATION PROCESSING SYSTEM, STORAGE MEDIUM STORING INFORMATION PROCESSING PROGRAM, AND INFORMATION PROCESSING METHOD

(71) Applicant: NINTENDO CO., LTD., Kyoto (JP)

(72) Inventors: Yusuke Beppu, Kyoto (JP); Yutaka Takehisa, Kyoto (JP); Shinobu Fukumoto, Kyoto (JP); Kiyoshi Mizuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 22 days.

(21) Appl. No.: 15/879,892

(22) Filed: Jan. 25, 2018

(65) Prior Publication Data

US 2018/0147487 A1    May 31, 2018

Related U.S. Application Data

(63) Continuation of application No. PCT/JP2015/080253, filed on Oct. 27, 2015.

(51) Int. Cl.
*A63F 13/352*    (2014.01)
*A63F 13/79*    (2014.01)
(Continued)

(52) U.S. Cl.
CPC .......... *A63F 13/352* (2014.09); *A63F 13/323* (2014.09); *A63F 13/77* (2014.09);
(Continued)

(58) Field of Classification Search
CPC ...... A63F 13/352; A63F 13/323; A63F 13/77; A63F 13/79; A63F 13/792; A63F 13/795; A63F 13/335; A63F 2300/513
(Continued)

(56) References Cited

U.S. PATENT DOCUMENTS 7,445,551 B1 *    11/2008    Okada ..................... A63F 13/00
                                                    463/43
8,911,295 B2 *    12/2014    Mahajan ................. G06F 9/465
                                                    463/42
(Continued)

FOREIGN PATENT DOCUMENTS

JP    2002-157190    5/2002
JP    2002-355444    12/2002
(Continued)

OTHER PUBLICATIONS

Beppu et al., U.S. Appl. No. 15/879,984, filed Jan. 25, 2018 (202 pages).
(Continued)

*Primary Examiner* — Allen Chan
(74) *Attorney, Agent, or Firm* — Nixon & Vanderhye PC

(57) ABSTRACT

An exemplary server communicates with a first information processing device and communicates with a second information processing device. The server stores at least shared game data representing game content that can be used in a first game application that is compatible with the first information processing device and that can be used in a second game application that is compatible with the second information processing device. The server obtains game data generated by executing the first game application on the first information processing device and updates the shared game data based on the obtained game data. The server transmits at least a part of the shared game data updated based on the game data generated by executing the first game application to the second information processing device for being used by the second game application.

16 Claims, 28 Drawing Sheets

(51) Int. Cl.
   *A63F 13/795* (2014.01)
   *A63F 13/792* (2014.01)
   *A63F 13/77* (2014.01)
   *A63F 13/323* (2014.01)
   *A63F 13/335* (2014.01)

(52) U.S. Cl.
   CPC ............ *A63F 13/79* (2014.09); *A63F 13/792* (2014.09); *A63F 13/795* (2014.09); *A63F 13/335* (2014.09); *A63F 2300/513* (2013.01)

(58) Field of Classification Search
   USPC .......................................................... 463/42
   See application file for complete search history.

(56) References Cited

U.S. PATENT DOCUMENTS

| | | | |
|---|---|---|---|
| 2002/0062316 | A1 | 5/2002 | Maehiro |
| 2002/0143867 | A1 | 10/2002 | Horikawa |
| 2006/0094512 | A1* | 5/2006 | Yoshino ................ A63F 13/00 463/47 |
| 2009/0325690 | A1* | 12/2009 | Zhou ..................... A63F 13/12 463/29 |
| 2010/0248823 | A1* | 9/2010 | Smith .................... A63F 13/12 463/29 |
| 2011/0307884 | A1 | 12/2011 | Wabe et al. |
| 2012/0066334 | A1 | 3/2012 | Morimura et al. |
| 2012/0094757 | A1 | 4/2012 | Vago et al. |
| 2013/0143666 | A1* | 6/2013 | Osako .................... A63F 13/34 463/42 |
| 2013/0215144 | A1 | 8/2013 | Anzai et al. |
| 2013/0325999 | A1 | 12/2013 | Mizuki et al. |
| 2014/0100038 | A1 | 4/2014 | Krogh |
| 2014/0364211 | A1 | 12/2014 | Masuda |
| 2015/0051001 | A1 | 2/2015 | Linden et al. |
| 2016/0008720 | A1 | 1/2016 | Inukai et al. |
| 2016/0317924 | A1 | 11/2016 | Tanaka et al. |

FOREIGN PATENT DOCUMENTS

| | | |
|---|---|---|
| JP | 2007-259072 | 10/2007 |
| JP | 2010-154203 | 7/2010 |
| JP | 2011-067338 | 4/2011 |
| JP | 2012-018657 | 1/2012 |
| JP | 2012-055534 | 3/2012 |
| JP | 2013-171599 | 9/2013 |
| JP | 2013-250783 | 12/2013 |
| JP | 2014-076098 | 5/2014 |
| JP | 2014-128364 | 7/2014 |
| JP | 2014-188330 | 10/2014 |
| JP | 2014-209321 | 11/2014 |
| JP | 2014-212843 | 11/2014 |
| JP | 2014-236785 | 12/2014 |
| JP | 2015-008988 | 1/2015 |
| JP | 2015-015973 | 1/2015 |
| JP | 2015-127901 | 7/2015 |
| WO | 2014/012184 | 1/2014 |
| WO | WO 2017/072856 | 5/2017 |

OTHER PUBLICATIONS

Beppu et al., U.S. Appl. No. 15/879,644, filed Jan. 25, 2018 (200 pages).

Extended European Search Report dated Oct. 24, 2018 issued in EP Application No. 15907221.4 (7 pages).

Anonymous: "Steam (software)—Wikipedia", Oct. 24, 2015 (Oct. 24, 2015), XP055509316, Retrieved from the Internet: URL:https://en.wikipedia.org/w/index.php?title=Steam_(software)&oldid=687246742 [retrieved on Sep. 24, 2018] (27 pages).

Anonymous: "Steam Gifts—Trading and Gifting—Knowledge Base—Steam Support", Oct. 13, 2015 (Oct. 13, 2015), XP055509322, Retrieved from the Internet: URL:https://web.archive.org/web/20151013164759/https://support.steampowered.com/kb_article.php?p_faqid=549 [retrieved on Sep. 24, 2018] (9 pages).

Anonymous: "Buy a MAC game using a PC to give as a gift:: Steam for Mac", May 30, 2015 (May 30, 2015), XP055509337, Retrieved from the Internet: URL:https://steamcommunity.com/discussions/forum/2/618463106378140429/ [retrieved on Sep. 24, 2018] (3 pages).

Extended European Search Report dated Oct. 8, 2018 issued in EP Application No. 15907219.8 (9 pages).

Office Action dated Apr. 1, 2019, issued in U.S. Appl. No. 15/879,644 to Beppu et al., filed Jan. 25, 2018 (12 pages).

Anonymous: "Steam Gifts—Trading and Gifting—Knowledge Base—Steam Support", Oct. 13, 2015 (Oct. 13, 2015), XP055509322, Retrieved from the Internet: URL:https://web.archive.org/web/20151013164759/https://support.steampowered.com/kb_article.php?p_faqid=549 [retrieved on Sep. 24, 2018] (3 pages).

* cited by examiner

SERVER, INFORMATION PROCESSING SYSTEM, STORAGE MEDIUM STORING INFORMATION PROCESSING PROGRAM, AND INFORMATION PROCESSING METHOD

CROSS REFERENCE TO RELATED APPLICATION

This application is a continuation of International Patent Application PCT/JP2015/080253, filed on Oct. 27, 2015, the entire contents of which is hereby incorporated herein by reference.

FIELD

The present technique relates to an information processing system including a terminal configured to execute applications, and a server configured to communicate with the terminal.

BACKGROUND AND SUMMARY

There are conventional information processing systems in which data used in an application executed on a terminal-side information processing device is stored on a server.

With such information processing systems, there is a demand for improving the convenience of applications used on the terminal and/or the playability of the applications.

Therefore, the present application discloses an information processing system, with which it is possible to improve the convenience of applications used on the terminal and/or the playability of the applications.

(1)

An example of a server described herein communicates with a first information processing device having a platform of a first type and communicates with a second information processing device having a platform of a second type different from the platform of the first type.

The server includes a storage unit, an updating unit, and a transmission unit. The storage unit is configured to store at least shared game data, the shared game data representing game content that can be used in a first game application that is compatible with the first information processing device and not compatible with the second information processing device and that can be used in a second game application that is compatible with the second information processing device and not compatible with the first information processing device. The updating unit is configured to obtain game data generated by executing the first game application on the first information processing device and update the shared game data based on the obtained game data. The transmission unit is configured to transmit at least a part of the shared game data updated based on the game data generated by executing the first game application to the second information processing device via the communication circuitry for being used by the second game application.

(2)

The updating unit may obtain game data generated by executing the second game application on the second information processing device and update the shared game data based on the obtained game data. The transmission unit may transmit at least a part of the shared game data updated based on the game data generated by executing the second game application to the first information processing device for being used by the first game application.

(3)

The storage unit may store first application data including the shared game data and second application data including the shared game data. The transmission unit may transmit at least a part of the first application data to the first information processing device for being used by the first game application, and transmit at least a part of the second application data to the second information processing device for being used by the second game application.

(4)

The first application data may further include first game data that can be used in the first game application. The second application data may further include second game data that can be used in the second game application.

(5)

The updating unit may obtain game data generated by executing the first game application on the first information processing device and update the first application data based on the obtained game data and further update the shared game data included in the second application data based on the obtained game data. Then, the updating unit may obtain game data generated by executing the second game application on the second information processing device and update the second application data based on the obtained game data and further update the shared game data included in the first application data based on the obtained game data.

(6)

The storage unit may store first game data that can be used in the first game application, second game data that can be used in the second game application, and the shared game data. The transmission unit may transmit the first game data and the shared game data to the first information processing device for being used by the first game application, and transmit the second game data and the shared game data to the second information processing device for being used by the second game application.

(7)

The updating unit may, when game data generated by executing the first game application on the first information processing device is obtained, update the first game data and the shared game data based on the obtained game data. Then, the updating unit may, when game data generated by executing the second game application on the second information processing device is obtained, update the first game data and the shared game data based on the obtained game data.

(8)

The transmission unit may transmit at least a part of the shared game data to the second information processing device in response to a request given from the second information processing device after the shared game data is updated.

(9)

The server may include a save data server and a game process server. The save data server is configured to store the shared game data. The game process server is provided separately from the save data server and configured to be accessed when the first information processing device executes a game process of the first game application.

(10)

The first information processing device may be a smart device. The second information processing device may be a game device.

(11)

The first game application may be a simpler game application than the second game application.

(12)

The first game application may be an application that requires a condition that the first information processing device is able to access the server at the time of starting the first game application on the first information processing device. The second game application may be an application that does not require a condition that the second information processing device is able to access the server at the time of starting the second game application on the second information processing device.

(13)

The storage unit may store information representing each pair of a first game application and a second game application that use shared game data of the same content. The shared game data may include data that can be used commonly between each pair of game applications.

Note that the present specification discloses an information processing system having a similar function to that of a server according to (1) to (13) above, and discloses a storage medium storing an information processing program that causes a computer of an information processing device to function as the various units of the server. Moreover, the present specification discloses an information processing method to be executed on the information processing system described above.

According to the information processing system, the server, the information processing device, the storage medium storing an information processing program and the information processing method, it is possible to improve the convenience of applications used on the terminal and/or the playability of the applications.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

[1. General Configuration of System]

Figure 1:
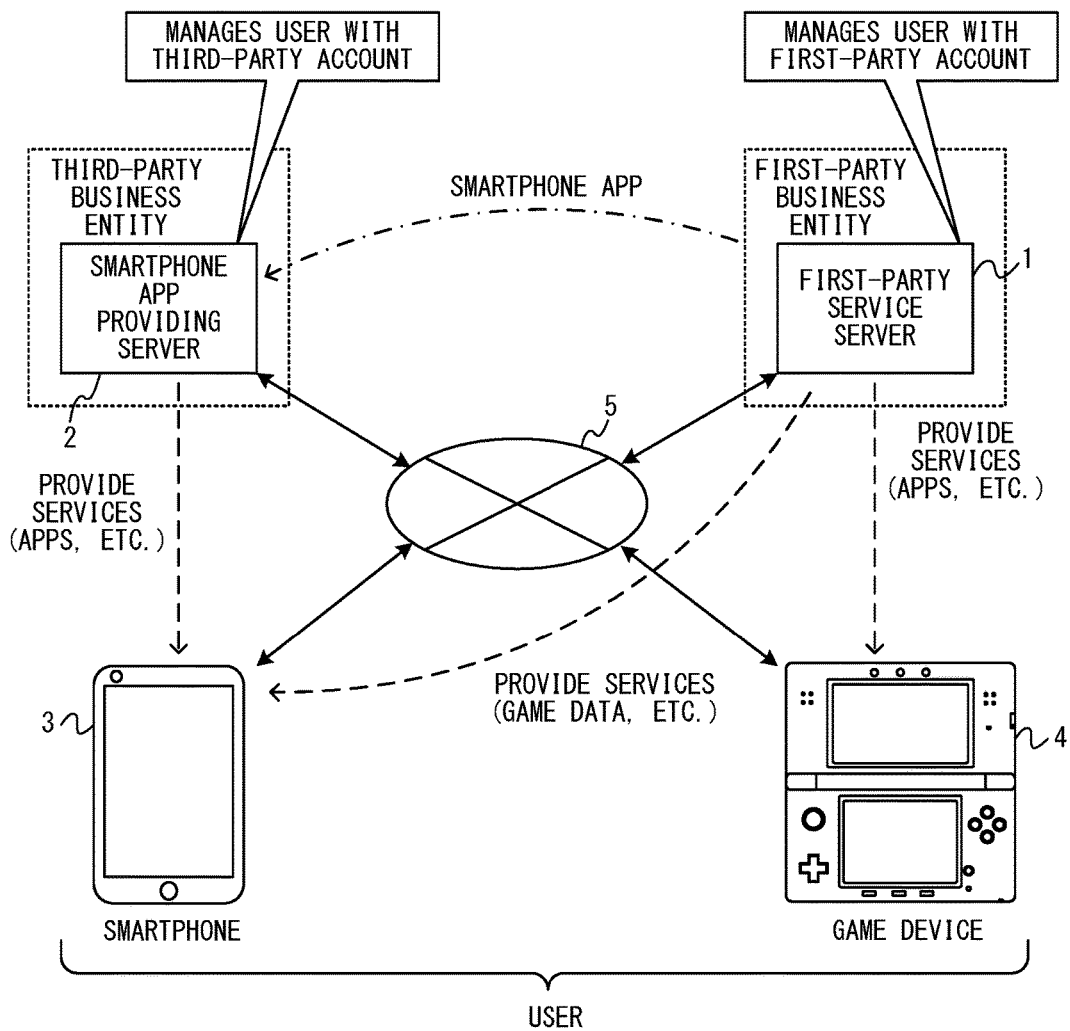
FIG. 1 is a block diagram showing exemplary elements of a non-limiting information processing system according to the present embodiment.

An information processing system, a server, an information processing device, an information processing program and an information processing method according to the present embodiment will now be described with reference to the drawings. First, a general configuration of an information processing system according to the present embodiment, and an outline of terminals and servers included in the information processing system will be described. FIG. 1 is a block diagram showing exemplary elements of an information processing system according to the present embodiment. As shown in FIG. 1, the information processing system includes a first-party service server 1, a smartphone app providing server 2, a smartphone 3 and a game device 4. These terminals or servers 1 to 4 can be connected to a network 5 such as the Internet and/or a mobile communications network.

The following description is directed to an example where a business entity that carries out the present embodiment provides a service to the smartphone 3 and the game device 4 using the first-party service server 1 in the information processing system shown in FIG. 1. Note that in the present embodiment, the information processing system includes, separately from the first-party service server 1, the app providing server 2 for performing a service of providing an application to the smartphone 3. In the present embodiment, the provision of services by the app providing server 2 is performed by a business entity that is different from the business entity that uses the first-party service server 1. That is, the operator of the smartphone app providing server 2 (in other words, the operator of the service by the smartphone app providing server 2) is different from the operator of the first-party service server 1 (in other words, the operator of the service by the first-party service server 1).

Note that in the present specification, the business entity that carries out the present embodiment using the first-party service server 1 is referred to as the "first-party business entity" (or the "first-party"). The business entity that uses the app providing server 2 is referred to as the "third-party business entity" (or the "third-party"). Note that the first-party business entity refers to an entity who substantially operates the service using the first-party service server 1 (referred to as the "first-party service"). The first-party business entity does not need to be the owner of the first-party service server 1, or it does not need to be an entity who manages or maintains the first-party service server 1.

In the present embodiment, the first-party business entity performs a service of providing applications for the smartphone 3 (hereinafter, referred to as "smartphone apps") and applications for the game device 4 (hereinafter, referred to as "game device apps") to users. The first-party business entity also performs various services that come with the service described above (e.g., providing a game server or a save data server of an on-line game, providing information such as an advertisement, awarding a bonus according to points, etc.), as will be described below. Note that the present embodiment is directed to an example where the first-party business entity provides game applications as the smartphone app and the game device app. Note however that the smartphone app and the game device app are not limited to game applications, but may be any applications.

As shown in FIG. 1, the first-party service server 1 provides a network service to the smartphone 3 and the game device 4 (in other words, the user who owns the smartphone 3 and the game device 4). In the present embodiment, the first-party service server 1 performs the following services, the details of which will be described later.

Provision of Game Device Apps

The first-party service server 1 performs a service of providing a game device app to the game device 4 via electronic commerce. That is, the first-party service server 1 provides an application to the game device 4 in response to an app obtaining request (e.g., a request to purchase an application) from the game device 4. Note that in the present embodiment, the user can download a game device app from the first-party service server 1 to the game device 4 not only via a request from the game device 4 to the first-party service server 1 but also via a request from the smartphone 3 to the first-party service server 1, the details of which will be described later.

Provision of Environment for Executing Smartphone Apps and Game Device Apps

The first-party service server 1 includes, for example, a game server or a save data server for a game application (e.g., an on-line game, etc.), and exchanges data used for a game application (i.e., game data) with the smartphone 3 or the game device 4. The first-party service server 1 manages a friend list that can be used in smartphone apps and game device apps.

The smartphone app providing server 2 is a server for performing a service of providing applications (referred to as an "app providing service"), and more specifically, the smartphone app providing server 2 performs a service of providing a smartphone app to the smartphone 3 (see FIG. 1). That is, in the present embodiment, the smartphone app providing server 2 provides an application to the smartphone 3 in response to an app obtaining request (e.g., a request to purchase an application) from the smartphone 3. The smartphone app providing server 2 and the service provided by the same may be those that exist in the art. For example, the smartphone app providing server 2 may be an existing server for performing an app providing service, such as "Google play (registered trademark)" or "APP STORE (registered trademark)".

In the present embodiment, the first-party business entity requests the third-party business entity that operates the smartphone app providing server 2 to provide a smartphone app developed by the first-party business entity to users (see a one-dot-chain line arrow shown in FIG. 1). That is, in the present embodiment, the smartphone app developed by the first-party business entity is provided to users by the app providing service of the smartphone app providing server 2. That is, a smartphone app to be executed in an environment that is provided by the first-party service server 1 is obtained by (specifically, installed on) the smartphone 3 from the app providing service of the smartphone app providing server 2. Note that a smartphone app compatible with the first-party service (in other words, a smartphone app that is capable of receiving a service of the first-party service) is not limited to those developed by the first-party business entity, but may be those developed by a third-party developer (e.g., a third-party entity who is licensed by the first-party business entity).

In a service of the first-party service server 1 and a service of the smartphone app providing server 2, each user is managed by a different account. In the present embodiment, an account used in a service of the first-party service server 1 is referred to as a "first-party account", and an account used in a service of the smartphone app providing server 2 is referred to as a "third-party account" (see FIG. 1).

The smartphone 3 is an exemplary information processing device owned by a user, and can be said to be an exemplary smart device. That is, the meaning of the term "smart device" includes a smartphone. The smartphone 3 may be an existing one, and may be one incorporating an existing OS (operating system) (in other words, having an existing platform) such as Android (registered trademark) or iOS, for example. That is, the smartphone 3 may be realized by installing the function of executing a process of the present embodiment on an existing smartphone.

Note that the smartphone 3 can be said to be an exemplary multifunction information terminal. Herein, a multifunction information terminal refers to an information processing device having the following functions, for example.

Function of executing an application (e.g., a browser, a mailer or a game application, etc.).

Function of outputting an image (which may be a video) and a sound.

Network communication function (e.g., the function of communication via a wireless LAN or the function of communication via a mobile communications network).

In addition to those described above, the multifunction information terminal may have an image-capturing function using a camera, a short-range wireless communication function (e.g., a function of communication via Bluetooth (registered trademark) or NFC (Near Field Communication)), a position detecting function (e.g., the GPS function), etc.

The game device 4 is an exemplary information processing device owned by a user, and is an example of a different type of an information processing device than the smartphone 3. While the game device 4 executes game applications, it is capable of executing other types of applications. In the present embodiment, the smartphone 3 is an existing information processing device, whereas the game device 4 is an information processing device that is manufactured and provided by the first-party business entity to users. The game device 4 is an information processing device capable of executing game device apps provided by the first-party business entity.

Note that although FIG. 1 shows one each of the smartphone 3 and the game device 4, the information processing system includes a plurality of smartphones and a plurality of game devices in the present embodiment.

The present embodiment is directed to an example where the smartphone 3 and the game device 4 are owned by one user (see FIG. 1). That is, the following description is directed to an example where the first-party service of the first-party service server 1 is provided to a user who owns both the smartphone 3 and the game device 4. Note however that in the present embodiment, it is not required that users receiving the first-party service all own both the smartphone 3 and the game device 4. A user who only owns a smartphone can receive smartphone-related services, of the first-party services, and a user who only owns a game device can receive game device-related services, of the first-party services.

Note that in the present embodiment, the meaning of "a user" includes "a user associated with an account of a network service". That is, in the present embodiment, one account of a network service is regarded as one user. Therefore, when a plurality of persons share one account, the information processing system regards the plurality of persons collectively as one user. Therefore, when person A owns the smartphone 3 and person B, who is a family member of person A, owns the game device 4, for example, person A and person B are regarded as one user. On the contrary, when one person owns a plurality of accounts, each of the accounts is regarded as a user.

[2. Configuration of Devices]

Next, referring to FIG. 2 to FIG. 4, a specific exemplary configuration of devices or servers included in information processing system according to the present embodiment will be described.

(Specific Exemplary Elements of Smartphone)

Figure 2:
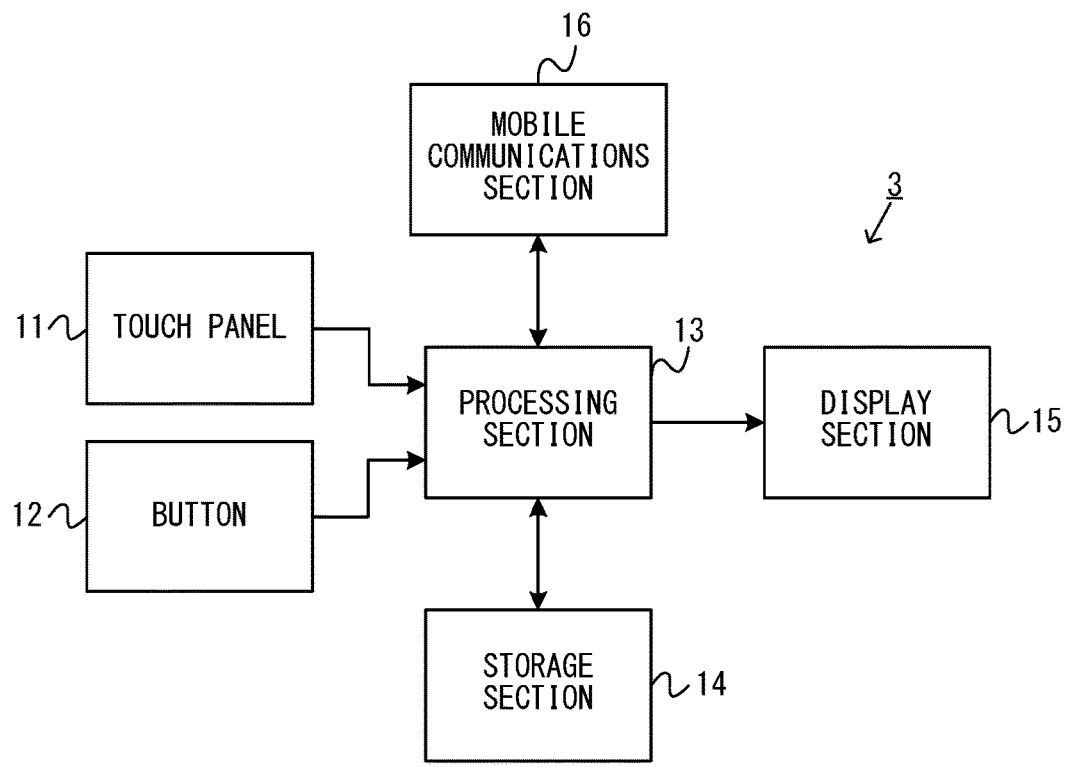
FIG. 2 is a block diagram showing exemplary elements of a non-limiting smartphone.

FIG. 2 is a block diagram showing exemplary elements of the smartphone 3. As shown in FIG. 2, the smartphone 3 includes a touch panel 11 and a button 12, as an exemplary input section. The smartphone 3 also includes a display section 15. The touch panel 11 is provided on the screen of the display section 15. The display section 15 displays an image that is generated by an information process executed by a processing section 13 of the smartphone 3 (e.g., an image of an application, etc.). The button 12 is used, for example, for switching on/off the power of the smartphone 3, and switching on/off the screen display of the display section 15. Note that the smartphone 3 may include a speaker, a microphone and/or a camera, etc.

The smartphone 3 includes the processing section 13 and a storage section 14. The processing section 13 is electrically connected to the various sections 11, 12 and 14 to 16 of the smartphone 3. The processing section 13 includes a CPU (Central Processing Unit) and a memory. In the smartphone 3, the CPU executes a program stored in the storage section 14 while using the memory, thereby executing various information processes. The storage section 14 stores the program executed on the processing section 13, data used in the information processes by the processing section 13, and data obtained by the information processes, etc.

Note that the smartphone 3 has a platform for executing applications. Herein, the platform of the smartphone 3 refers to a configuration for executing applications, which configuration is implemented by the hardware (i.e., the CPU, etc.) of the processing section 13 and the OS (operating system; also called a system program) stored in the storage section 14. In the present embodiment, the platform of the smartphone 3 is a platform that uses an existing OS such as Android (registered trademark) or iOS (as opposed to an OS developed by the first-party business entity). The application program stored in the storage section 14 is executed on the platform. Note that the platform of the smartphone 3 is compatible with smartphone apps, and not compatible with game device apps.

The smartphone 3 includes a mobile communications section 16 for performing communication by connecting to a mobile communications network (in other words, a mobile telephone communications network). In the present embodiment, the smartphone 3 (specifically, the processing section 13) communicates with other devices (e.g., the servers 1 and 2, etc.) by connecting to the network 5 by using the mobile communications section 16 (in other words, via the mobile communications section 16). Note that there is no particular limitation on the configuration of the communication section for the smartphone 3 to perform communication via the network 5. Note that the smartphone 3 may include a communication means different from the mobile communications section 16. For example, the smartphone 3 may have the function of connecting to a wireless LAN by a Wi-Fi-certified communication module.

Note that the smartphone 3 may include other elements in addition to those shown in FIG. 2. For example, the smartphone 3 may have the function of performing NFC-based communication and/or the function of detecting the position of the smartphone 3 (e.g., the GPS function), etc.

The present embodiment has illustrated the smartphone 3 as an example of a general-purpose multifunction information terminal owned by a user. Here, in other embodiments, the information processing system may include other types of multifunction information terminals, instead of the smartphone 3. The information processing system may be configured to include, as the multifunction information terminal, an information processing device that can be worn by a user (a so-called "wearable terminal"), such as a watch-shaped or glass-shaped terminal, for example.

(Specific Exemplary Elements of Game Device)

Figure 3:
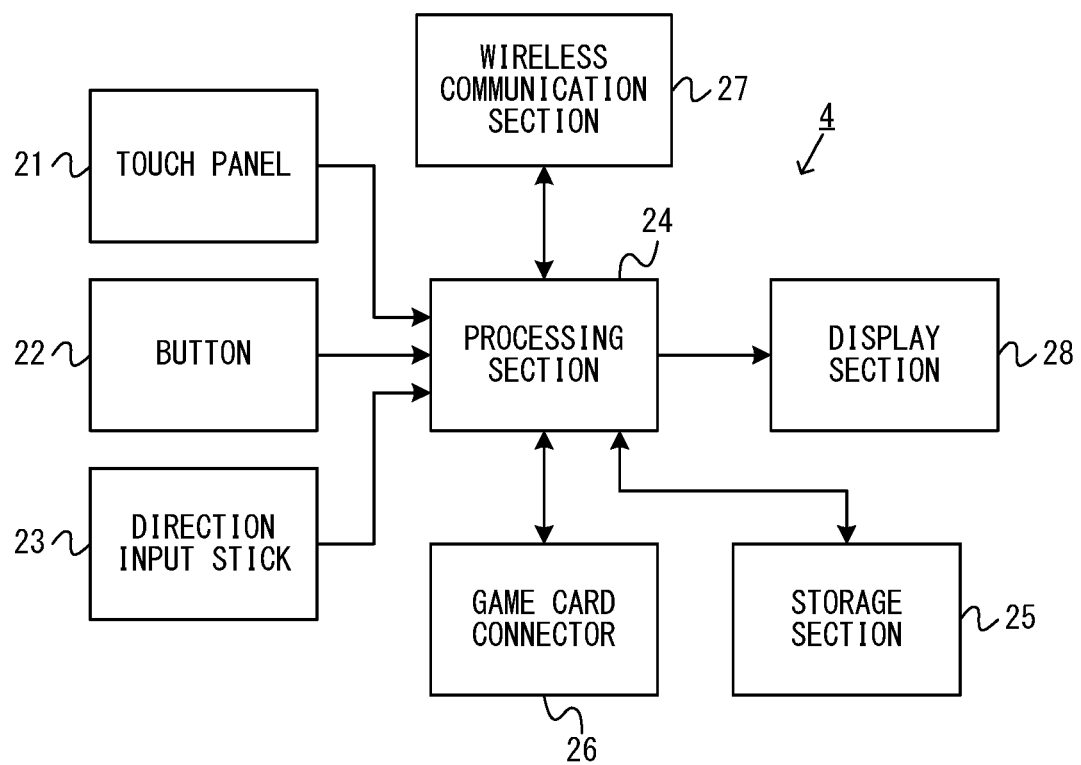
FIG. 3 is a block diagram showing exemplary elements of a non-limiting game device.

FIG. 3 is a block diagram showing exemplary elements of the game device 4. As shown in FIG. 3, the game device 4 includes a touch panel 21, a button 22 and a direction input stick 23, as exemplary input sections. The game device 4 includes a display section 28. Note that the game device 4 may include a speaker, a microphone and/or a camera, etc.

The touch panel 21 is provided on the screen of the display section 28. The display section 28 displays an image that is generated by an information process executed by a processing section 24 of the game device 4 (e.g., a game image, etc.).

The button 22 is an input section for giving an instruction to control the game device 4 (e.g., turning on/off the power, etc.) and/or an input instruction in an application executed on the game device 4. The game device 4 may include a button, for example, for switching on/off the power of the game device 4 or switching on/off the screen display, and a button for making a predetermined game input in a game application executed on the game device 4. Thus, the game device 4 may include a plurality of buttons, as the button 22. The game device 4 may further include a plurality of buttons, as a button for a game (i.e., a button used for making an input instruction in a game application executed on the game device 4).

The direction input stick 23 is an exemplary operation section capable of making direction inputs for at least four directions of up, down, left and right. The direction input stick 23 is an analog stick or a slide stick (also called a "slide pad"), for example. The direction input stick 23 includes a stick member that can be tilted (or slid) in all directions (i.e., 360° directions including up, down, left, right and diagonal directions) that are parallel to the primary surface of the housing of the game device 4. The user can tilt (or slide) the stick member to make an input of direction in accordance with the tilt direction (and an input of magnitude in accordance with the angle of tilt). Note that the game device 4 may include a cross-shaped key, as an operation section with which it is possible to make direction inputs. The direction input stick 23 is used for making direction inputs in a game application executed on the game device 4, for example.

The game device 4 includes a game card connector 26. The game card connector 26 is a connector for the connection with a game card attached to the game device 4. Here, the game device 4 includes a slot into which a game card dedicated to the game device 4 can be removably attached. Note that the "dedicated game card" means a storage medium that can be attached to the game device 4 and that cannot be attached to a different type of a device from the game device 4 (at least the smartphone 3). In the present embodiment, a game card is manufactured by the first-party business entity described above or by a third-party entity that is licensed by the first-party business entity. The game card attached to the slot is connected to the game card connector 26 so that the game card can be accessed by the processing section 24 of the game device 4. For example, the game card stores a program that can be executed on the game device 4 (e.g., a program of a game application) and/or data used in a program that is executed on the game device 4 (e.g., game data and save data used in a game application).

The game device 4 includes the processing section 24 and a storage section 25. The processing section 24 is electrically connected to the various sections 21 to 23 and 25 to 28 of the game device 4. The processing section 24 includes a CPU and a memory. In the game device 4, the CPU executes a program stored in the storage section 25 and/or executes a program stored in a game card attached to the game device 4 while using the memory, thereby executing various information processes. The storage section 25 stores the program executed on the processing section 24, data used in the information processes by the processing section 24, and data obtained by the information processes, etc.

Note that the game device 4 has a platform for executing applications. The platform of the game device 4 refers to a configuration for executing applications, which configuration is implemented by the hardware (i.e., the CPU, etc.) of the processing section 24 and the OS stored in the storage section 25. In the present embodiment, the platform of the game device 4 is a platform that uses an OS dedicated to the game device 4. The application stored in the storage section 25 or the game card is executed on the platform. Note that the platform of the game device 4 is compatible with game device apps, and not compatible with smartphone apps.

The game device 4 includes a wireless communication section 27 that has the function of communicating with other devices via the network 5. For example, the wireless communication section 27 may be a Wi-Fi-certified communication module capable of connecting to a wireless LAN. The game device 4 (specifically, the processing section 24) communicates with other devices (e.g., the servers 1 and 2, etc.) by connecting to the network 5 by using the wireless communication section 27 (in other words, via the wireless communication section 27). Note that there is no particular limitation on the configuration of the communication section for the game device 4 to perform communication via the network 5. The game device 4 may include a short-range communication section having the function of performing short-range wireless communication with devices (e.g., game devices of the same type as the game device 4) in the vicinity thereof. The short-range communication section may be a communication module for performing communication based on the Bluetooth (registered trademark) standard or may be a communication module for performing infrared communication, for example. Note that in other embodiments, the game device 4 may include the mobile communications section 16 for performing communication by connecting to a mobile communications network.

Note that the game device 4 may include other elements in addition to those shown in FIG. 3. For example, the game device 4 may have the function of performing NFC-based communication and/or the function of detecting the position of the game device 4 (e.g., the GPS function), etc.

(Differences Between Smartphone 3 and Game Device 4)

As described above, the smartphone 3 and the game device 4 are different types of information processing devices from each other. Specifically, the smartphone 3 and the game device 4 can be said to be different types of information processing devices because they are different from each other as follows.

First, the smartphone 3 and the game device 4 are different from each other in terms of the platform for executing applications. That is, the smartphone 3 executes applications (i.e., smartphone apps) on a platform based on an existing OS, whereas the game device 4 executes applications (i.e., game device apps) on a platform based on an OS dedicated to the game device 4, which is different from the existing OS. The smartphone 3 is compatible with smartphone apps and not compatible with game device apps, whereas the game device 4 is compatible with game device apps and not compatible with smartphone apps. Thus, the smartphone 3 and the game device 4 are different from each other in terms of applications that can be executed thereon.

The smartphone 3 and the game device 4 are different from each other in that the smartphone 3 has the function of performing communication via a mobile communications network (in other words, a mobile telephone communications network) (which can be said to be the communication function via a mobile communications network), whereas the game device 4 does not have this function.

The smartphone 3 and the game device 4 are different from each other in that the game device 4 includes a controller device capable of making direction inputs (the direction input stick 23 in the present embodiment), whereas the smartphone 3 does not include such a controller device. Since direction inputs are typically made frequently in a game application, a controller device capable of making direction inputs can be said to be a controller device for game operations. Since the game device 4 includes such an operation section for game operations and is an information processing device suitable for games, the game device 4 can be said to be an information processing device for games. The smartphone 3 and the game device 4 are different from each other in that the smartphone 3 is a general-purpose information processing device (in other words, a multifunction information terminal), whereas the game device 4 is an information processing device for games. Note that while the game device 4 is an information processing device for games, as described above, the game device 4 can be used not only for the purpose of games. For example, the game device 4 may have a browser function by having a browser application installed thereon, may have a video player function by having a video player application installed thereon, or may have an image-capturing function by having a camera thereon.

Moreover, the smartphone 3 and the game device 4 are different from each other in that a dedicated game card can be attached to the game device 4, whereas such a game card cannot be attached to the smartphone 3.

Although there are at least four differences described above between the smartphone 3 and the game device 4 in the present embodiment, it can be said that two information processing devices are different types of information processing devices as long as there is at least one of the four differences described above. That is, in other embodiments, it is only required that there be at least one of the four differences described above between two types of information processing devices, which are terminal devices in the information processing system. For example, the game device 4 does not need to have the function of performing communication via a mobile communications network, and a dedicated game card does not need to be able to be attached to the game device 4.

(Specific Exemplary Elements of First-Party Service Server)

Figure 4:
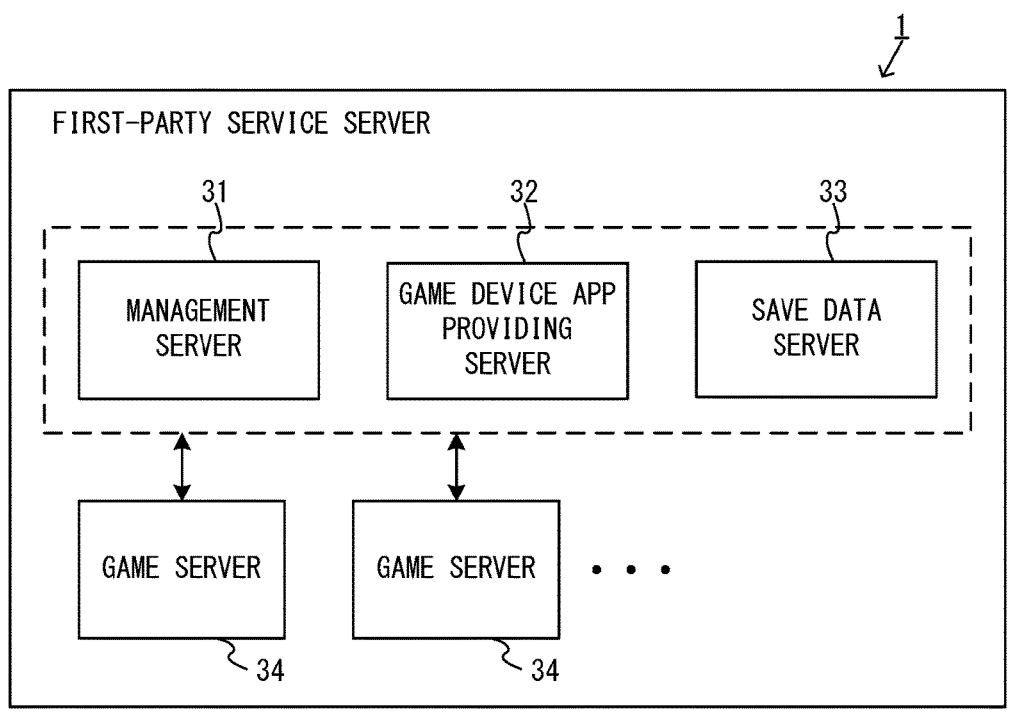
FIG. 4 is a diagram showing exemplary elements of a non-limiting first-party service server.

FIG. 4 is a diagram showing exemplary elements of the first-party service server 1. As shown in FIG. 4, the first-party service server 1 includes a plurality of servers corresponding to various functions for providing services. Note that in the present specification, a "server" not only refers to one information processing device (i.e., a server device) but also refers collectively to a group of server devices (i.e., a server system) when the functions of the server are implemented by a plurality of server devices. That is, a "server" may be a server device or may be a server system. Note that while the first-party service server 1 includes a plurality of servers 31 to 34 in the present embodiment, it may be composed of one server device in other embodiments. In the present embodiment, each of the servers 31 to 34 may be composed of one server device or may include a plurality of server devices having different functions and/or roles.

The first-party service server 1 includes a management server 31. The management server 31 performs, for example, the management of information relating to a user who receives a first-party service. Specifically, the management server 31 manages the account of a user who receives a first-party service (i.e., the first-party account). The management server 31 also manages various information relating to the user corresponding to the first-party account (in other words, the user who has the first-party account). Note that in the present embodiment, the management server 31 manages information such as the friend list of the user, points awarded to the user, history information relating to the user (e.g., the history of use of applications or the history of purchases of applications) and personal information (e.g., name, sex, age, address, etc.), the information being associated with the first-party account.

The first-party service server 1 includes a game device app providing server 32. The game device app providing server 32 provides a game device app to the game device 4 in response to an app obtaining request (e.g., a request to purchase an application) from the user. The game device app providing server 32 includes a storage section, and stores data of the game device app to be provided in the storage section. For example, the game device app providing server 32 is a shop server that provides a shop website where game device apps can be purchased. That is, the game device app providing server 32 presents, to the game device 4, a webpage that introduces game device apps, accepts an obtaining request (e.g., a purchase request) for obtaining a game device app on the webpage, and allows the game device 4 to download a game device app in response to the obtaining request. Note that the game device app providing server 32 may have the same function and/or configuration as those of an existing shop server.

The first-party service server 1 includes a save data server 33. The save data server 33 is a server that stores, in a storage section, save data of game applications for smartphone apps and game device apps.

The first-party service server 1 includes a game server 34. The game server 34 provides an environment for executing a game of a game application (which is a smartphone app or a game device app) on the smartphone 3 or the game device 4. For example, in response to a request from a terminal that executes the game application (the smartphone 3 or the game device 4), the game server 34 executes a game process as necessary, and transmits game data in response to the request to the terminal.

In the present embodiment, the game server 34 is provided for each application. In the present embodiment, the first-party business entity provides a plurality of applications, and the first-party service server 1 includes a plurality of game servers 34 corresponding to the applications (see FIG. 4). Note however that of the plurality of smartphone apps and game device apps provided by the first-party service server 1, there may be applications for which no game server is provided. That is, of the plurality of smartphone apps and game device apps provided by the first-party service server 1, there may be applications for which communication with the game server is not needed. The first-party service server 1 may include a game server of a game application provided by a business entity other than the first-party business entity.

The game server 34 communicates with the management server 31, the game device app providing server 32 and the save data server 33, as necessary. For example, when a friend list is used in a game process executed on the game server 34, the game server 34 accesses the management server 31 to obtain a friend list. For example, for a game device app corresponding to the game server 34, when game data (which may be the game device app itself) is purchased on the game device app providing server 32, the game server 34 accesses the game device app providing server 32 to obtain information representing the content of purchase and transmit game data corresponding to the content of purchase to the game device 4. When a game process is executed on a terminal (the smartphone 3 or the game device 4), the game server 34 obtains the save data from the save data server 33 or save the save data in the save data server 33 at a predetermined point in time.

Although not shown in FIG. 4, communication is performed, as necessary, between the servers 31 to 33, as between the game server 34 and the servers 31 to 33.

Each of the servers 31 to 34 includes one or more information processing device (i.e., server device) including a CPU and a memory. On a server, the CPU executes various information processes by executing an information processing program stored in the server while using the memory. The information processing device also includes a communication section that communicates with other devices via the network 5. The CPU communicates with other devices (e.g., other servers, the smartphone 3, the game device 4, etc.) by connecting to the network 5 using the communication section (in other words, via the communication section).

(Configuration of Smartphone App Providing Server)

As described above, the service provided by the smartphone app providing server 2 may be an existing app providing service. Therefore, the smartphone app providing server 2 may have the same function and/or configuration as those of an existing shop server. For example, the smartphone app providing server 2 presents, to the smartphone 3, a webpage that introduces smartphone apps, accepts an obtaining request (e.g., a purchase request) for obtaining a smartphone app on the webpage, and allows the smartphone 3 to download a smartphone app in response to the obtaining request. The smartphone app providing server 2 includes one or more information processing device (i.e., a server device) including a CPU and a memory, and the CPU executes various information processes by executing an information processing program stored in the server by using the memory. The information processing device also includes a communication section that communicates with other devices via the network 5. The CPU communicates with other devices (e.g., other servers, the smartphone 3, etc.) by connecting to the network 5 using the communication section (in other words, via the communication section).

[3. Outline of Processes of Information Processing System]

Process operations to be executed on the information processing system of the present embodiment will now be described. In the present embodiment, the first-party service server 1 (in other words, the first-party service) is used to bridge between the smartphone 3 and the game device 4, which are different types of information processing devices. That is, the first-party service server 1 bridges between the smartphone 3 and the game device 4 by presenting an advertisement relating to the game device 4 to the smartphone 3, awarding a bonus relating to the game device 4 in accordance with the use record relating to smartphone apps, and allowing a smartphone app and a game device app to share save data and friend lists. By bridging between different types of information processing devices as described above, it is possible to improve the convenience for the user, prompt the user to obtain or use an application, and improve the playability of the application, the details of which will be described later. In the present embodiment, a system composed of the smartphone app providing server 2 and the smartphone 3 may be an existing system. Therefore, in the present embodiment, a user who uses an existing system (the smartphone app providing server 2 and the smartphone 3) can be prompted to purchase a new game device 4 and/or use a new service using the game device 4. Some exemplary process operations that achieve these advantageous effects will now be described.

(3-1) Setting First-Party Account

First, referring to FIG. 5 and FIG. 6, a process of setting a first-party account will be described. Specifically, a process of newly setting a first-party account for a user who does not have a first-party account will be described.

Figure 5:
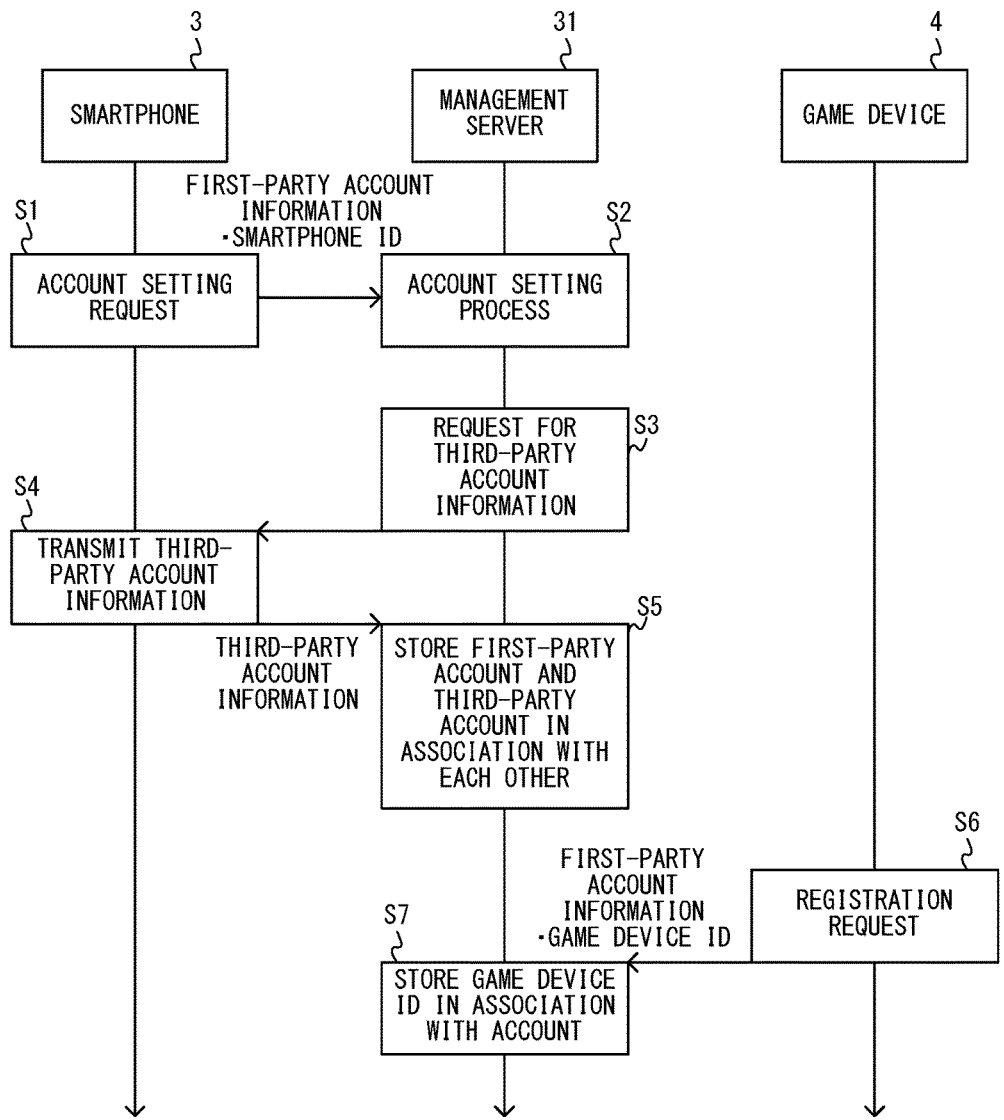
FIG. 5 is a diagram showing an exemplary flow of a process when a first-party account is set.

FIG. 5 is a diagram showing an exemplary flow of a process when a first-party account is set. Note that FIG. 5 illustrates an example where the user does not have a first-party account, while the user owns the smartphone 3 and has a third-party account. Note that there is no particular limitation on the method for setting a third-party account, and a conventional setting method may be used.

As shown in FIG. 5, when the user registers a first-party account, the smartphone 3 first transmits information of a setting request for setting a first-party account to the management server 31 in response to an operation of the user (step S1). In response to the setting request, the management server 31 executes a process of setting a first-party account (step S2). Specifically, the management server 31 newly creates user management information for the user of the smartphone 3, and stores the user management information in the storage section of the management server 31.

Figure 6:
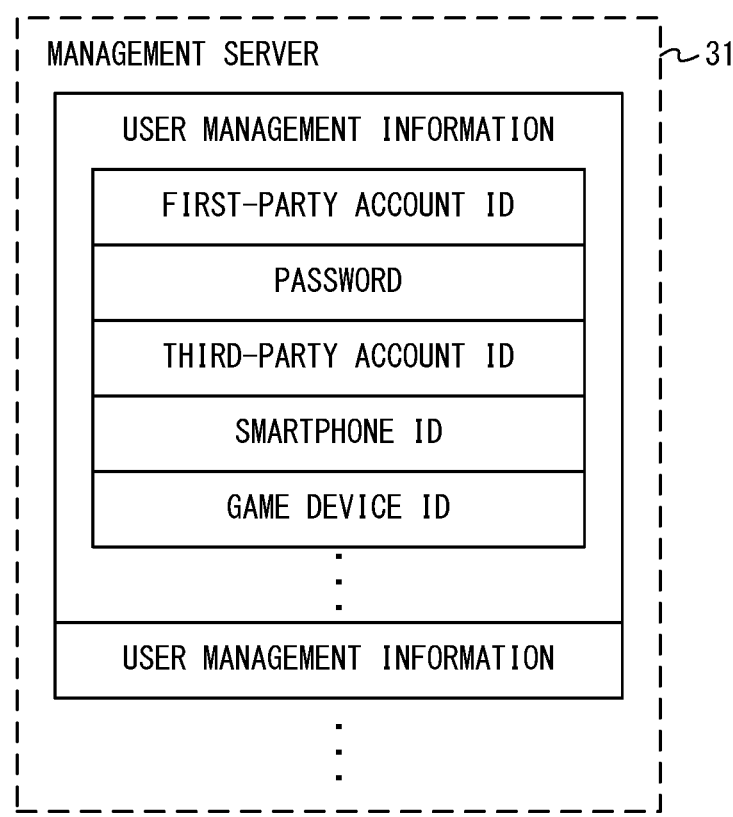
FIG. 6 is a diagram showing an example of user management information stored on a non-limiting management server.

FIG. 6 is a diagram showing an example of user management information stored in the management server. As shown in FIG. 6, the management server 31 stores the user management information for each user (in other words, for each account) of the first-party service. As shown in FIG. 6, the user management information includes various information. Note however that in the process of step S2 described above, the management server 31 generates and stores user management information that at least includes a first-party account ID and a smartphone ID, which is smartphone identification information. At the point in time of the process of step S2 described above, the user management information does not need to include information other than the first-party account ID and the smartphone ID.

Note that there is no particular limitation on the specific content of the process of setting a first-party account (steps S1 and S2) to be executed between the smartphone 3 and the management server 31, and it may be a conventional account setting method. For example, in response to a setting request, the management server 31 requests the smartphone 3 to transmit the smartphone ID. In response to this request, the smartphone 3 transmits the information of the smartphone ID thereof to the management server 31. A smartphone ID is information for identifying a smartphone 3 from which the smartphone ID has been transmitted. Note however that the smartphone ID does not need to be information that is unique to the device of the smartphone 3. For example, the smartphone ID may be information representing an email address of an electronic mail that can be received on the smartphone 3 (and that can also be received on other terminals).

The management server 31 stores, as the user management information, the smartphone ID transmitted from the smartphone 3 and the first-party account ID in association with each other. Herein, the settings of the first-party account (specifically, the ID number or the name, etc.) may be set in the management server 31 or may be set according to the input by the user. Information of another account of another network service separate from the first-party service may be used as the first-party account ID. For example, the ID of an account of a network service provided by another business entity separate from the first-party business entity (e.g., an account of an SNS (social networking service)) or the ID of an account of another network service separate from the first-party service provided by the first-party business entity may be set as the first-party account ID. Then, the smartphone 3 may automatically obtain (i.e., without the user inputting) the information of another account stored on the smartphone 3, and transmit the account information to the management server 31.

The management server 31 also prompts the user to set a password that is to be associated with the first-party account ID. Then, the management server 31 stores the set password in association with the first-party account ID (FIG. 6). The management server 31 may prompt the user to input information relating to the user (e.g., name, age, sex, address, hobby, etc.) and store the input information in association with the first-party account ID.

Next, the management server 31 requests the smartphone 3 for third-party account information (step S3). In response to this request, the smartphone 3 transmits third-party account information including a third-party account ID to the management server 31 (step S4). For example, in response to the request, the smartphone 3 accepts an input of a third-party account ID, and transmits the third-party account ID input by the user to the management server 31. Note that in other embodiments, the smartphone 3 may automatically transmit the third-party account ID in response to the request. In other embodiments, in the process of step S1, the smartphone 3 transmits the third-party account information to the management server 31, together with the first-party account ID and/or the password. For example, the smartphone 3 may prompt the user to also input the third-party account ID when the smartphone 3 prompts the user to input the first-party account ID and/or the password.

When the third-party account information is received from the smartphone 3, the management server 31 stores the received third-party account ID in association with the first-party account ID set in step S2 (step S5). That is, the management server 31 additionally stores the received third-party account ID in the user management information relating to the user of the smartphone 3 (see FIG. 6).

By the process of steps S1 to S5 described above, the first-party account is set, and the first-party account and the third-party account are associated with each other. At this point in time (at the completion of the process of step S5), the user can receive the first-party service using the smartphone 3. Note that the user who has set an account using the smartphone 3 does not need to own the game device 4.

When the user wishes to receive the first-party service also on the game device 4, the user transmits, from the game device 4 to the management server 31, a registration request to register the game device 4 with the first-party service. That is, in response to an operation of the user, the game device 4 transmits the registration request to the management server 31 (step S6). For example, when a user logs in to a first-party service using the game device 4 for the first time, the game device 4 may transmit the registration request to the management server 31.

The registration request includes a first-party account ID (and a password) and a game device ID. The first-party account ID and the password are input by the user. The game device ID is information for identifying the game device from which the request is transmitted. For example, the game device ID is a number uniquely assigned to each game device. Each game device 4 stores, in the storage section 25, a game device ID that is pre-assigned for the game device 4. The game device 4 generates a registration request that includes the first-party account ID and the password, which are input by the user, and the game device ID stored in the storage section 25, and the game device 4 transmits the information of the registration request to the management server 31.

Based on the registration request received from the game device 4, the management server 31 registers the game device 4 with the first-party service. Specifically, the management server 31 additionally stores the game device ID included in the registration request in the user management information relating to the user of the first-party account ID included in the registration request (step S7). Thus, for this user, the first-party account ID and the game device ID are associated with each other (see FIG. 6). The smartphone ID and the game device ID having been associated with each other for the first-party account ID means that the smartphone 3 and the game device 4 owned by the user are associated with each other. In the present embodiment, when the first-party service server 1 transmits some information to the game device 4 owned by the user, the destination game device is identified by using the game device ID, the details of which will be described later.

Note that when the pairing between the first-party account ID and the password included in the registration request is not valid, the management server 31 may not register the game device 4.

As described above, in the present embodiment, a user who has registered a first-party account using the smartphone 3 can receive the service using the first-party account also on the game device 4. That is, in the present embodiment, a user can log in to a single first-party account using both the smartphone 3 and the game device 4, and can use the first-party service by either one of the smartphone 3 and the game device 4.

As described above, in the present embodiment, the management server 31 uses a single first-party account for the smartphone 3 and the game device 4. Herein, in other embodiments, the management server 31 may set an account for the smartphone 3 and an account for the game device 4 as first-party accounts for a single user. In this case, when information representing the association between the account for the smartphone 3 and the account for the game device 4 is stored as the user management information, the management server 31 can identify the pairing between the smartphone 3 and the game device 4 (in other words, each pair of a smartphone 3 and a game device 4 owned by the same user).

FIG. 5 illustrates a case where the user first registers the first-party account using the smartphone 3 and then adds the game device 4 (in other words, the game device ID) to the first-party account. In the present embodiment, the user may first register the first-party account using the game device 4, and then add the smartphone 3 (in other words, the smartphone ID) to the first-party account. That is, first, as a request to set the first-party account is given from the game device 4 to the management server 31, the process of setting the first-party account based on the request from the game device 4 is performed. This setting process is similar to the process of steps S1 to S5 except that the request is given from the game device 4, instead of the smartphone 3, and that user management information including the game device ID instead of the smartphone ID is stored in the management server 31. Then, the process of registering the smartphone 3 with the first-party account set by the game device 4 is executed. This process is similar to the process of steps S6 to S7 except that the registration request is given from the smartphone 3 instead of the game device 4, and that the smartphone ID is registered instead of the game device ID.

In the present embodiment, even a user who does not have a third-party account can register a first-party account. Then, as the smartphone 3 (or the game device 4) and the management server 31 perform the process of steps S1 and S2, a first-party account can be registered for the user. Then, as the smartphone 3 (or the game device 4) and the management server 31 perform the process of steps S4 and S5 after a user who has a first-party account registers a third-party account, the management server 31 can store the third-party account and the first-party account in association with each other.

(3-2) Basic Process Performed on Smartphone

Figure 7:
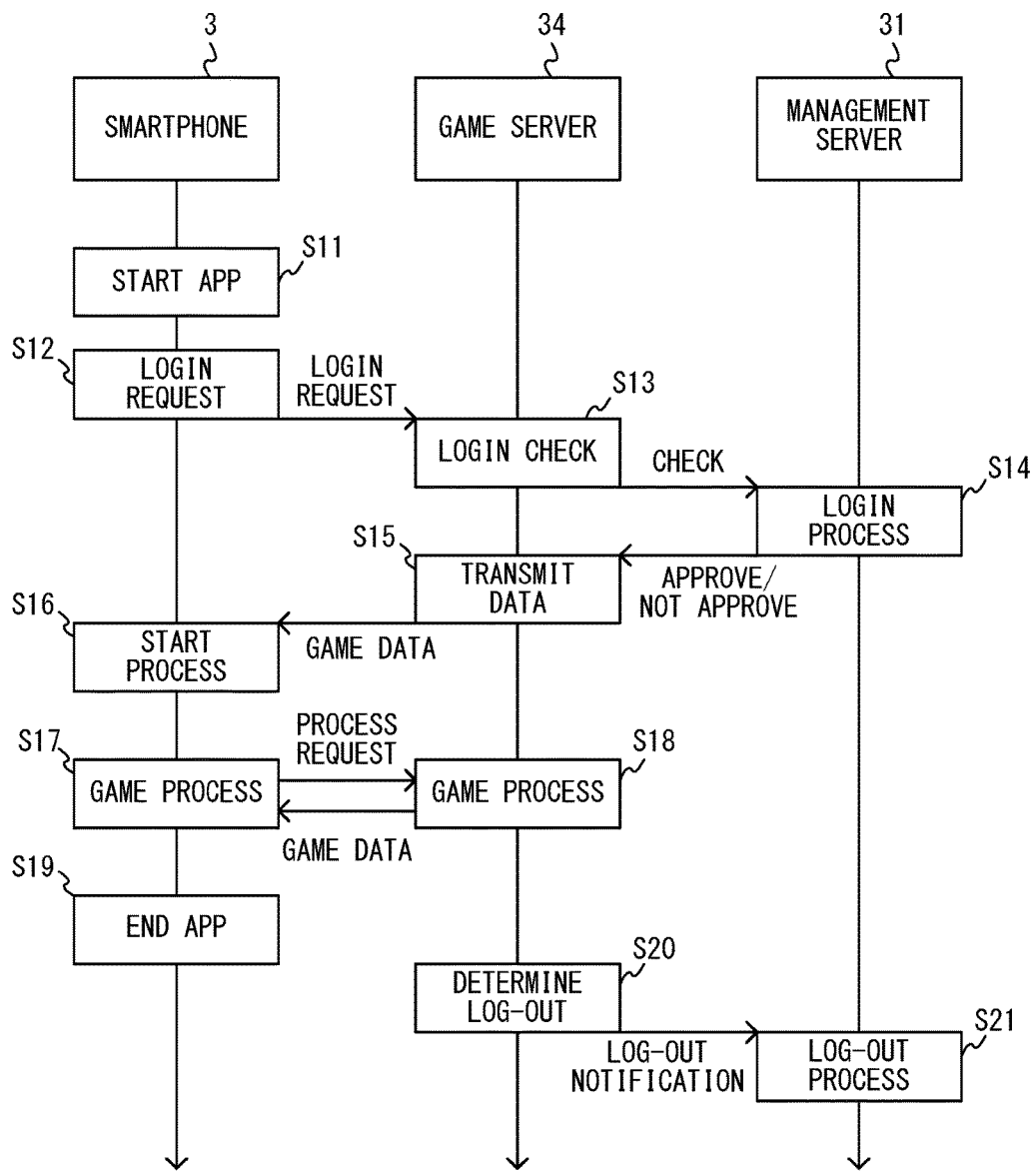
FIG. 7 is a diagram showing an exemplary flow of a basic process executed on a non-limiting smartphone.

Next, an example process from start to end of a smartphone app will be described as a basis process performed on a smartphone. FIG. 7 is a diagram showing an exemplary flow of a basic process performed on a smartphone. Note that the process executed on the smartphone 3 is not limited to the process shown in FIG. 7, but a process (to be described below) not shown in FIG. 7 may be executed depending on the smartphone app to be started.

In FIG. 7, in response to a start instruction from the user, the smartphone 3 starts (i.e., opens) a smartphone app (step S11). The start instruction is an instruction of specifying an icon of the smartphone app included in the menu screen displayed on the display section 15, for example.

In the present embodiment, when the smartphone app is started, the smartphone 3 logs in to the first-party service (specifically, the service relating to the game of the smartphone app) using the first-party account ID (step S12). Specifically, the smartphone 3 transmits information representing the login request to the game server 34. This information includes the first-party account ID and the password of the user. Note that the game server 34 to which the information of the login request is transmitted is the game server that corresponds to the smartphone app having been started.

As described above, in the present embodiment, the login on the smartphone 3 is performed during the execution of the smartphone app corresponding to the first-party service. That is, the smartphone app has the function of logging in to the first-party service.

Note that on the terminal (the smartphone 3 or the game device 4), the first-party account ID and the password may be input by the user on a login screen for accepting a first-party account ID and a password. The terminal may store a first-party account ID and a password, which are pre-set, and the first-party account ID and the password may be included in the formation representing the login request. The login may be performed by single sign-on. That is, when the terminal is logged in to another predetermined service, which is different from the first-party service, a user may be allowed to log in to the first-party service without being requested for the first-party account ID and the password.

In the present embodiment, when a smartphone app is started, the smartphone 3 transmits, to the game server 34, identification information unique to the application (called an "app ID") that represents the app ID of the application having been started. The information of the app ID may be transmitted together with (or as being included in) the information of the login request.

When the information of the login request is received from the smartphone 3, the game server 34 checks with the management server 31 whether or not to permit a login with the smartphone 3 (step S13). Specifically, the game server 34 transmits, to the management server 31, information of a login check request for a login check. The information of the login check request includes the first-party account ID and the password included in the information of the login request received from the smartphone 3. The information of the login check request includes the app ID of the smartphone app having been started.

When the information of the login check request is received from the game server 34, the management server 31 executes a login process (step S14). The login process is a process of determining whether or not a login request from the smartphone 3 is valid and permitting the login if the login request is valid. The login process is executed by using the user management information stored in the management server 31. Note that in other embodiments, the information of the login request may be transmitted from the smartphone 3 directly to the management server 31 (i.e., not via the game server 34). That is, the management server 31 may obtain the information of the first-party account ID and the password directly from the smartphone 3.

Figure 8:
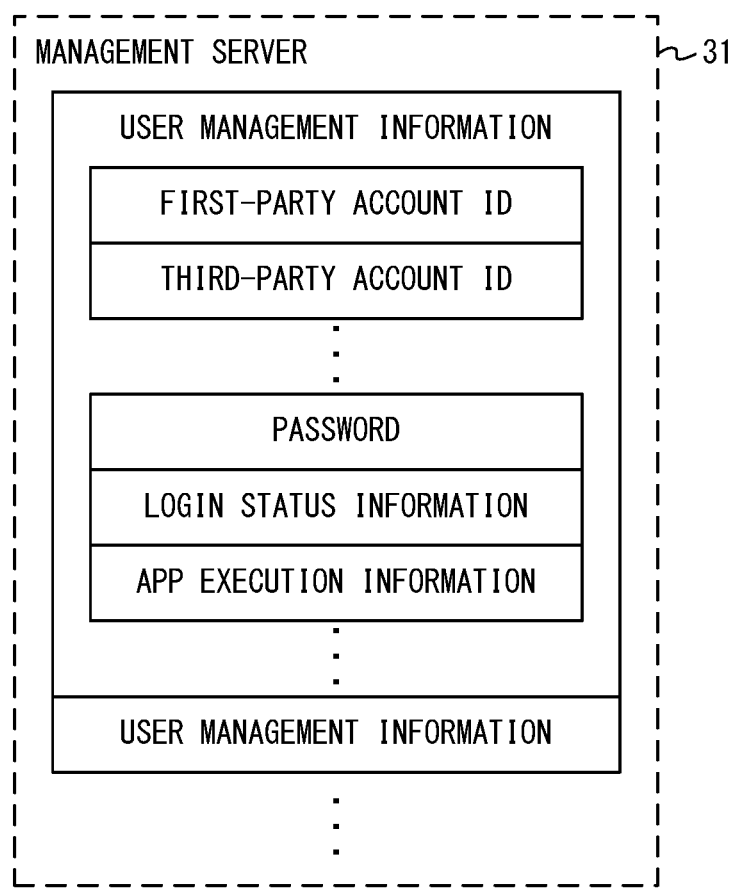
FIG. 8 is a diagram showing an example of user management information stored on a non-limiting management server.

FIG. 8 is a diagram showing an example of user management information stored in the management server. Note that FIG. 8 only shows information that is used in the processes shown in FIG. 7 and FIG. 9, of the various information included in the user management information. As shown in FIG. 7, the user management information includes the first-party account ID and the password. Therefore, in the login process, the management server 31 determines whether or not the first-party account ID and the password received from the game server 34 match the first-party account ID and the password included in the user management information stored in the management server 31.

When the first-party account ID and the password received match the first-party account ID and the password included in the user management information, the management server 31 determines that the login request from the smartphone 3 is valid. In such a case, the management server 31 transmits, to the game server 34, a notification that the login is approved.

On the other hand, when the first-party account ID and the password received do not match the first-party account ID and the password included in the user management information, the management server 31 determines that the login request from the smartphone 3 is not valid. In such a case, the management server 31 transmits, to the game server 34, a notification that the login is not approved. Although not shown in the figures, in such a case, the game server 34 transmits, to the smartphone 3, a notification that the login has failed, and the smartphone 3 notifies the user that the login has failed.

Note that as shown in FIG. 8, the user management information includes login status information. The login status information indicates whether or not a first-party account associated therewith is currently logged in. Therefore, when a login is done (when the login is approved), the management server 31 stores login status information that indicates that the account is logged in and indicates the type of the terminal (i.e., whether it is a smartphone or a game device) that has given the login request. Thus, in the present embodiment, the management server 31 manages the type of the terminal logged in. Note that in other embodiments, the login status information may be information that simply indicates whether the terminal is logged in.

When a different application is started on the smartphone 3 while the smartphone 3 is logged in to a first-party service on an application (smartphone app) being executed, the smartphone 3 does not need to transmit the information of the login request. In such a case, the smartphone 3 may transmit the information of the login request, in which case the management server 31 may check again whether or not the terminal is logged in.

While the first one of the smartphone 3 and the game device 4 has done a login with a first-party account, if the second one of the smartphone 3 and the game device 4 gives a login request with the first-party account, the management server 31 stores the login status information that indicates that the first terminal and the second terminal are both logged in. Note that in other embodiments, in such a case, the management server 31 may not approve the login for the login request from the second terminal.

Although the above description assumes that a login is performed when starting a smartphone app, a login may be performed at any point in time while a smartphone app is being executed. For example, a user may be allowed to perform a login operation in response to the operation of selecting an icon on the menu screen, for example, while a smartphone app is being executed.

In other embodiments, the smartphone 3 may be allowed to log in to a first-party service while the smartphone app is not being executed. For example, the smartphone 3 may accept an instruction from the user to perform a login while the smartphone app is not being executed.

A smartphone app may be an application that can be executed without logging in to a first-party service, or may be an application that can be executed on the condition that the user logs in to a first-party service.

In the process of step S14, when the information of the login check request is received from the game server 34, the management server 31 updates the app execution information based on the app ID included in the information (the app ID of the smartphone app having been started on the smartphone 3). Herein, as shown in FIG. 8, the management server 31 stores, in the storage section thereof, app execution information for each first-party account. The app execution information is information representing an application or applications being executed on the terminal. When the app ID is obtained, the management server 31 updates the app execution information so that information representing the obtained app ID is added thereto. Note that the app execution information to be updated is app execution information that is associated with the first-party account ID included in the login check request.

As described above, in the present embodiment, the execution status of an application on the terminal is managed (or "stored") by the management server 31. Note that the app execution information may include information of the time at which the execution of the application is started.

Note that the management server 31 may create and store the history of use of the application on the terminal based on the app ID and/or the app execution information obtained as described above.

In FIG. 7, the game server 34, having received a notification that the login is approved, transmits game data to the smartphone 3 (step S15). The game data is data that is used for starting the game process on the smartphone app. That is, when the game data is received, the smartphone 3 starts the game process on the smartphone app (step S16). Note that the game data that the smartphone 3 obtains from the game server 34 may include save data stored in the save data server 33 to be described below.

Note that as in the case where a login is performed even when a login is not performed when the smartphone app is started, the smartphone 3 transmits, to the game server 34, information of a request to obtain the game data when the smartphone app is started. In response to the request, the game server 34 transmits the game data to the smartphone 3. The game server 34 transmits the app ID of the smartphone app having been started on the smartphone 3 to the management server 31, and the management server 31 updates the app execution information so that information representing the obtained app ID is added thereto, as in the process of step S14.

Herein, in the present embodiment, the smartphone app is executed on the condition that the smartphone 3 can access the game server 34 when the application is started. In other words, by the game data received from the game server 34 when the smartphone app is started, the smartphone 3 can start the execution of the process of the smartphone app (i.e., the game process). For example, in the process of step S11, if the smartphone 3 is unable to communicate with the game server 34, the execution of the smartphone app is not started on the smartphone 3, so that the standby state when starting the smartphone app continues. Note that in such a case, if the smartphone 3 is unable to communicate with the game server 34 (i.e., unable to receive the game data from the game server 34) even after a certain amount of time, the start of the smartphone app may be aborted, or the user may be notified.

During the execution of the smartphone app, the smartphone 3 executes the game process based on the program of the smartphone app (step S17). Herein, in the smartphone app, the game process proceeds with the smartphone 3 and the game server 34 communicating with each other at appropriate points in time. That is, with the smartphone 3, information of a process request is transmitted to the game server 34 at an appropriate point in time. The information of the process request is for requesting the game server 34 for the game data used in the game process or for requesting the game server 34 to execute the game process. For example, in response to the user clearing a game level being played, the smartphone 3 requests the game server 34 for data that is needed for starting the game at the next game level.

When the information of the process request is received, the game server 34 executes the game process in accordance with the request and transmits the game data to the smartphone 3 (step S18). For example, the game server 34 transmits game data in accordance with the request from the smartphone 3 to the smartphone 3, or executes a game process in accordance with the request from the smartphone 3 to transmit game data obtained as a result of executing the game process to the smartphone 3.

While the smartphone app is executed on the smartphone 3, the process of steps S17 and S18 is repeated. Then, in response to an end instruction from the user, the smartphone 3 ends the smartphone app (step S19).

On the other hand, the game server 34 determines whether the smartphone 3 (in other words, the first-party account corresponding to the smartphone 3) has logged out (step S20). Although there is no particular limitation on the specific method for making the determination, the game server 34 makes the determination based on the access from the smartphone 3 (in other words, the process request in step S17) in the present embodiment. Specifically, the game server 34 determines that the smartphone 3 has logged out when there is no access from the smartphone 3 that is logged in for a predetermined amount of time or longer. On the other hand, the game server 34 determines that the smartphone 3 is maintaining the login status while an access is made from the smartphone 3 that is logged in with an interval that is shorter than a predetermined amount of time.

Note that in other embodiments, when ending the smartphone app, the smartphone 3 may give a notification that it is logging out from the first-party service to which the terminal has been logged in with the first-party account ID. That is, the smartphone 3 transmits information of a log-out request to the game server 34. In other embodiments, while the smartphone app is being executed, the smartphone 3 may transmit the information of the log-out request to the management server 31 in response to a log-out instruction from the user. The information of the log-out request includes information of the first-party account ID with which the terminal has been logged in. The information of the log-out request also includes the app ID of the smartphone app of which the execution is ended. When the information of the log-out request is received from the smartphone 3, the game server 34 determines that the smartphone 3 has logged out.

When it is determined that the smartphone 3 has logged out, the game server 34 transmits the information of a log-out notification to the management server 31 (FIG. 7). The information of the log-out notification includes the first-party account ID corresponding to the smartphone 3, and the app ID of the smartphone app managed by the game server 34.

When the information of the log-out notification is received from the game server 34, the management server 31 executes the log-out process (step S21). That is, the management server 31 stores information indicating that the smartphone 3 has logged out, as the login status information associated with the first-party account ID included in the information of the log-out notification. When the information of the log-out notification is received, the management server 31 updates the app execution information so that the information of the app ID included in the received information is removed therefrom.

Note that when the information of the log-out notification is received, if the smartphone 3 identified by the log-out notification is having another smartphone app, different from the smartphone app whose execution has been ended, being executed thereon, the management server 31 maintains the login status of the smartphone 3. That is, in such a case, the management server 31 does not update the login status information. Thus, the login status information continues to indicate that the smartphone 3 is logged in. Note that whether or not the smartphone 3 is having the other smartphone app being executed thereon can be determined based on the app execution information.

Note that whether or not the smartphone 3 has logged out can be checked by the management server 31. For example, the management server 31 may receive, from the game server 34, information of the time of last access of the smartphone 3 to the game server 34, and determine whether or not the smartphone 3 has logged out based on the information of the time of last access.

(3-3) Basic Process Performed on Game Device

Figure 9:
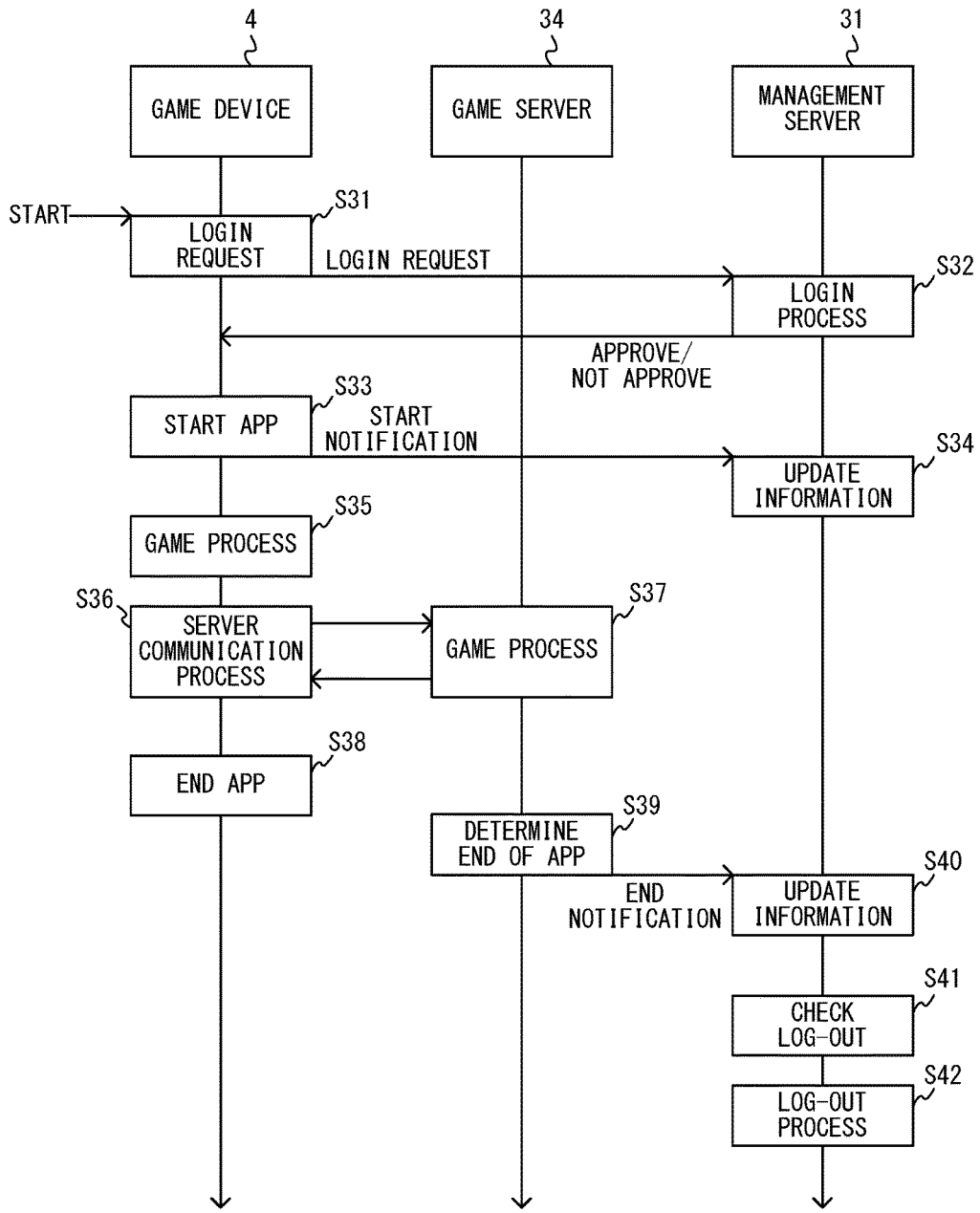
FIG. 9 is a diagram showing an exemplary flow of a basic process executed on a non-limiting game device.

Next, as a basic process performed on the game device 4, an exemplary process from when the game device 4 is started until it is turned off (e.g., until it is switched off or until it is put to sleep mode) will be described. FIG. 9 is a diagram showing an exemplary flow of a basic process performed on the game device. Note that the process executed on the game device 4 is not limited to the process shown in FIG. 9, and a process (to be described below) not shown in FIG. 9 may be executed depending on the game device app started.

First, when the game device 4 is started, (e.g., when it is switched on or when it resumes from sleep), the game device 4 logs in to a first-party service (specifically, the service relating to the game of the game device app) with the first-party account ID (step S31). Specifically, the game device 4 transmits information representing a login request to the management server 31. This information includes the first-party account ID and the password of the user.

As described above, in the present embodiment, a login is performed on the game device 4 (unlike on the smartphone 3) in a period during which no game device app is being executed. Note that the time of login for the game device 4 is not limited to when the game device 4 is started. For example, the time of login for the game device 4 may be when the user gives a login instruction. Note that in other embodiments, also on the game device 4 (as on the smartphone 3), a login may be performed while a game device app is being executed from the game device app being executed.

When the information of the login request is received from the game device 4, the management server 31 executes the login process (step S32). That is, the management server 31 determines whether or not the login request is valid, as in the login process of step S14. The management server 31 also updates the login status information as necessary. Note however that the app execution information is not updated in the login process of step S32. Moreover, the management server 31 transmits, to the game device 4, a notification that the login is approved or a notification that the login is not approved. Although not shown in the figures, when a notification that the login is not approved is received, the game device 4 notifies the user that the login has failed.

In response to a start instruction from the user, the game device 4 starts (i.e., opens) a game device app (step S33). The start instruction is an instruction of specifying an icon of the game device app included in the menu screen displayed on the display section 28, for example. When the game device app is started, the game device 4 transmits information of an app start notification to the management server 31. The information of the app start notification includes the first-party account ID used for the login, and the app ID of the game device app started.

When the information of the app start notification is received from the game device 4, the management server 31 updates the app execution information based on the app ID included in the information of the app start notification (step S34). The process of step S34 is similar to the process of updating the app execution information in the login process of step S14. That is, the management server 31 updates the app execution information associated with the first-party account ID included in the information of the app start notification so that information representing the obtained app ID is added thereto.

After the game device app is started, the game device 4 starts the game process of the game device app (step S35). Note that in the present embodiment, the save data used at the start of the game process of the game device app is stored in the storage section 25 of the game device 4 (or the game card attached to the game device 4). Therefore, when the game device app is started, the game device 4 does not access the game server 34. Thus, as opposed to a smartphone app, a game device app is executed without requiring the condition that the game device 4 be able to access the first-party service server 1 (the management server 31 or the game server 34) at the time of starting the app.

As described above, in the present embodiment, the game device 4 starting a game device app does not communicate with the game server 34 at the time of starting the game device app. Note however that in other embodiments, the game device 4 may communicate with the game server 34 at the time of starting the game device app. That is, the game device 4 may communicate with the game server 34 at the time of starting the app, and start the game process using the game data received from the game server 34. Note that even in a case where the game device 4 communicates with the game server 34 at the time of starting the game device app, the game device app may be executed without requiring the condition that the game device 4 be able to access the first-party service server 1 at the time of starting the app. That is, the execution of the game device app may be started even when the game device 4 fails at an attempt to communicate with the game server 34 at the time of starting the app.

During the execution of the game device app, the game device 4 executes a server communication process in response to an instruction from the user (step S36). Herein, the server communication process is a game process in which the terminal communicates with the game server 34. For example, the server communication process is a game process for playing a multi-player game with other users via the game server 34, or a game process using the save data stored in the save data server 33 to be described below. In the server communication process, the game device 4 performs the game process by communicating with the game server 34 at appropriate points in time.

When there is an end instruction from the user, the game device 4 ends the game device app being executed (step S38).

In the present embodiment, the game server 34 checks whether the execution of the game device app by the game device 4 has been ended (step S39). Although there is no particular limitation on the specific method for making this determination, the game server 34 makes this determination based on the access from the game device app to the game server 34 (in other words, an access by the server communication process) in the present embodiment. Specifically, the game server 34 determines that the execution of the game device app has been ended when there is no access from the game device app for a predetermined amount of time or longer. On the other hand, the game server 34 determines that the game device app is being executed when an access is made from the game device app with an interval that is shorter than a predetermined amount of time.

Note that in other embodiments, when the game device app being executed is ended, the game device 4 may transmit, to the management server 31, information that indicates that the game device app has been ended. This information includes the first-party account ID with which the terminal is logged in and the app ID of the game device app that is ended. When the information is received, the game server 34 determines that the execution of the game device app that is identified by this information has been ended.

When the game device 4 determines that the game device app has been ended, the game server 34 transmits, to the management server 31, information of an end notification indicating that the game device app has been ended (FIG. 9). The information of the end notification includes the app ID of the game device app that has been ended, and the first-party account ID with which the game device 4, on which the game device app has been executed, is logged in.

When the end notification is received, the management server 31 executes the process of updating the app execution information (step S40). That is, the management server 31 updates the app execution information associated with the first-party account ID included in the information of the end notification so that the app ID included in the information of the end notification is removed therefrom.

In the present embodiment, the management server 31 determines whether the game device 4 (in other words, the first-party account corresponding to the game device 4) has logged out (step S41). Although there is no particular limitation on the specific method for making this determination, the management server 31 makes this determination based on the access from the game device 4 in the present embodiment. As opposed to the access in step S39 described above, the "access from the game device 4" is an access from the OS of the game device 4, rather than an access from a particular game device app. Specifically, in the present embodiment, the OS of the game device 4 automatically gives information representing a predetermined request at a predetermined point in time to the management server 31. For example, the predetermined request to transmit information (e.g., information relating to the update of the OS or the game device app and/or information relating to an announcement for the user) from the management server 31 to the game device 4. For example, the predetermined point in time is a point in time that arrives at a rate of once per a predetermined amount of time (see step S62 to be described below). Therefore, based on whether or not the request is being continuously received from the game device 4, the management server 31 can determine whether the game device 4 is on or turned off.

Specifically, the management server 31 determines that the game device 4 has logged out when the access (in other words, the predetermined request) from the OS of the game device 4 is absent for a predetermined amount of time or longer. On the other hand, the management server 31 determines that the game device 4 is maintaining the login status while the access is made from the game device 4 with an interval that is shorter than a predetermined amount of time.

Note that in other embodiments, the game device 4 may transmit the information of the log-out request to the management server 31 when the game device 4 is turned off (e.g., when it is switched off or when it is put to sleep mode). In other embodiments, the game device 4 may transmit the information of the log-out request to the management server 31 in response to a log-out instruction from the user. The information of the log-out request includes information of the first-party account ID with which the terminal has been logged in. When the log-out request is received from the game device 4, the management server 31 determines that the game device 4 has logged out.

When it is determined that the game device 4 has logged out, the management server 31 executes the log-out process (step S42). That is, the management server 31 stores information indicating that the game device 4 has logged out, as the login status information associated with the first-party account ID corresponding to the game device 4.

Note that in other embodiments, the management server 31 may determine whether the game device 4 has logged out by a similar method to that for determining whether the smartphone 3 has logged out (step S20 described above). That is, when it is determined that the execution of the game device app on the game device 4 has been ended in the process of step S39, the management server 31 may determine that the game device 4 has logged out.

(Differences Between Smartphone App Process and Game Device App Process)

Herein, a smartphone app and a game device app are applications that can be executed on different types of information processing devices, and can be said to be different types of applications. It can be said that the game process of a smartphone app and the game process of a game device app are also different from each other as follows.

As described above, in the present embodiment, a smartphone app requires the condition that the smartphone 3 be able to access a server (i.e., the game server 34) for executing the process of the smartphone app. On the other hand, a game device app is an application that does not require the condition that the game device 4 be able to access a server for executing the process of the game device app.

Also, a smartphone app and a game device app are different from each other in terms of the condition on which the game server 34 is accessed while the process of the application is being executed. That is, on a smartphone app, the smartphone 3 accesses the game server 34 to obtain game data from the game server 34 (step S17) automatically (i.e., irrespective of the presence/absence of a user instruction to access the game server 34) in response to satisfaction of the condition relating to how the game process is proceeding. In contrast, on a game device app, the game device 4 accesses the game server 34 to obtain game data from the game server 34 in response to an instruction from the user to access the game server 34 (step S36). For example, the game device 4 transmits the save data to the game server 34 in response to the user giving an instruction to save the game content, or the game device 4 communicates with the game server 34 in response to the user giving an instruction to play a multi-player game with other users. Note that it can be said that the frequency of accessing the game server 34 is normally higher with a smartphone app than with a game device app.

(3-4) Process of Purchasing Game Device App Using Smartphone

Next, referring to FIG. 10 to FIG. 14, an exemplary process of purchasing a game device app using the smartphone 3 and downloading the purchased game device app to the game device 4. In the present embodiment, while a smartphone app is being executed on the smartphone 3, an advertisement for a game device app is presented to the user, and the user can purchase the game device app using the smartphone 3. Then, the purchased game device app is downloaded to the game device 4 owned by the user. Thus, it is possible to motivate a user using a smartphone app on the smartphone 3 to purchase a game device app, and to promote the use of the game device app using the smartphone app as a trigger. The details will now be described.

Figure 10:
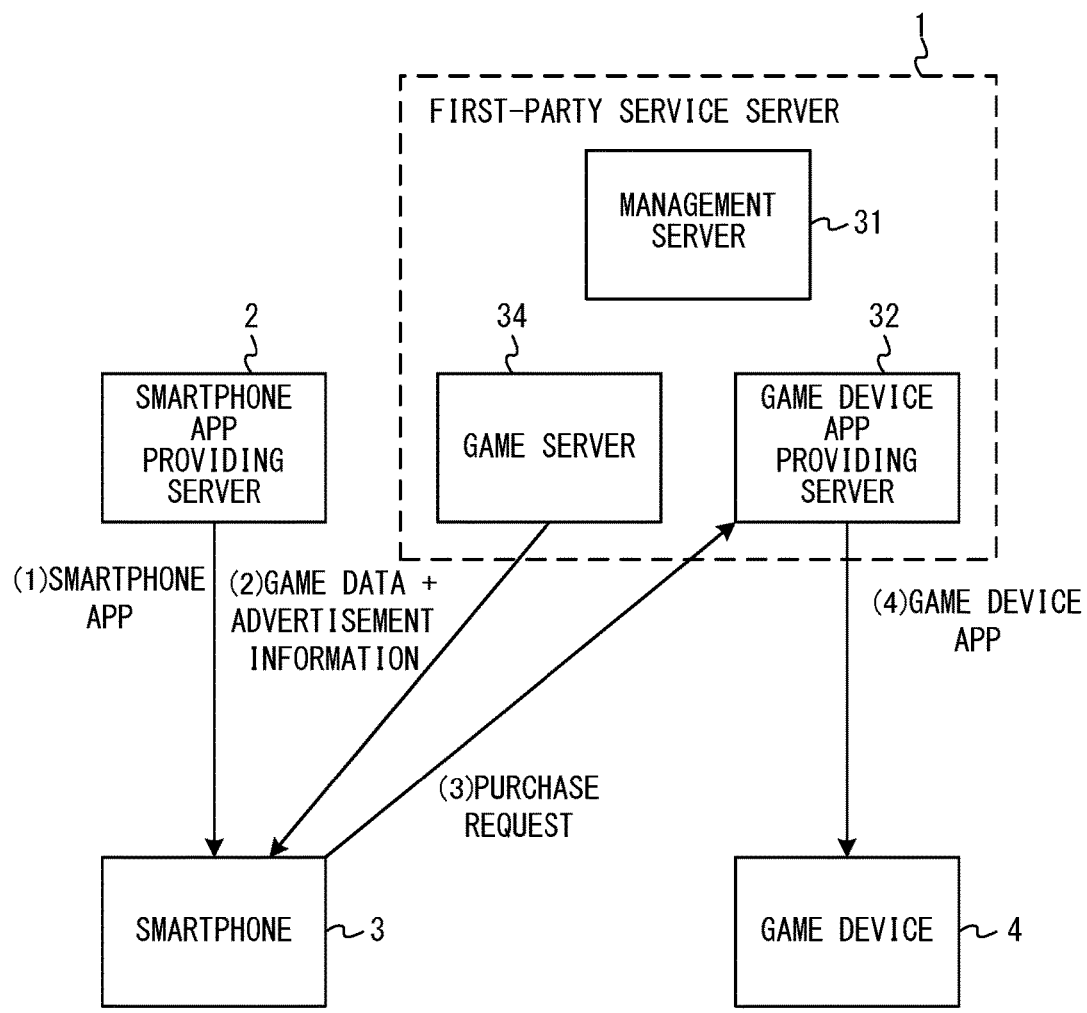
FIG. 10 is a diagram showing an exemplary outline of a process of purchasing a game device app using a non-limiting smartphone.
Figure 11:
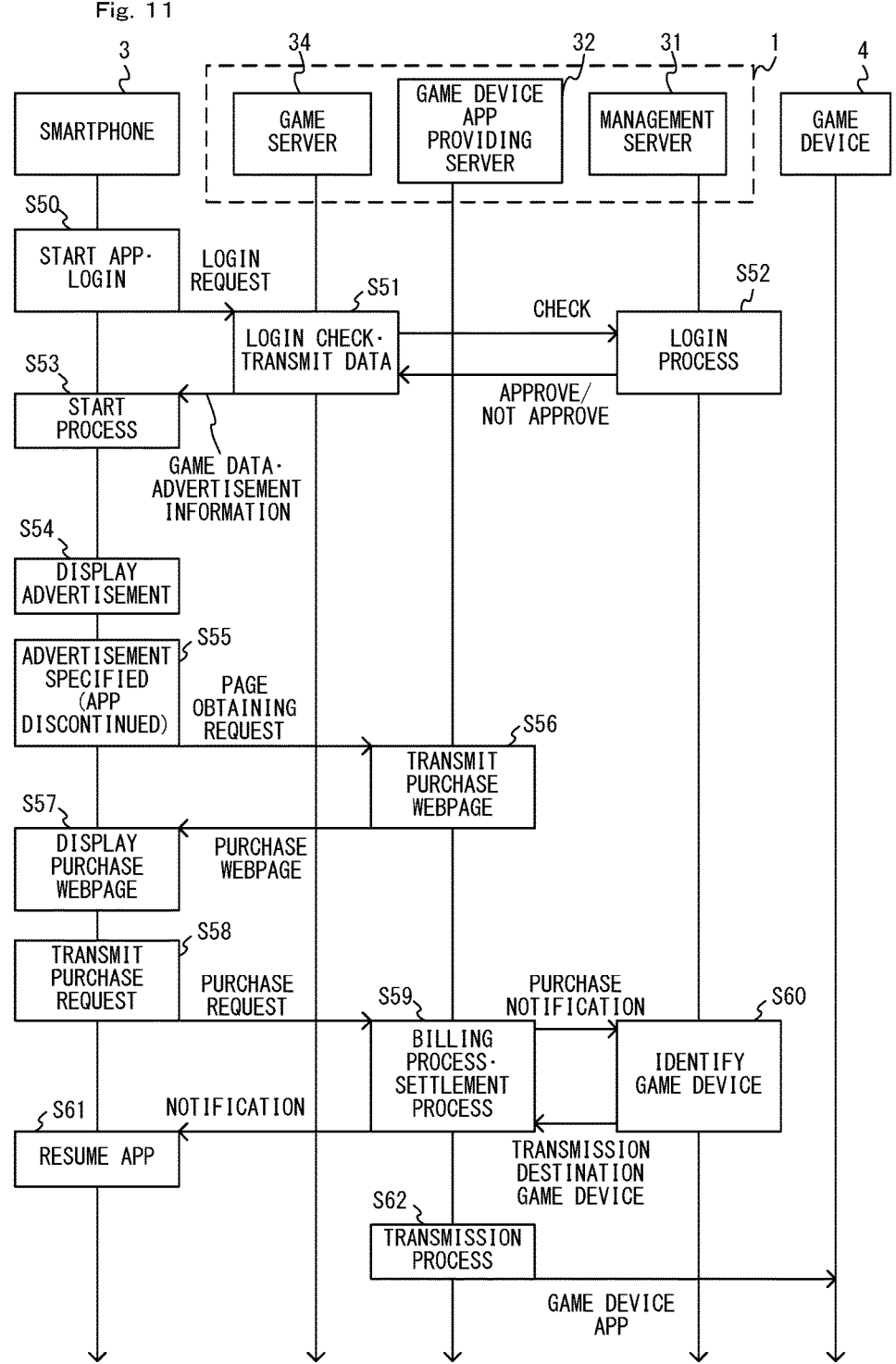
FIG. 11 is a diagram showing an exemplary flow of a process of purchasing a game device app using a non-limiting smartphone.

FIG. 10 is a diagram showing an exemplary outline of a process of purchasing a game device app using the smartphone 3. FIG. 11 is a diagram showing an exemplary flow of a process of purchasing a game device app using the smartphone 3.

First, a smartphone app (herein, a game application) provided from the smartphone app providing server 2 is downloaded and installed in advance on the smartphone 3 ((1) shown in FIG. 10).

In FIG. 11, the smartphone 3 starts (i.e., opens) the smartphone app in response to a start instruction from the user, and performs a login (step S50). Note that the process of step S50 is a process similar to the process of steps S11 and S12 shown in FIG. 7. In response to the process of step S50, the game server 34 executes a login check process similar to the process of step S13 shown in FIG. 7 and a game data transmitting process similar to the process of step S15 (step S51). That is, the game server 34 performs a login check with the management server 31 and, if the login is approved by the management server 31, transmits game data to the smartphone 3 (step S51). At this point, the management server 31 performs a login process similar to step S14 shown in FIG. 7 (step S52). The smartphone 3 starts the game process using the received game data (step S53). Note that the series of processes of steps S50 to S53 is similar to the process of steps S11 to S16 described in "(3-2) Basic process performed on smartphone" above.

(Presentation of Advertisement Information)

Herein, in this exemplary process, when a notification that the login is approved is received from the management server 31, the game server 34 transmits game data and advertisement information to the smartphone 3 ((2) shown in FIG. 10, step S51 shown in FIG. 11). Thus, in the present embodiment, the game server 34 transmits advertisement information to the smartphone 3 while being logged in to a first-party service on a smartphone app.

Note however that in other embodiments, the game server 34 may transmit advertisement information to the smartphone 3 while not being logged in. For example, when game data is exchanged between the smartphone 3 and the game server 34 while a smartphone app is being executed, advertisement information may be transmitted together with game data to the smartphone 3 even while not being logged in.

When the advertisement information is received, the smartphone 3 displays a advertisement image based on the advertisement information within the smartphone app (step S54 shown in FIG. 11). Thus, an advertisement is presented to the user using the smartphone app.

Herein, advertisement information is information that represents an advertisement to be presented on the smartphone 3, and it in the present embodiment represents a advertisement for a game device app. While there is no particular limitation on the game device app corresponding to the advertisement, it is a game device app related to the smartphone app being executed (i.e., a smartphone app in which an advertisement image to be described later is displayed), for example. Specifically, the game device app corresponding to the advertisement may be a game application of the same series as the smartphone app (e.g., a game application that is a sequel to the smartphone app). The game device app corresponding to the advertisement may be a game application that is capable of using the game data of the smartphone app being executed (e.g., a game application that uses characters appearing in the smartphone app). The game device app corresponding to the advertisement may be a game application that is capable of sharing save data with the smartphone app being executed (see "(3-5) Process of sharing save data between smartphone app and game device app" to be described below). The game device app corresponding to the advertisement may be a game application for which the app friend list is shared with the smartphone app being executed (see "(3-7) Process of sharing friend list between smartphone and game device" to be described below).

Herein, user-related information is stored in the user management information stored in the management server 31. The content of the advertisement information may be determined based on this user-related information. The user-related information is information such as, for example, history information of the user (e.g., the history of use of applications or the history of purchases of applications) and/or personal information (e.g., name, sex, age, address, region, etc.). For example, the history information may be generated and stored based on the history of the login status information described above. For example, the management server 31 may generate information representing the login or logout history of the user based on the login request and the log-out notification described above, or may generate information representing the user's history of use of applications based on the app start notification and end notification described above. The personal information may be based on information that is input by the user when registering the first-party account.

In other embodiments, the management server 31 may store information that associates app IDs of smartphone apps and content of advertisement information, and may determine advertisement information based on that information. That is, the management server 31 may obtain from the smartphone 3 the app ID of the smartphone app being executed on the smartphone 3 (may obtain the app ID in the login process), and determine the content of advertisement information that is associated with the obtained app ID. In other embodiments, the content of advertisement information may be determined based on the smartphone app being executed and the user-related information.

In the present embodiment, the management server 31 determines the content of advertisement information based on the user-related information. For example, the management server 31 may determine the content of advertisement information by predicting the user's preferences based on the history information. Specifically, the management server 31 may determine advertisement information for a game device app in accordance with the predicted user's preferences. The management server 31 transmits the determined advertisement information to the game server 34. For example, the management server 31 transmits the advertisement information to the game server 34, together with the above-described notification that the login is approved. The game server 34 transmits the advertisement information received from the management server 31 to the smartphone 3. Note that in other embodiments, the management server 31 may transmit the advertisement information directly to the smartphone 3.

In other embodiments, the determination of advertisement information may be done on the game server 34, instead of the management server 31, or may be done in cooperation between the management server 31 and the game server 34. For example, the management server 31 may transmit a part or whole of the user-related information to the game server 34, and the game server 34 may determine the content of advertisement information based on the received user-related information. Note that the content of advertisement information may be determined based on the points information to be described below (which can be said to be information representing the smartphone app use record, the details of which will be described later; see "(3-6) Process of managing points on first-party service server 1 in accordance with use of services provided by smartphone apps" to be described below). For example, the content of advertisement information may be determined in accordance with the number of points represented by the points information (in other words, the number of points awarded to the user).

Figure 12:
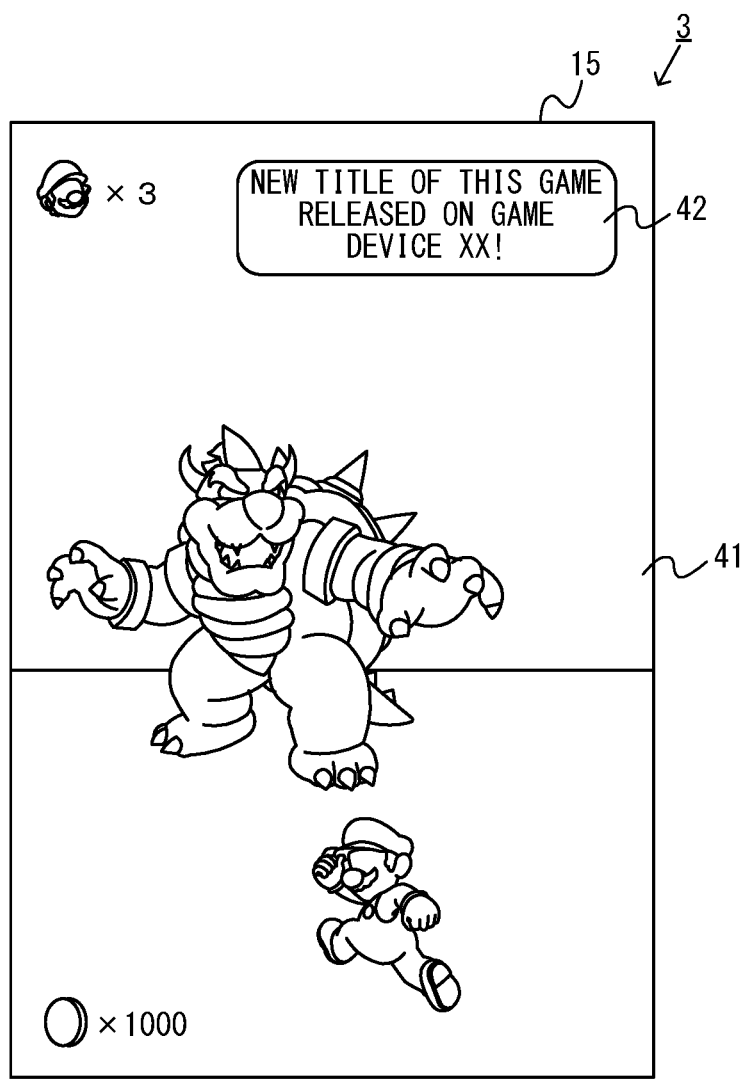
FIG. 12 is a diagram showing an exemplary game image including an advertisement image displayed on a non-limiting smartphone.

In the process of step S54, the smartphone 3 generates an advertisement image based on the advertisement information, and displays an image (herein, a game image) of the smartphone app on the display section 15, with the advertisement image included therein. FIG. 12 is a diagram showing an exemplary game image including an advertisement image displayed on the smartphone 3. In FIG. 12, an advertisement image 42 is displayed, together with a game image 41, on the display section 15 of the smartphone 3. For example, the advertisement image 42 includes a message introducing the game device app such as "New title of this game released on game device xx!" (xx is the brand name of the game device). Note that there is no particular limitation on the content of the advertisement image 42, and it may include a message and/or a graphic design representing the advertisement. The advertisement image 42 may also be a video.

Note that the advertisement image 42 may be displayed at any point in time in a period during which the game image of the smartphone app is displayed on the display section 15. For example, the advertisement image 42 may be displayed together with the game image in the game, as shown in FIG. 12. For example, when a screen for displaying an announcement is provided in a smartphone app, the advertisement image 42 may be displayed as one such announcement. The smartphone 3 may first display, on the display section 15, a notification image indicating that the advertisement information has been received, and display the advertisement image 42 in response to a user instruction to display the advertisement image 42 (e.g., an instruction to touch the notification image).

(Purchasing Game Device App)

In the present embodiment, the user can purchase a game device app relating to the advertisement image while the user is using a smartphone app. The process for purchasing a game device app will now be described.

When a predetermined operation is performed by the user while the advertisement image 42 is displayed on the display section 15 of the smartphone 3, the smartphone 3 displays, on the display section 15, a purchase webpage for purchasing the game device app represented by the advertisement image 42. The predetermined operation is for example an operation of specifying the advertisement image 42 (more specifically, an operation of touching the advertisement image 42). In response to the predetermined operation, the smartphone 3 transmits, to the game device app providing server 32, information of a request for obtaining the purchase webpage (referred to as a page obtaining request) (step S55 shown in FIG. 11). In the present embodiment, the purchase webpage is a webpage provided by the game device app providing server 32. The game device app providing server 32 having received information of the page obtaining request from the smartphone 3 transmits the purchase webpage corresponding to the page obtaining request to the smartphone 3 (step S56 shown in FIG. 10).

Note that in the present embodiment, the advertisement information received by the smartphone 3 includes link information (e.g., information representing the URL) to the purchase webpage, and the smartphone 3 transmits, to the game device app providing server 32, information of the page obtaining request based on the link information. Then, the game device app providing server 32 transmits data of the purchase webpage corresponding to the link information to the smartphone 3. Note that in other embodiments, the information of the page obtaining request may include information representing the game device app represented by the advertisement information (e.g., the ID of the application). Then, the game device app providing server 32 transmits, to the smartphone 3, the data of the purchase webpage of the game device app represented by the received information.

The smartphone 3 displays, on the display section 15, the purchase webpage received from the game device app providing server 32 (step S57 shown in FIG. 10). Then, the smartphone 3 pauses the process by the smartphone app in response to the operation of obtaining the purchase webpage described above (i.e., the operation by the user of specifying the advertisement image 42). For example, the smartphone 3 stops accepting inputs to the game process, and pauses the progress of the game. Then, the smartphone 3 displays the purchase webpage on the display section 15 using a browser app. That is, the image displayed on the display section 15 is switched from the game image by the smartphone app to the image of the purchase webpage by the browser app. In response to this, the smartphone 3 starts accepting inputs to the purchase webpage.

Figure 13:
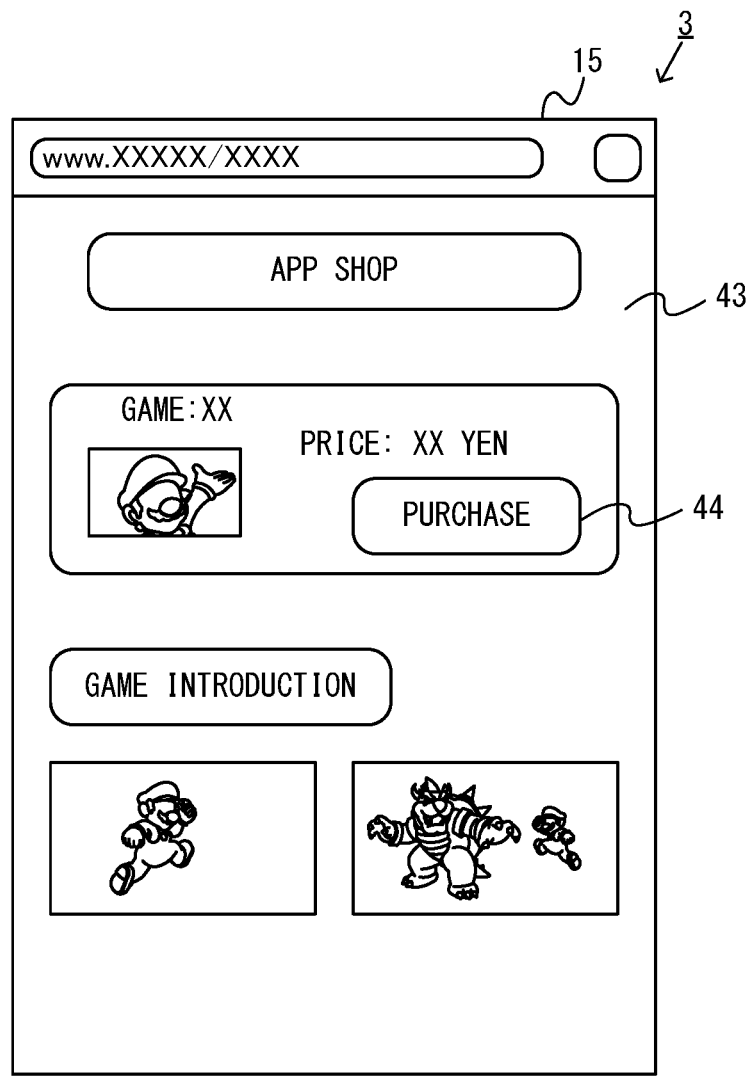
FIG. 13 is a diagram showing an exemplary image of a purchase webpage displayed on a non-limiting smartphone.

FIG. 13 is a diagram showing an exemplary image of the purchase webpage displayed on the smartphone 3. As shown in FIG. 13, a purchase webpage image 43 is a webpage for purchasing a game device app, and represents information relating to the game device app (e.g., information relating to the price and the introduction of the game content). The purchase webpage image 43 includes an instruction image 44 for giving a purchase instruction.

Note that although the purchase webpage is a webpage provided by a game device app providing server 32, which provides so-called shopping websites, in the present embodiment, there is no particular limitation on the type of the purchase webpage. For example, in other embodiments, it may be a webpage in a homepage for introducing a game device app. Then, if the server providing the homepage is separate from the game device app providing server 32, the purchase webpage may be obtained from the server. The purchase webpage is not limited to a webpage obtained from a server, but may be an image generated by a smartphone app.

The smartphone 3 does not need to switch the image displayed on the display section 15 from the game image by the smartphone app to the purchase webpage. For example, the image of the purchase webpage may be displayed so as to be superimposed over (in other words, on the side closer to the viewer) the game image by the smartphone app. Note that the smartphone 3 may execute a plurality of applications by multitasking. Then, the smartphone 3 may execute the smartphone app and the browser app by multitasking so as to display the image by the browser app (i.e., the purchase webpage) over the image by the smartphone app (i.e., the game image).

The user can give an instruction to purchase a game device app by specifying the instruction image 44 included in the purchase webpage image 43. That is, the smartphone 3 transmits the information of the purchase request relating to the game device app to the game device app providing server 32 in response to an operation by the user of specifying the instruction image 44 (e.g., an operation of touching the instruction image 44) ((3) shown in FIG. 10, step S58 shown in FIG. 11). The information of the purchase request includes information with which it is possible to specify an account with which the terminal is logged in. Note that in the present embodiment, the information of the purchase request includes a first-party account ID.

When the information of the purchase request is received, the game device app providing server 32 executes a billing process (step S59 shown in FIG. 11). The billing process is a process of billing a charge for the user and, specifically, is a process of notifying the user of the billing of the charge. In the present embodiment, when a purchase instruction for a game device app is given on the purchase webpage on the smartphone 3, a billing webpage for notifying the user that the user is to be billed for the game device app is displayed. That is, the game device app providing server 32 transmits the billing webpage to the smartphone 3. The smartphone 3 receives the billing webpage from the game device app providing server 32 and displays the billing webpage on the display section 15.

In the present embodiment, the user can make the payment for the charge billed on the billing webpage. That is, the payment method (in other words, the settlement method) can be selected on the billing webpage, and the payment for the charge for the game device app is made by the method selected by the user. Note that there is no particular limitation on the charge settlement method, and any method may be used. For example, the first-party service server 1 may manage points (which can be said to be a virtual currency) that can be used for the first-party service, and the settlement may be done using the points. The first-party service server 1 may perform a settlement through "carrier payment". Note that the carrier payment is a method of doing a settlement through a communications business entity (i.e., a communications carrier) of the smartphone 3, together with the charge for the use of the smartphone 3. The first-party service server 1 may perform settlements using a settlement agency service run by a third-party business entity that is different from the first-party business entity. In addition, the first-party service server 1 may perform settlements through credit card settlement or bank transfer. In the present embodiment, the user selects a settlement method from among some of the plurality of settlement methods described above.

When an instruction to select a settlement method is given by the user on the billing webpage, the smartphone 3 transmits, to the game device app providing server 32, payment instruction information indicating that the user is to make a payment. The payment instruction information includes information representing the settlement method selected as described above. When the payment instruction information is received, the game device app providing server 32 performs a settlement process as necessary. The settlement process refers to a process of collecting the charge to be paid by the user in response to a billing notification. For example, when the settlement is made using the points described above, the game device app providing server 32 subtracts a number of points in accordance with the charge for the game device app from the points stored in association with the first-party account ID included in the information of the purchase request. In the case of a settlement method in which the charge is collected by a third-party business entity other than the first-party business entity (e.g., in the case of a settlement method such as the carrier payment or the settlement agency service described above), the game device app providing server 32 gives the server of the collecting third-party business entity a notification that requests to collect the charge. When the collection is complete, a notification notifying that the collection is complete is received from the server of the third-party business entity.

When the payment instruction information is received, the game device app providing server 32 transmits, to the smartphone 3, a notification that an instruction relating to billing and settlement has been received. When this notification is received, the smartphone 3 resumes the smartphone app whose process execution has been paused (step S61 shown in FIG. 11). Specifically, the smartphone 3 stops displaying the billing webpage (e.g., the browser app for displaying the billing webpage is ended), and a game image by the smartphone app is displayed on the display section 15. Then, the smartphone 3 resumes accepting an input to the game process. Note that the game image to be displayed upon resumption may be the game image that was displayed at the point in time when the smartphone app was paused. Thus, the image displayed on the display section 15 is switched from the billing webpage by the browser app to the game image by the smartphone app. Thus, the smartphone app (in other words, a game by the smartphone app) is resumed on the smartphone 3.

Note that if the terminal has not logged in with the first-party account at the point in time when the user gives a purchase instruction (at the point in time of step S58), the game device app providing server 32 may request the smartphone 3 (in other words, the user of the smartphone 3) to log in and may execute the billing process (and the settlement process as necessary) on the condition that the terminal log in.

When the information of the purchase request is received, the game device app providing server 32 transmits information of a purchase notification to the management server 31. The information of the purchase notification includes the information of the first-party account ID included in the information of the purchase request. In the present embodiment, the information of the purchase notification includes information representing the content of purchase.

When the information of the purchase notification is received from the game device app providing server 32, the management server 31 identifies the game device to which the purchased game device app is transmitted (step S60 shown in FIG. 11). The management server 31 identifies the first-party account corresponding to the user who has made the purchase based on the information of the first-party account ID included in the information of the purchase notification, and identifies, as the destination game device, the game device that is associated with the identified first-party account.

Specifically, the destination game device is identified based on the information of the first-party account ID received from the game device app providing server 32 and the user management information stored in the management server 31. As shown in FIG. 6, the first-party account ID and the game device ID are stored in association with each other in the user management information. The management server 31 identifies, as the destination game device, the game device represented by the game device ID associated with the information of the first-party account ID received from the game device app providing server 32. The management server 31 transmits information representing the identified destination game device (the information of the game device ID in the present embodiment) to the game device app providing server 32.

In the present embodiment, the management server 31 updates the points information stored therein based on the information representing the content of purchase included in the information of the purchase notification (the details of which will be described in "(3-6) Process of managing points on first-party service server 1 in accordance with use of services provided by smartphone apps" below).

After the information of the transmission destination game device ID is received from the management server 31, the game device app providing server 32 transmits the data of the game device app of the purchase request to the game device 4 represented by the transmission destination game device ID. Note that the data of the game device app may be transmitted on the condition that the completion of the settlement (in other words, payment) for the charge for the game device app has been confirmed.

There may be cases where a plurality of game devices are associated with one first-party account (i.e., where a plurality of transmission destination game device IDs are associated with one first-party account ID in the user management information). In such a case, the management server 31 may select one of a plurality of game devices to which the game device app is transmitted, and transmit the information of the transmission destination game device ID of the selected game device to the game device app providing server 32. While there is no particular limitation on the selection method, the management server 31 may select one game device in accordance with an instruction from the user or may select the game device based on when it was registered with the first-party account (e.g., may select the last game device registered), for example.

A plurality of game devices associated with one first-party account may be game devices of different types (e.g., different platforms). For example, a home-console game device and a portable game device may be associated with one first-party account. Then, the management server 31 may select, as a game device to which a game device app is transmitted, a game device that corresponds to the game device app (i.e., the game device that is capable of executing the game device app). Then, the management server 31 can appropriately select a game device to which a game device app is transmitted. For example, the management server 31 may store information in which app IDs of game device apps are associated with types of game devices, and select a game device to which a game device app is transmitted based on this information.

When information representing the destination game device is received from the management server 31, the game device app providing server 32 transmits the game device app to the destination game device ((4) shown in FIG. 10, step S62 shown in FIG. 11). In the present embodiment, the game device app providing server 32 transmits a game device app to the game device 4 by push transmission. In the present specification, the meaning of push transmission does not only include transmission methods in which information is actually transmitted by being pushed, but also includes transmission methods in which information appears to the user to be transmitted by being pushed. That is, in the present specification push transmission (also referred to as "push distribution"; note however that in the present specification, the meaning of "push distribution" does not only refer to a mode in which information is transmitted to a plurality of devices, but also refers to a mode in which information is transmitted to one device) refers to a transmission method in which information (herein, a game device app) is automatically transmitted to the destination, irrespective of the presence/absence of a user instruction to transmit the information. Therefore, in the present specification, not only a mode in which a the game device app providing server 32 transmits a game device app to the game device 4 even when there is no request from the game device 4, but also a mode in which the game device 4 transmits a request to the game device app providing server 32 irrespective of the presence/absence of the user instruction described above and the game device app providing server 32 transmits a game device app to the game device 4 in response to the request, is referred to as "push transmission".

In the present embodiment, the game device 4 transmits information representing a request to transmit information automatically (in other words, irrespective of the presence/absence of an instruction from the user), at a predetermined point in time, to the game device app providing server 32 (and the management server 31). Specifically, the predetermined point in time includes (a) a point in time when the game device 4 is turned on, (b) a point in time when an application is started on the game device 4, (c) a point in time when the execution of the application is ended on the game device 4, (d) a point in time when communication via a network becomes available on the game device 4, and (e) a point in time that comes at a rate of once per a predetermined amount of time. At such points in time as described above, the game device 4 transmits the information representing the request to the game device app providing server 32 even when there is no instruction from the user. Note that in other embodiments, the game device 4 may transmit the request information at some of the points in time (a) to (e) described above.

When the request is received from the game device 4, if there is a game device app to be transmitted, the game device app providing server 32 transmits data of the game device app to the game device 4. The game device 4 receives the data of the game device app transmitted from the game device app providing server 32, and installs the game device app. Then, it becomes possible to use the game device app on the game device 4. Note that in other embodiments, the game device app providing server 32 may perform the transmission at a point in time irrespective of the request from the game device 4.

Figure 14:
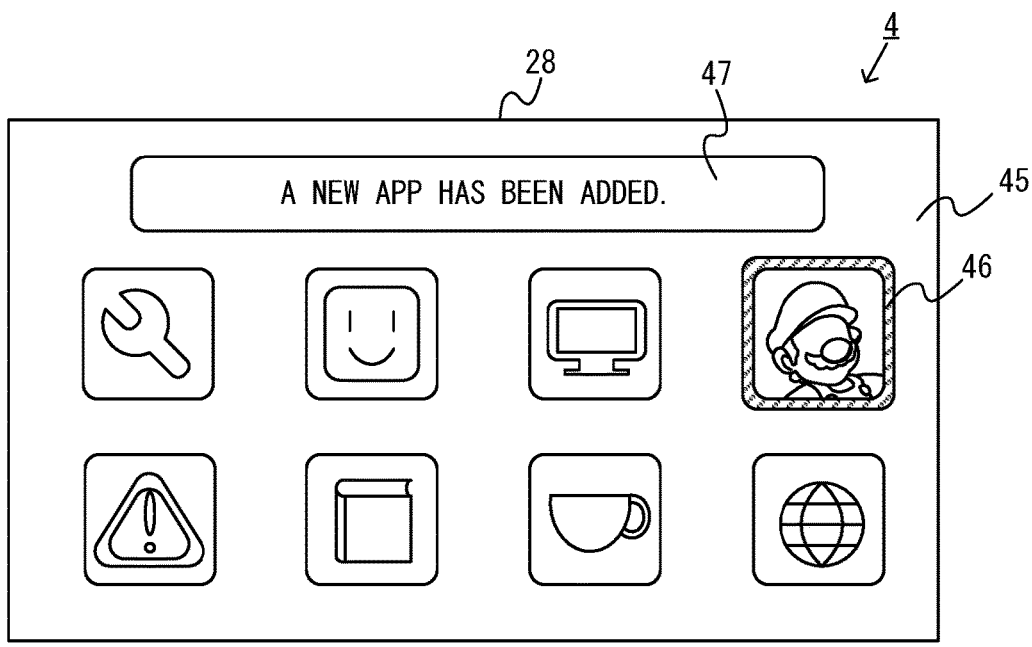
FIG. 14 is a diagram showing an exemplary image displayed on a non-limiting game device.

Note that the game device 4 may notify the user at an appropriate point in time of the obtainment of the game device app. FIG. 14 is a diagram showing an exemplary image displayed on the game device 4. After the game device app is installed, a menu image 45 is displayed on the display section 28 of the game device 4. The menu image 45 includes an icon image 46 and a message image 47. The icon image 46 is an image of the icon representing the newly installed game device app. In response to an instruction of specifying this icon, the game device 4 starts the application represented by the icon. As shown in FIG. 14, the icon image 46 representing the newly-installed game device app is displayed in a manner different from the other icon images. Thus, the game device 4 can notify the user of the addition of a new application. Moreover, the message image 47 represents a message indicating that an application has been added. This also allows the game device 4 to notify the user of the addition of a new application.

The game device 4 may notify the user that a game device app can be obtained before the obtainment of the game device app. For example, the game device app providing server 32 first transmits by push transmission a notification to the game device 4 that a game device app can be transmitted. In response to this notification, the game device 4 notifies the user that a game device app can be obtained. The notification by the game device 4 may be made at the predetermined points in time described above, or may be made at a different point in time from the predetermined point in time described above.

After the notification is made, the game device 4 may accept an instruction from the user to obtain the game device app. Then, the game device 4 may obtain (and install) the game device app in response to an instruction from the user (in other words, on the condition that there is an instruction). Thus, the game device app providing server 32 may transmit the notification by push transmission to the game device 4, and then transmit the game device app to the game device 4 on the condition that there is an obtaining instruction from the user.

(Functions/Effects of the Process)

As described above, in the present embodiment, the first-party service server 1 stores an application (i.e., a game device app) that is compatible with a first information processing device (i.e., the game device 4) having a platform of a first type and not compatible with a second information processing device (i.e., the smartphone 3) having a platform of the second type different from the first type. The first-party service server 1 transmits presentation information (advertisement information in the present embodiment) relating to a game device app to the smartphone 3 (step S51 shown in FIG. 11). The first-party service server 1 receives, from a smartphone 3, an instruction information (the information of the purchase request or the payment instruction information described above in the present embodiment) representing an instruction relating to the obtainment of an application corresponding to the presentation information presented on the smartphone 3 (step S59 shown in FIG. 11). The first-party service server 1 identifies the game device 4 that is to receive an application relating to the received instruction information (step S60 shown in FIG. 11). The first-party service server 1 transmits, to the identified game device 4, an application that is represented by the presentation information in response to the instruction information (the information of the purchase request or the payment instruction information described above in the present embodiment) received from the smartphone 3 (step S62 shown in FIG. 11).

There is a demand for expanding chances for users to obtain applications for conventional information processing system in which applications are provided from servers to terminal-side information processing devices so that the provided applications are used on the terminal-side information processing devices. For this, according to the embodiment described above, the user can obtain game device apps using the smartphone 3. That is, according to the present embodiment, the first-party business entity can PR a game device app to a user using a smartphone app by the function of the first-party service server 1. According to the present embodiment, it is possible to motivate a user using a smartphone app to purchase and/or use a game device app, and to promote the use of the game device app using the smartphone app as a trigger. Thus, according to the present embodiment, the user can obtain a certain application using an information processing device having a platform that is not compatible with that application, and it is therefore possible to expand chances for the application to be obtained.

Note that the process of identifying a game device to which a game device app is transmitted (step S60 described above) may be executed on the terminal side (i.e., on the smartphone 3). For example, the smartphone 3 may store the game device ID of the game device associated with the smartphone 3 in the storage section 25, and may transmit the information of the purchase request including this game device ID in the process of step S58.

In the present embodiment, it is possible to promote the obtainment of a game device app of the game device 4 which is an information processing device that is less prevalent (in other words, owned by fewer users) by using an smart device (i.e., the smartphone 3) which is an information processing device that is more prevalent (in other words, owned by more users). That is, according to the present embodiment, it is possible to attract users using smartphones 3 to becoming users of game devices 4, and to realize bridging from smartphones 3 to game devices 4 relating to the use of applications.

The "presentation information" may be any information relating to an application. While the presentation information is advertisement information in the present embodiment, the presentation information is not limited to a form of advertisement but may be information of any other form with which it is possible to present information relating to an application to the user in other embodiments.

In the present embodiment, the first-party service server 1 transmits presentation information to the smartphone 3 executing an application (i.e., a smartphone app) that is compatible with the smartphone 3 and not compatible with the game device 4 (step S52 shown in FIG. 11). Thus, since the presentation information is presented as the user executes a smartphone app on the smartphone 3, it is possible to present the presentation information to the user in a natural manner (in other words, without giving significant awkwardness). Since the presentation information can be transmitted at a point in time when the user uses the smartphone 3, it is possible to effectively provide the presentation information. Therefore, it is possible to reduce the possibility that the presentation information is transmitted wastefully (the user not seeing the presentation information), and it is possible to realize efficient communication between the first-party service server 1 and the smartphone 3.

In the present embodiment, the first-party service server 1 transmits, to the smartphone 3, presentation information relating to a game device app related to a smartphone app (e.g., a game application of the same series of the smartphone app). In the present embodiment, the game device app may be an application that is capable of using at least a part of the save data generated by the smartphone app, the details of which will be described later (see "(3-5) Process of sharing save data between smartphone app and game device app" to be described below). According to the description above, it is possible to present presentation information for an application that is related to the application being used by the user, and it is therefore possible to present presentation information that is likely to attract user's attention. Thus, it is possible to improve the advertisement effect of the presentation information.

In the present embodiment, the first-party service server 1 stores association information (i.e., the user management information shown in FIG. 11) representing the association between the identification information relating to the smartphone (the first-party account ID in the present embodiment) and the identification information relating to the game device (the transmission destination game device ID in the present embodiment). The first-party service server 1 identifies the game device based on the association information. According to the description above, it is possible, with the association information, to easily identify the game device 4 to which the game device app is transmitted.

The "identification information relating to the smartphone" may be, for example, identification information transmitted from the smartphone (e.g., the first-party account ID or the identification information unique to the smartphone), identification information associated with the smartphone (e.g., the first-party account ID or the email address of the smartphone), or identification information representing the user of the smartphone (e.g., the first-party account ID or the account name set for the user of the smartphone).

In the present embodiment, the first-party service server 1 receives the user identification information (the first-party account ID in the present embodiment) relating to the user of the smartphone 3 from the smartphone 3 at the start of and/or during the execution of the smartphone app on the smartphone 3 (step S51 or S52 shown in FIG. 11). The first-party service server 1 stores the user identification information (i.e., the first-party account ID) as the identification information relating to the smartphone 3. The first-party service server 1 identifies the game device 4 based on the user identification information transmitted to the first-party service server 1 at the start of and/or during the execution of the smartphone app on the smartphone 3 and the association information.

According to the description above, the game device to which the game device app is transmitted can be identified by using the identification information transmitted to the first-party service server 1 when executing the smartphone app. Then, the first-party service server 1 can identify the destination game device using information that is obtained from the smartphone 3, and it is therefore possible to efficiently execute the identification process.

In the present embodiment, the first-party service server 1 stores identification information unique to the game device (the transmission destination game device ID in the present embodiment) as the identification information relating to the game device. Then, it is possible to reliably identify the destination game device.

In the present embodiment, the first-party service server 1 stores the user information relating to the user corresponding to the user identification information (the user-related information in the present embodiment) in association with the user identification information (i.e., the first-party account ID). The first-party service server 1 determines the content of the presentation information to be transmitted to the smartphone 3 based on the user information associated with the user identification information received from the smartphone 3. Then, the first-party service server 1 can change the content of the presentation information depending on the user of the smartphone, and it is therefore possible to present presentation information of content that is suitable for the user.

In the present embodiment, the first-party service server 1 transmits the game device app to the game device 4 automatically irrespective of the presence/absence of a user instruction to transmit the game device app from the first-party service server 1 to the game device 4 (step S62 shown in FIG. 11). Then, the user does not need to perform an operation for obtaining the game device app on the game device 4, and it is therefore possible to improve the convenience when obtaining a game device app.

Note that the meaning of "(transmit information) automatically irrespective of the presence/absence of a user instruction" includes the following modes:

(1) a mode in which information is transmitted from the first-party service server 1 without a request from the game device 4; and (2) a mode in which the game device 4 requests transmission of information without an instruction from the user, and information is transmitted from the first-party service server 1 in response to the request.

Note that the mode (1) or (2) includes the user doing settings so that the mode (1) or (2) is realized in cases where the user is allowed to change settings relating to the transmission of information from the server to the terminal (herein, the game device 4).

In other embodiments, the first-party service server 1 may transmit, to the game device 4, a notification that the game device app can be transmitted, automatically irrespective of the presence/absence of a user instruction to transmit the game device app from the first-party service server 1 to the game device 4. Then, it is possible to notify the user that there is a game app that can be obtained. The user does not need to perform an operation for receiving a notification on the game device 4, and it is therefore possible to improve the convenience of the game device app.

In the present embodiment, after the instruction information is received from the smartphone 3, the first-party service server 1 attempts the transmission of the game device app to the game device 4 and/or the transmission of a notification relating to the game device app to the game device 4 (e.g., a notification that the game device app can be obtained) in response to satisfaction of a predetermined condition relating to the obtainment of the game device app (the completion of the settlement of the charge for the game device app in the present embodiment). Then, it is possible to transmit the game device app after the completion of the settlement for the game device app, for example. Therefore, it is possible to reduce the possibility that the game device app is downloaded to the game device 4 when a procedure such as the payment has not been completed, for example.

In the present embodiment, the smartphone 3 displays an image based on the presentation information received from the first-party service server 1 (step S54 shown in FIG. 11; FIG. 12), and transmits the instruction information to the first-party service server 1 in response to a predetermined input instruction that is allowed to be made after the image is displayed (step S58 shown in FIG. 11).

According to the description above, an input instruction is allowed to be made after the image based on the presentation information is displayed, and it is therefore possible to reduce the possibility that the user erroneously gives an input instruction.

In the present embodiment, after the smartphone 3 displays the image based on presentation information received from the first-party service server 1 on the display section 15, the smartphone 3 displays a stand-by image allowing the predetermined input instruction to be made (the purchase webpage and the billing webpage shown in FIG. 13 in the present embodiment) on the display section 15 (step S57 shown in FIG. 11). After the predetermined input instruction is made, the smartphone 3 ends the display of the stand-by image on the display section 15, and displays an image generated by the smartphone app (herein, a game image). For example, the smartphone 3 may switch the display on the display section 15 from an image of the billing webpage, which is the stand-by image, to a game image that is generated by a smartphone app, or may display the game image on top by erasing the image of the billing webpage which has been superimposed over the game image.

According to the description above, since the image of the smartphone app is displayed after an input instruction for obtaining the game device app, the user can easily resume the use of the smartphone app. Thus, it is possible to improve the convenience of the smartphone app.

(Variation of the Process)

Note that in the present embodiment, the first-party service server 1 transmits advertisement information to the smartphone 3 in response to a request (specifically, a login request) from the smartphone 3. Herein, in other embodiments, the first-party service server 1 may transmit the advertisement information by push transmission to the game device 4. That is, the first-party service server 1 may transmit advertisement information to the smartphone 3 automatically irrespective of the presence/absence of a user instruction to transmit the advertisement information from the first-party service server 1 to the smartphone 3. Thus, the first-party service server 1 can transmit advertisement information to the smartphone 3 in more occasions.

For example, the first-party service server 1 may transmit advertisement information when no smartphone app is being executed on the smartphone 3. Then, the smartphone 3 may display, on the display section 15, an advertisement image based on the advertisement information outside a smartphone app (i.e., without executing a smartphone app). For example, the smartphone 3 may display an advertisement image on a menu screen (and/or a standby screen) where an instruction to start an application is accepted. For example, the first-party service server 1 may transmit the advertisement information to the smartphone 3 by using electronic mail, and the smartphone 3 may display the advertisement image on a mailer application. In other embodiments, the smartphone 3 may display an advertisement image based on advertisement information that is received in a period during which no smartphone app is being executed, while a smartphone app is being executed (in other words, within the smartphone app).

In other embodiments, the user may be allowed to perform a purchase operation for purchasing a game device app within a smartphone app. That is, a smartphone app may have the function of accepting a purchase instruction of a game device app and issuing a purchase request to the game device app providing server 32. A smartphone app may have the function of accepting an instruction for settlement (in other words, the instruction to select a settlement method described above) in response to a billing notification from the game device app providing server 32, and issuing a notification relating to settlement (i.e., the payment instruction information) to the game device app providing server 32. Then, it is possible to purchase a game device app with the smartphone 3 executing a smartphone app (i.e., without the need to start a browser).

(3-5) Process of Sharing Save Data Between Smartphone App and Game Device App

Next, referring to FIG. 15 to FIG. 17, an exemplary process of sharing save data between a smartphone app and a game device app will be described. In the present embodiment, for predetermined combinations between a smartphone app and a game device app, save data (a part thereof) is shared. For example, between a smartphone app of a certain game application and a game device app of a game application that shares some game levels with the game application, save data representing the game content relating to those game levels is shared. Then, save data of a smartphone app can be used in a game device app, and save data of a game for a game device can be used in a smartphone app. Therefore, a user who uses either one of a smartphone app and a game device app can be motivated to use the other. The process of sharing save data will now be described in detail.

Figure 15:
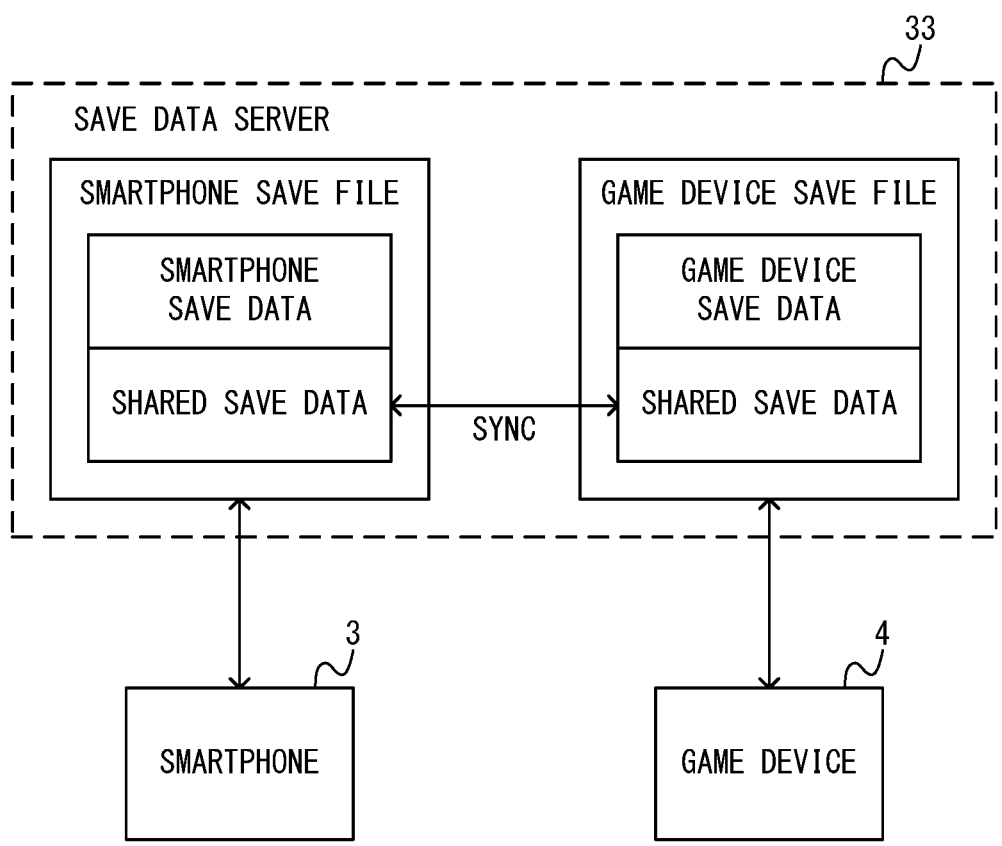
FIG. 15 is a diagram showing an exemplary outline of a process of sharing save data.

FIG. 15 is a diagram showing an exemplary outline of a process of sharing save data. FIG. 16 is a diagram showing an example of data stored in a save data server. In the present embodiment, as shown in FIG. 15 and FIG. 16, the save data server 33 stores, in a storage section thereof, a smartphone save file and a game device save file in association with each other. The smartphone save file is a data file including save data used in a smartphone app. The game device save file is a data file including save data used in a game device app. As shown in FIG. 16, these save files are stored for each application (a smartphone app or a game device app), corresponding to a save file or save files, and for each user (in other words, for each first-party account).

As shown in FIG. 15, the smartphone save file includes smartphone save data and shared save data. The game device save file includes game device save data and shared save data. The smartphone save data is save data used in a smartphone app. The game device save data is save data used in a game device app. The shared save data is save data used both in a smartphone app and in a game device app.

In the present embodiment, as shown in FIG. 15, the save data server 33 syncs various shared save data included in various save files. That is, each shared save data is managed so that the content thereof is matching. Note that the shared save data included in the smartphone save file and the shared save data included in the game device save file may have the same data content and have different data formats. That is, these two shared save data may be data representing the same content, but the shared save data included in the smartphone save file may have a data format that is readable by the smartphone 3 (in other words, a smartphone app), whereas the shared save data included in the game device save file may have a data format that is readable by the game device 4 (in other words, a game device app).

In other embodiments, the shared save data included in the smartphone save file and the shared save data included in the game device save file do not need to have completely matching data content but may have partly different data content from each other. For example, a part of the shared save data included in the smartphone save file may represent a character A appearing in the game of the smartphone app, whereas a part of the shared save data included in the game device save file (which corresponds to the part of the shared save data included in the smartphone save file) may represent a different character B appearing in the game of the game device app.

As described above, in the present embodiment, the save data server 33 stores the shared save data used in the smartphone app and the shared save data used in the game device app as different data (see FIG. 15). Note however that in other embodiments, the save data server 33 may store a single piece of data as the shared save data used in the smartphone app and the shared save data used in the game device app.

Figure 16:
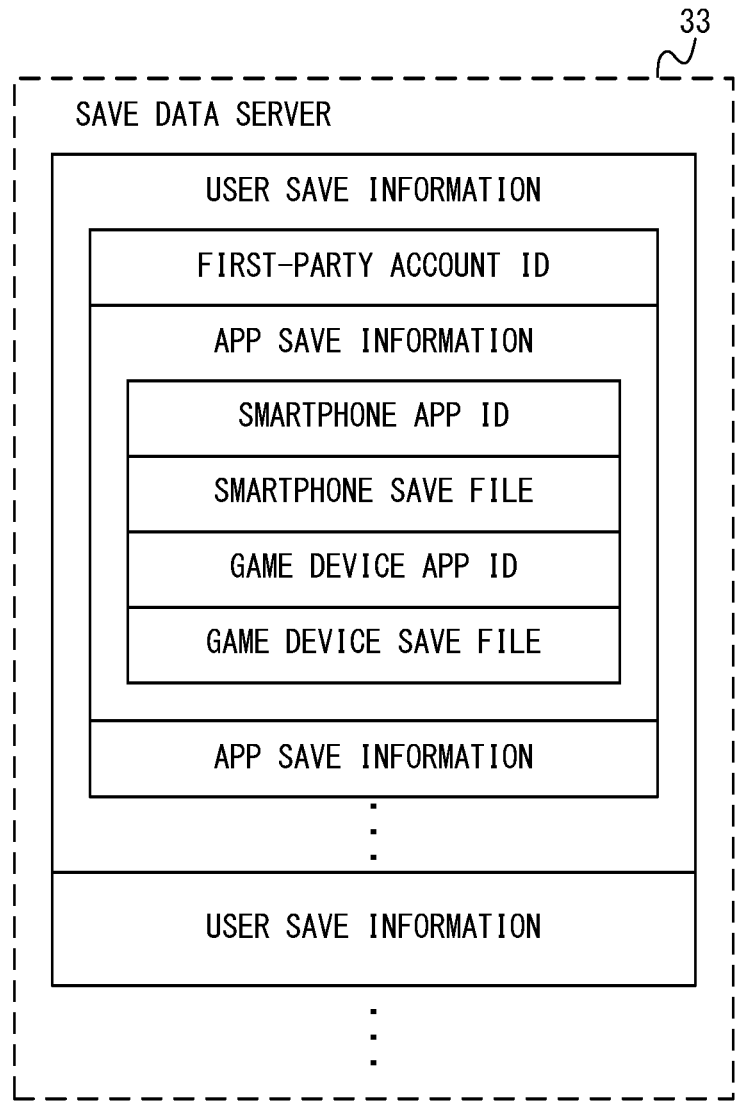
FIG. 16 is a diagram showing an example of data stored on a non-limiting save data server.

As shown in FIG. 16, the save data server 33 stores user save information for each first-party account (in other words, for each user). The user save information includes information of a first-party account ID and app save information. Note that in other embodiments, the user save information may include, instead of the first-party account ID, any information with which it is possible to identify the first-party account and/or identify a device using the save file (the smartphone 3 or the game device 4). For example, the user save information may include, instead of (or in addition to) the first-party account ID, information of the smartphone ID and information of the game device ID.

The app save information includes an app ID for identifying a smartphone app (referred to as a "smartphone app ID") and an app ID for identifying a game device app (referred to as a "game device app ID"). A smartphone app ID and a game device app ID that are associated with each other in the app save information are a pair of applications that are associated with each other, in other words, a pair of applications for which shared save data of the same content are stored. The app save information includes a smartphone save file used in the smartphone app represented by the smartphone app ID and a game device save file used in the game device app represented by the game device app ID. Note that as shown in FIG. 16, the app save information is created and stored in the save data server for each pair of a smartphone app and a game device app.

Herein, a smartphone app and a game device app associated with the smartphone app share at least a part of the game content. For example, there may be some shared game spaces (or game levels) between the game of the smartphone app and the game of the game device app. Then, the shared save data may represent game content relating to a shared game space (specifically, data for constructing the game space). For example, there may appear a shared character between the game of the smartphone app and the game of the game device app. Then, the shared save data may represent game content relating to the shared character (specifically, parameters of the character).

Note that when the user of a certain first-party account can use only one of a pair of a smartphone app and a game device app (i.e., when the smartphone app is not installed on the smartphone 3 or the game device app is not installed on the game device 4), the app save information may include only the ID and the save file relating to the application that the user can use.

In such a case, the first-party service server 1 may restrict (e.g., prohibit) the user who can use only one of a pair of a smartphone app and a game device app from using shared save data of the save file. Then, the first-party service server 1 may allow the user to use the shared save data in response to the user becoming capable of using both of the pair of the smartphone app and the game device app. Thus, a user who owns only one of a pair of a smartphone app and a game device app can be motivated to obtain (e.g., purchase) the other application.

Figure 17:
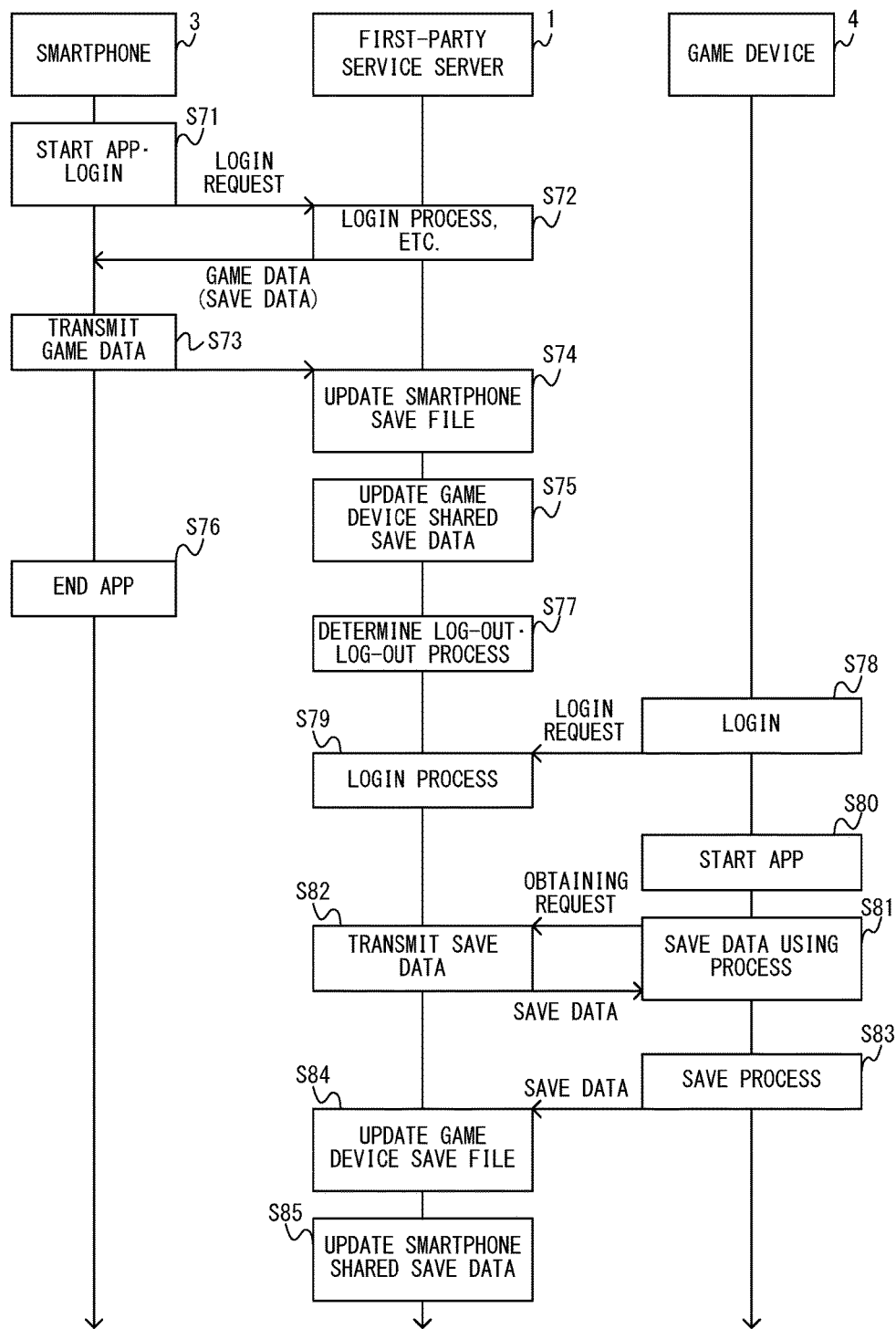
FIG. 17 is a diagram showing an exemplary flow of a process of sharing save data between a smartphone app and a game device app.

FIG. 17 is a diagram showing an exemplary flow of a process of sharing save data between a smartphone app and a game device app. FIG. 17 illustrates a flow of a process, in which save data stored in the save data server is updated in response to the use of a smartphone app on the smartphone 3, and then the updated save data is used in a game device app on the game device 4.

First, the smartphone 3 starts (i.e., opens) a smartphone app in response to a start instruction from the user, and performs a login (step S71). In response to this, the first-party service server 1 performs the login process, and when the login is approved, the first-party service server 1 transmits the game data to the smartphone 3 (step S72). Then, the smartphone 3 starts the game process using the received game data. Note that the series of processes described above is similar to the process of steps S11 to S16 described in "(3-2) Basic process performed on smartphone" above.

As described above, in response to the start of the smartphone app, the management server 31 manages the smartphone app as being executed on the smartphone 3.

In this exemplary process, the game data transmitted from the game server 34 to the smartphone 3 in response to the login may include a smartphone save file (or a part thereof). At this point, the game server 34 obtains, from the save data server 33, a smartphone save file relating to a first-party account from which a login request has been given. Specifically, the game server 34 transmits, to the save data server 33, information of the obtaining request to obtain the save data. This information includes the first-party account ID and the smartphone app ID included in the information of the login request from the smartphone 3. The save data server 33 identifies app save information that is associated with the first-party account ID included in this information and that corresponds to the smartphone app ID included in this information, and transmits, to the game server 34, the smartphone save file included in the identified app save information. The game server 34 transmits, to the smartphone 3, game data including a smartphone save file (or a part thereof) received from the save data server 33.

Note that also when the terminal has not been logged in (including a case where the login was not approved), the smartphone 3 transmits the first-party account ID and the smartphone app ID to the game server 34 in a manner similar to the manner described above. Thus, the game server 34 can transmit the smartphone save file to the smartphone 3 by a process similar to that described above.

When the game data is received from the game server 34, the smartphone 3 starts the execution of the smartphone app (in other words, the game process by the smartphone app). Although not shown in FIG. 17, the game data is exchanged between the smartphone 3 and the game server 34 while the smartphone app is being executed, as described above as the process of step S17 shown in FIG. 7.

Herein, the smartphone 3 transmits the game data to the game server 34 an appropriate point in time while the smartphone app is being executed (step S73). For example, the smartphone 3 transmits the game data at a point in time when a single play of the game ends, a point in time when one level is cleared, a point in time when the user gives an instruction to save the game data, a point in time when a billable process (e.g., a process of purchasing an item in the game or purchasing an additional game level) is performed, etc. Note that the game data transmitted by the smartphone 3 in one iteration does not need to be the entire smartphone save file stored in the save data server 33. Note that the smartphone 3 transmits, to the game server 34, the first-party account ID used for the login, and the smartphone app ID corresponding to the game data, together with the game data.

When the game data is received from the smartphone 3, the game server 34 updates the smartphone save file as necessary (step S74). Specifically, the smartphone save file stored in the save data server 33 is updated based on the game data received from the smartphone 3. The game server 34 may generate a smartphone save file to be newly saved (in other words, stored) based on the game data, and transmit the generated smartphone save file to the save data server 33. Note that the game server 34 specifies a smartphone save file to be updated by transmitting, to the save data server 33, the first-party account ID and the smartphone app ID, which are received together with the game data from the smartphone 3. The save data server 33 updates the specified smartphone save file (i.e., the smartphone save file included in the app save information that is associated with the first-party account ID and associated with the smartphone app ID).

The smartphone save file may be updated at any point in time. For example, the game server 34 may update the smartphone save file when there is a change to the content of the smartphone save file because of the game data received from the smartphone 3. For example, the game server 34 may update the smartphone save file when the game data is transmitted in response to the user giving an instruction to save the game data.

When a change has been made to the shared save data of the smartphone save file, the save data server 33 syncs the shared save data of the game device save file associated with the smartphone save file (step S75). That is, the shared save data of the game device save file is updated to the same content as the shared save data of the smartphone save file.

Note that in other embodiments, the save data server 33 does not need to keep the content of the two shared save data completely matching with each other. That is, the save data server 33 may update the shared save data of the smartphone save file and the shared save data of the game device save file so that a change to one shared save data is reflected to the other shared save data. For example, when the character A appears in the smartphone app and the character B appears, instead of the character A, appears in the game device app, if the shared save data included in the smartphone save file includes data relating to the character A, the shared save data included in the game device save file may include data relating to the character B, instead of the data relating to the character A. Then, the save data server 33 may change data relating to one of the character A and the character B in response to a change to data relating to the other. For example, when the level of the character A has been increased, the data of the character B may be changed so as to accordingly increase the level of the character B.

As described above, when there is a change to the shared save data of the smartphone save file stored in the save data server 33 as a result of executing the smartphone app on the smartphone 3, the shared save data of the game device save file of the game device app corresponding to the smartphone app is also changed.

In FIG. 17, the smartphone 3 ends the smartphone app in response to an instruction from the user (step S76). On the other hand, on the first-party service server 1 side, the logout of the smartphone 3 is determined and the log-out process is executed by the process of steps S20 and S21 shown in FIG. 7 (step S77). That is, the game server 34 determines that the smartphone 3 has logged out by the process of step S20, and the management server 31 executes the log-out process of step S21 in response to this.

On the other hand, when the game device 4 is started, the game device 4 logs in to the first-party service with the first-party account ID (step S78). In response to this, the management server 31 performs the login process (step S79). The process of steps S78 and S79 is similar to the process of steps S31 and S32 shown in FIG. 9.

Then, the game device 4 starts a game device app (herein, a game device app corresponding to the smartphone app, i.e., a game device app that shares the save data) in response to a start instruction from the user (step S80). The process of step S80 is similar to the process of step S33 shown in FIG. 9. That is, although not shown in FIG. 17, the game device 4 transmits information of the app start notification to the management server 31, and the management server 31 updates the app execution information based on the app ID included in the information of the app start notification. Thus, the management server 31 manages the game device app as being executed on the game device 4.

Note that in the present embodiment, save data that is used at the time of starting the game device app is stored also in the storage section 25 of the game device 4 (or a game card attached to the game device 4) (see step S83 to be described below). Therefore, at the time of starting the game device app, the game device 4 does not obtain a save file from the save data server 33. Note however that in other embodiments, like the smartphone 3, the game device 4 may obtain the save file (at least the shared save data) from the save data server 33 at the time of starting the game device app, irrespective of the presence/absence of an instruction from the user. In other embodiments, the game device 4 may obtain the save file (at least the shared save data) of the game device app in a period during which the game device app is not being executed. For example, when the game device 4 becomes able to communicate with a network (in other words, the save data server 33) in a period during which the game device app is not being executed, the game device 4 may transmit, to the save data server 33, information representing a request to obtain the save file of the game device app.

While the game device app is being executed, the game device 4 executes a save data using process (step S81). Herein, the save data using process is a process of using the latest save data (i.e., the game device save file) stored in the save data server 33. For example, the save data using process is a game process of using the shared save data included in the game device save file. The save data using process can be said to be one of the server communication processes described above (step S36 shown in FIG. 9).

When executing the save data using process, the game device 4 first transmits, to the save data server 33, information representing a request to obtain the game device save file. This information includes the first-party account ID used in the login performed in step S78 and the game device app ID of the game device app being executed. Note that although the game device 4 communicates with the save data server 33 while the game device app is being executed in the present embodiment, the communication between the game device 4 and the save data server 33 may be done via the game server 34 or directly (i.e., not via the game server 34).

The save data server 33 having received information of the obtaining request identifies the game device save file to be transmitted based on this information, and transmits the identified game device save file to the game device 4 (step S82). Specifically, of the user save information corresponding to the first-party account ID included in the information of the obtaining request, the save data server 33 transmits, to the game device 4, a game device save file that is included in the app save information corresponding to the game device app ID included in the user save information.

When the game device save file is received from the save data server 33, the game device 4 executes the save data using process using the received game device save file. Herein, the game device save file transmitted in the process of step S82 is what is obtained by making a change to the shared save data included therein in accordance with a change to the smartphone save file in step S75. That is, the game device save file (the shared save data thereof) to be transmitted has been updated in accordance with the game process on the smartphone app. Therefore, the game device 4 can execute the game process (i.e., the save data using process) using the shared save data that has been updated in accordance with the game process on the smartphone app.

While the game device app is being executed, the game device 4 executes a save process (step S83). The save process is a process of generating save data representing the game content, which is the result of executing the game device app, and storing the save data in the storage section 25 of the game device 4 (or a game card attached to the game device 4). For example, the save process is executed when an instruction to save the game content is given by the user and/or when a predetermined game process is performed (e.g., the game content may be saved automatically for the purpose of preventing illegal actions in the game, for example).

When the save process is executed, the game device 4 transmits the save data to the save data server 33. Then, the game device 4 transmits, to the save data server 33, the first-party account ID used in the login and the game device app ID relating to the game device app being executed while they are associated with the save data.

The save data server 33 receives the save data from the game device 4 and updates the game device save file as necessary (step S84). Specifically, the save data server 33 updates game device save file stored in the save data server 33 based on the game data received from the game device 4. The save data server 33 updates the game device save file included in the app save information that is associated with the first-party account ID received in association with the save data from the game device 4 and that is associated with the game device app ID.

When there is a change to the shared save data of the game device save file, the save data server 33 syncs the shared save data of the smartphone save file associated with the game device save file (step S85). That is, the shared save data of the smartphone save file is updated to the same content as the shared save data of the game device save file.

Note that although not shown in the figures, the game device 4 ends the game device app being executed in response to a predetermined app end instruction from the user. As a result, the management server 31 determines that the execution of the game device app has ended by the process of steps S39 and S40 shown in FIG. 9. Also, the game device 4 shuts down in response to a predetermined shut-down instruction from the user. As a result, by the process of step S41 shown in FIG. 9, the management server 31 determines that the game device 4 has logged out, and executes the log-out process of step S42 shown in FIG. 9.

As described above, when there is a change to the shared save data of the game device save file stored in the save data server 33 as a result of executing the game device app on the game device 4, the shared save data of the smartphone save file of the smartphone app corresponding to the game device app is also changed. Then, when the smartphone app is executed thereafter on the smartphone 3, the game process is executed by using the smartphone save file including the shared save data after the change has been made thereto.

(Where Shared Save Data is Used Simultaneously)

Herein, in the present embodiment, when one of a smartphone app and a game device app that are associated with each other in the app save information is being executed, if the shared save data is allowed to be used in the other application, the content of the shared save data used in the first application may possibly be changed. Then, the game process of the first application may possibly suffer from a problem or inconsistency.

In view of this, in the present embodiment, when one of a smartphone app and a game device app that are associated with each other in the app save information is being executed, the save data server 33 restricts the other application from using the shared save data. For example, when a game device app that is associated with a smartphone app is started and executed on the game device 4 while the smartphone app is being executed on the smartphone 3, the save data server 33 prohibits access to the shared save data from the game device 4. Note that the save data server 33 may only prohibit the shared save data from being updated while allowing the shared save data from being read, or may prohibit both updating and reading. The save data server 33 may allow a part of the game device save file other than the shared save data to be accessed.

Specifically, when there is a request to access a save file (a smartphone save file or a game device save file) from the game server 34, the save data server 33 determines whether or not to allow the shared save data included in the save file to be used based on the app execution information stored in the management server 31. Note that the app execution information used in the determination is app execution information included in the user management information corresponding to the first-party account of the access request. For example, when it is an access request from one of applications associated with each other (a smartphone app and a game device app) that is started later, the save data server 33 prohibits the shared save data from being used. In such a case, the save data server 33 transmits the save file excluding the shared save data to the game server 34. On the other hand, when it is an access request from one of applications associated with each other that is started first, the save data server 33 allows the shared save data to be used. In such a case, the save data server 33 transmits the save file including the shared save data to the game server 34. Note that the determination as to whether it is an application start first or an application started later between the applications associated with each other can be made by storing, in the management server 31, the app execution information including information of the time at which the execution of each application is started.

Note that when a smartphone app and a game device app are both being executed, there is no particular limitation on the method for determining the application for which the shared save data is restricted from being used. For example, in other embodiments, the save data server 33 may restrict the shared save data from being used for a predetermined one of the applications. Then, the predetermined one of the applications may be pre-set for each application or may be set by the user. In such a case, the method for determining the application for which the shared save data is restricted from being used may be determined for each pair of a smartphone app and a game device app associated with each other.

As described above, according to the present embodiment, by restricting the access to the shared save data from the first application, it is possible to reduce the possibility that the game process of the second application suffers from a problem or inconsistency.

In other embodiments, when there is an access (specifically, an update) to shared save data of the second application while the first application is being executed, the save data server 33 may notify the terminal executing the first application. For example, in the process of steps S75 and S85, the save data server 33 may notify a terminal using the updated shared save data of the update to the shared save data. Note that this notification may be made to the terminal via the game server 34 or may be transmitted directly to the terminal from the save data server 33.

The terminal having received the notification may request the game server 34 to obtain the save file including the updated shared save data. The terminal may notify the user of the change to the shared save data. After the notification, the game server 34 may transmit the save file including the updated shared save data to the terminal that has made the notification. Then, the first application can use the shared save data which has been updated by the second application.

Note that where a plurality of applications that are associated with each other in the app save information are being executed, the appropriate action to be taken by the first-party service server 1 for these applications (e.g., whether to restrict the shared save data from being used by the application that is started later or to notify the application that is started first, etc.) may vary depending on the content of the applications. Therefore, the save data server 33 may set, in the app save information, the action to be taken in such cases for each pair of applications associated with each other.

Note that in other embodiments, on the condition that a terminal is logged in, the save data server 33 may allow the shared save data to be used by this terminal. That is, when there is a request to access a save file from the game server 34, the save data server 33 may determine whether or not to allow the shared save data included in the save file to be used based on the login status information stored in the management server 31. If while a first terminal of the smartphone 3 and the game device 4 is logged in, there is a login request from a second terminal of the smartphone 3 and the game device 4, the management server 31 may restrict the login of the second terminal. Then, it is possible to restrict the shared save data from being used by the second terminal.

(Functions/Effects of the Process)

As described above, according to the present embodiment, the first-party service server 1 communicates with a first information processing device having a platform of a first type (i.e., the smartphone 3/the game device 4) and communicates with a second information processing device having a platform of a second type different from the platform of the first type (i.e., the game device 4/the smartphone 3). The first-party service server 1 (specifically, the save data server 33) at least stores the shared game data (the shared save data included in the smartphone save file and the shared save data included in the game device save file in the present embodiment) (see FIG. 15). Shared game data represents game content that can be used in a first game application (i.e., the smartphone app) that is compatible with the smartphone 3 and not compatible with the game device 4, and represents game content that can also be used in a second game application (i.e., the game device app) that is compatible with the game device 4 and not compatible with the smartphone 3. The first-party service server 1 obtains game data generated by executing the smartphone app on the smartphone 3, and updates the shared game data based on the obtained game data (steps S74 and S75 shown in FIG. 17). The first-party service server 1 transmits at least a part of the shared game data updated based on the game data generated by executing the smartphone app (the shared save data included in the game device save file in the present embodiment) to the game device 4 for being used by the game device app (step S82 shown in FIG. 17).

With conventional information processing systems in which data used in an application executed on a terminal-side information processing device is stored in a server, there is a demand for improving the convenience of the application used on the terminal and/or the playability of the application. For this, according to the embodiment described above, game data can be shared between applications having different platforms. Then, it is possible to improve the convenience of the application used on the terminal (the smartphone 3 or the game device 4) or improve the playability of the application. It is also possible to motivate a user using one of a smartphone app and a game device app to use the other application, and to promote the obtainment of the application by the user.

In the present embodiment, shared game data is updated in response to the execution of a smartphone app on a smart device (i.e., the smartphone 3) which is an information processing device that is more prevalent (in other words, owned by more users). Then, the shared game data is transmitted to the game device 4 for being used by a game device app on the game device 4 which is an information processing device that is less prevalent (in other words, owned by fewer users). Therefore, according to the present embodiment, it is possible to motivate users using smartphone apps to use game device apps, and attract users using the smartphone 3 to becoming users of the game device 4.

In the present embodiment, the first-party service server 1 (specifically, the save data server 33) obtains the game data generated by executing the game device app on the game device 4, and updates the shared game data based on the obtained game data (steps S84 and S85 shown in FIG. 17). Then, the first-party service server 1 at least a part of the shared game data updated based on the game data generated by executing the game device app to the smartphone 3 for being used by the smartphone app (step S72 shown in FIG. 17).

According to the description above, between a smartphone app and a game device app, the process of reflecting the shared game data of one application to the shared game data of the other application is performed two-way. Thus, it is possible to motivate a user using a smartphone app to use a game device app, and to motivate a user using a game device app to use a smartphone app.

Note that in other embodiments, the process of reflecting the shared game data of one of a smartphone app and a game device app to the shared game data of the other does not need to be performed two-way. For example, in other embodiments, the shared save data of the game device app may be updated so as to reflect the content of the shared save data of the smartphone app, whereas the shared save data of the smartphone app does not need to be updated so as to reflect the content of the shared save data of the game device app. That is, the shared save data of the game device app may be updated by executing the smartphone app, whereas the shared save data of the smartphone app does not need to be updated by executing the game device app. In other words, one of the smartphone app and the game device app may be allowed to read and write the shared save data, whereas the other may be allowed to read the shared save data but not allowed to write the shared save data.

In the present embodiment, the first-party service server 1 (specifically, the save data server 33) stores first app data including the shared game data (i.e., the smartphone save file) and second app data including the shared game data (i.e., the game device save file) (see FIG. 15 and FIG. 16). The first-party service server 1 transmits the smartphone save file to the smartphone 3 for being used by the smartphone app (step S72 shown in FIG. 17), and transmits the game device save file to the game device 4 for being used by the game device app (step S82 shown in FIG. 17). Note that in other embodiments, at least a part of the smartphone save file may be transmitted to the smartphone 3, and at least a part of the game device save file may be transmitted to the game device 4.

According to the description above, the server may separately store the shared save data used in the smartphone app and the shared save data used in the game device app. Then, it is possible to improve the convenience of the shared save data and to facilitate the access management to the shared save data. For example, the two shared save data can be made not to match completely (they may be made to match completely). For example, the two shared save data can be stored in different data formats.

In the present embodiment, the first app data further includes first game data that can be used in the smartphone app (i.e., the smartphone save data). The second app data further includes second game data that can be used in the game device app (i.e., the game device save data).

According to the description above, the first-party service server 1 may store game data that can be used in an application (e.g., game data dedicated to the application) in addition to the shared save data, while being included in the app data.

Moreover, in the present embodiment, the first-party service server 1 obtains the game data generated by executing the smartphone app on the smartphone 3, updates the smartphone save file based on the obtained game data (step S74 shown in FIG. 17), and further updates the shared game data included in the game device save file (step S75 shown in FIG. 17). The first-party service server 1 obtains the game data generated by executing the game device app on the game device 4, updates the game device save file based on the obtained game data (step S84 shown in FIG. 17), and further updates the shared game data included in the smartphone save file (step S85 shown in FIG. 17).

According to the description above, when one of the smartphone save file and the game device save file is updated, the shared game data included in the other save file is also updated. Thus, for the two shared save data, a change to one data can be reflected to the other.

In other embodiments, the first-party service server 1 may store first game data that can be used in the smartphone app (i.e., the smartphone save data), second game data that can be used in the game device app (i.e., the game device save data), and the shared game data. Then, the first-party service server 1 transmits the smartphone save data and the shared game data to the smartphone 3 for being used by the smartphone app, and transmits the game device save data and the shared game data to the game device 4 for being used by the game device app.

According to the description above, since the server stores single data as the shared save data to be used by the smartphone app and the game device app, it is possible to reduce the amount of data of the data stored in the server.

Moreover, in other embodiments, when the game data generated by executing the smartphone app on the smartphone 3 is obtained, the first-party service server 1 may update the smartphone save data and the shared game data based on the obtained game data. When the game data generate by executing the game device app on the game device 4 is obtained, the first-party service server 1 may update the game device save data and the shared game data based on the obtained game data.

According to the description above, the server can update the shared game data in response to the execution of the smartphone app and can also update the shared game data in response to the execution of the game device app.

In the present embodiment, the first-party service server 1 transmits at least a part of the shared game data to the game device 4 in response to a request (i.e., the obtaining request in the process of step S81) from the game device 4 after the shared game data is updated (e.g., steps S74 and S75 shown in FIG. 17) (step S82 shown in FIG. 17).

In the present embodiment, the first-party service server 1 includes the save data server 33 and the game process server (i.e., the game server 34). The save data server 33 stores the shared game data. The game server 34 is provided separately from the save data server 33, and is a server that is accessed by the smartphone 3 when executing the game process of the smartphone app.

According to the description above, a server for game processes (i.e., the game server 34) and a server for saving game data (i.e., the save data server 33) are provided separately from each other. Then, even when a game server is provided for each game application, for example, game data of various game applications can be managed at the save data server 33.

In the present embodiment, the smartphone app may be a simpler application than the game device app. Herein, "the smartphone app being simpler than the game device app" may mean as follows.

Simpler game content (more specifically, simpler game rules, fewer game levels, fewer characters appearing in the game, or simpler operation methods, etc.).

Simpler game process (smaller application data size, lower game image resolution, the ratio of game processes executed on the terminal side being lower (the ratio of game processes executed on the game server side being higher), etc.).

According to the description above, the user can first experience a simpler smartphone app and, if the user likes the smartphone app, can obtain (e.g., purchase) the more full-fledged game device app. Therefore, for the first-party business entity, it is possible to motivate the user to obtain the game device app by providing the smartphone app which is easy for the user to use.

In the present embodiment, the smartphone app is an application that is used on the condition that the smartphone 3 can access the server (i.e., the game server 34) when the smartphone app is started on the smartphone 3. On the other hand, the game device app is an application that is used not on the condition that the game device 4 can access the server when the game device app is started on the game device 4.

Moreover, the smartphone app and the game device app are different from each other in terms of the method by which they are provided to the user. That is, the smartphone app is obtained by being downloaded from the smartphone app providing server 2 to the smartphone 3. On the other hand, the game device app is obtained by being downloaded from the first-party service server 1 (specifically, the game device app providing server 32) to the game device 4. Note that the game device app may be provided by the user obtaining a game card storing the game device app at a store, or the like.

Some or all of the smartphone apps of the first-party service are applications that are not billed when they are installed on the smartphone 3, and some or all of the game device apps of the first-party service may be applications that are billed when they are installed on the game device 4. Note that "an application of with the first-party service" refers to an application (specifically, a smartphone app or a game device app) whose service is presented by the first-party service server 1. That is, some or all of the smartphone apps may be those that can be installed on the smartphone 3 for free and the user is billed as the smartphone app is used. For example, the user may be billed to obtain data used in the smartphone app (specifically, data of an item appearing in the game or data of money used in the game in the game application). For example, billing may be done in accordance with the number of times the smartphone app is used and/or the amount of time for which the smartphone app is used. On the other hand, where the user is billed to install the game device app on the game device 4, billing may or may not be done in accordance with the use of the game device app.

As described above, by not billing the user to install the smartphone app, it is made easy for the user to install the smartphone app and the user is more likely to use the smartphone app. As described above, in the present embodiment, it is possible to motivate, through the use of the smartphone app, the user to obtain the game device app, and it is therefore possible to motivate the user to use the game device app by making it easy for the user to use the smartphone app.

(Variation)

In the present embodiment, the save data server 33 stores information (i.e., the app save information) representing each pair of a smartphone app and a game device app that use the shared game data of the same content. Then, the shared save data is data representing different game content for each particular pair (e.g., game content relating to games of the same series). Herein, the shared save data may include data representing the same content for different pairs. That is, the shared save data may include data that can be used commonly between each pair of game applications (a smartphone app and a game device app). For example, the shared save data may include data relating to the avatar for the user of the first-party account. Then, the data relating to the avatar may be able to be used in a smartphone app and/or a game device app that belong to different pairs.

In other embodiments, the shared save data may include data that can be used commonly for game applications (smartphone apps and game device apps of the first-party service) and does not need to include data representing different game content for each pair. For example, in the example shown in FIG. 15, the smartphone save file (or the game device save file) may include the shared save data and not include the smartphone save data (or the game device save data). Then, the save data server 33 does not need to store information representing each pair of a smartphone app and a game device app. For example, the shared save data may only include data relating to the avatar, and the save data server 33 does not need to store information representing a pair of a smartphone app and a game device app for a game application that only uses data relating to the avatar.

(3-6) Process of Managing Points on First-Party Service Server 1 in Accordance with Use of Services Provided by Smartphone Apps Next, referring to FIG. 18 to FIG. 21, the process of managing points on the first-party service server 1 in accordance with the use of the smartphone app providing service will be described. As described above, in the present embodiment, the smartphone app is, in a direct sense, provided by a third-party business entity that operates an app providing service using the smartphone app providing server 2. Therefore, the process for the user to purchase data relating to a smartphone app is performed between the smartphone app providing server and the smartphone 3.

Herein, in the present embodiment, points awarded in accordance with the purchase of data relating to the smartphone app are managed on the first-party service server 1. The points are used for the first-party business entity to check the user history relating to the purchase of smartphone apps, for example. That is, by using the points, the record of use (herein, purchase) of smartphone apps can be kept track of on the server side (i.e., the first-party business entity side). The points are also used for awarding the user with a bonus based on the points. Then, since the user is awarded points also for the first-party service by purchasing smartphone apps, it is possible to promote the use of smartphone apps by the user. Moreover, by awarding points, it is also possible to promote the use of the first-party service by the user (e.g., the use of a game device app). The process of managing points will now be described in detail.

Herein, in the present embodiment, the data of the purchase (i.e., data obtained by the smartphone 3 as a result of the purchase) is provided from the smartphone app providing server 2 to the smartphone 3 in some cases, and from the game server 34 to the smartphone 3 in other cases. The former is the case where data of the purchase is program data of a smartphone app, for example. The latter is the case where data of the purchase is game data used in a smartphone app, for example.

(Exemplary Process where Data is Obtained from Smartphone App Providing Server)

Figure 18:
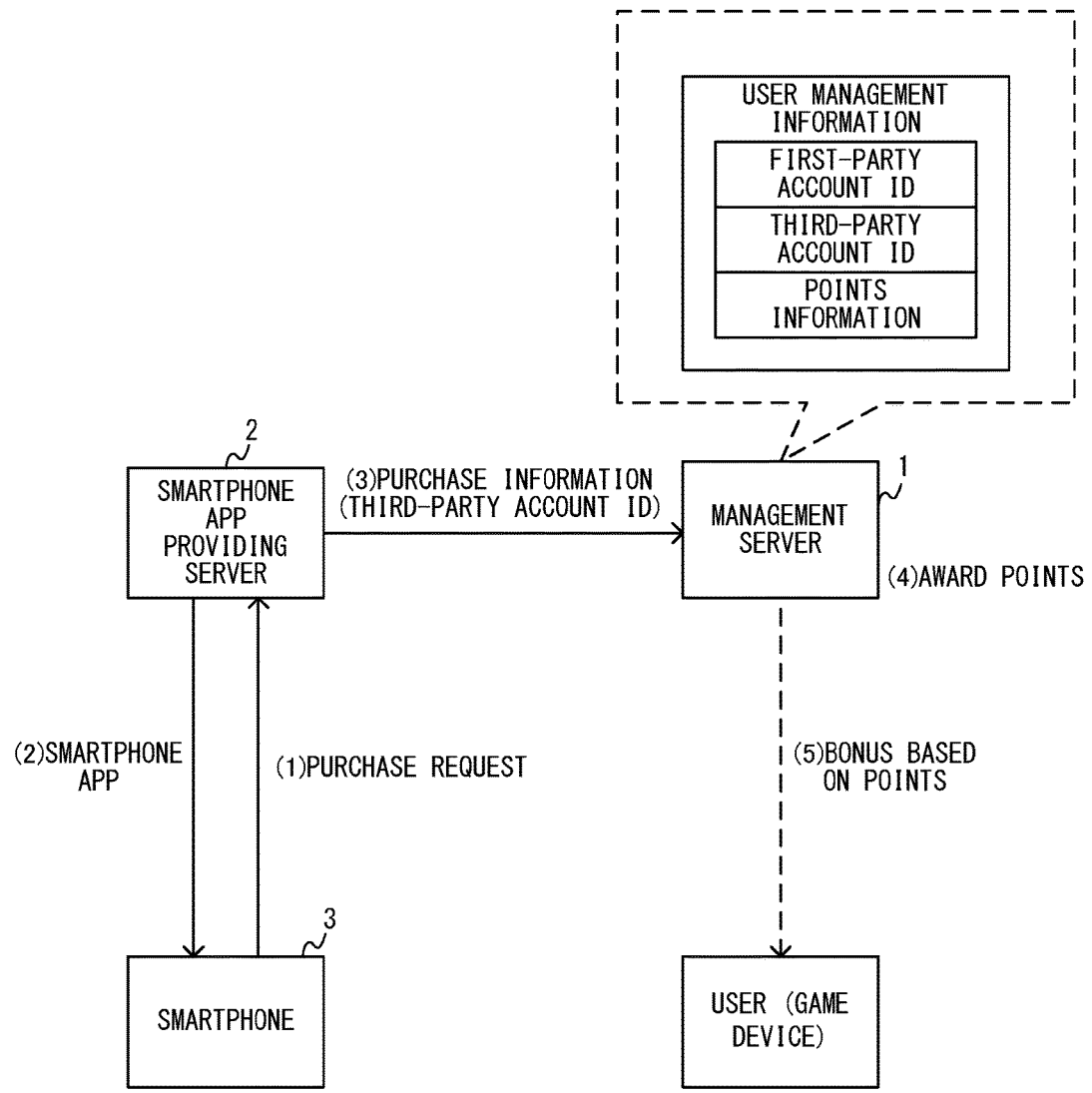
FIG. 18 is a diagram showing an exemplary outline of a process of managing points in response to the use of a smartphone app providing service.
Figure 19:
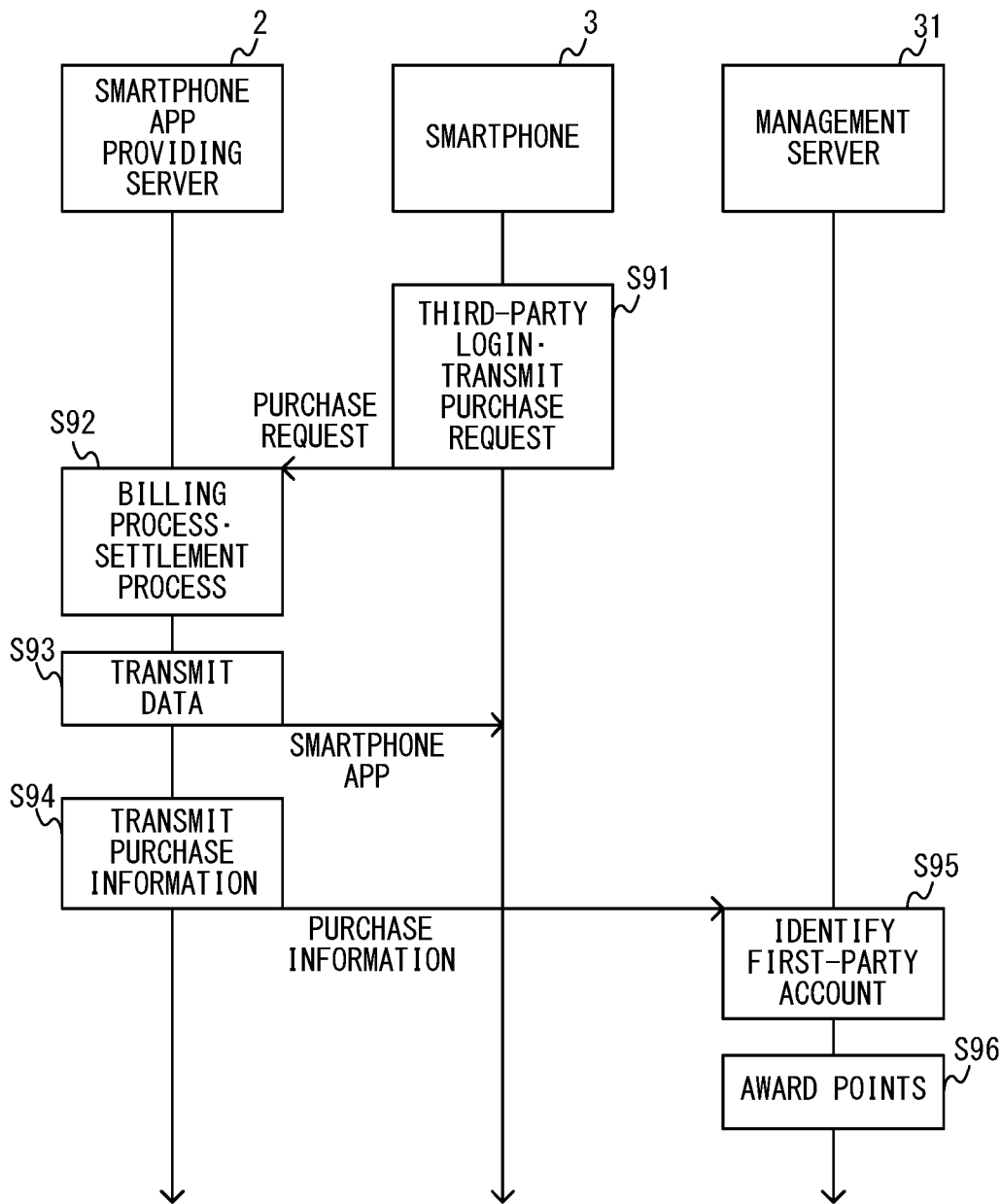
FIG. 19 is a diagram showing an exemplary flow of a process of managing points when a smartphone obtains data from a smartphone app providing server.

First, an exemplary process where data of the purchase is provided from the smartphone app providing server 2 to the smartphone 3 will be described. FIG. 18 is a diagram showing an exemplary outline of a process of managing points in accordance with the use of the smartphone app providing service. FIG. 19 is a diagram showing an exemplary flow of a process of managing points in a case where data is obtained from the smartphone app providing server to the smartphone. For example, when a program of a smartphone app is downloaded to the smartphone 3, the series of processes shown in FIG. 19 is executed.

In FIG. 19, the user first performs a purchase operation of purchasing a smartphone app using the smartphone 3. Specifically, the smartphone 3 accesses the smartphone app providing server 2 in response to an instruction from the user, and logs in to a service of the smartphone app providing server 2 with a third-party account ID. Then, the smartphone 3 transmits information of a purchase request for purchasing a smartphone app specified by the user ((1) shown in FIG. 18, step S91 shown in FIG. 19).

Note that there is no particular limitation on the specific content of the process for purchasing a smartphone app. For example, the smartphone 3 accesses a shop website provided by the smartphone app providing server 2 and logs in to the shop website with a third-party account ID. Note that the third-party account ID is a third-party account ID that is registered in association with a first-party account ID when a first-party account is registered for the user making the purchase. That is, the user logs in with the third-party account ID that is registered in association with the first-party account ID.

Note that there is no particular limitation on when to log in to the third-party account, and it may be any point in time while the smartphone 3 is accessing the shop website. For example, the login may be done at a point in time when the smartphone 3 starts the access to the shop website, or the login may be done at a point in time when a purchase instruction to be described below is given.

The smartphone 3 accepts a purchase instruction to purchase a smartphone app while purchase webpage within the shop website for a smartphone app that is specified by the user is displayed on the display section 15. In response to the user giving a purchase instruction, the smartphone 3 transmits, to the smartphone app providing server 2, the information of the purchase request for purchasing the smartphone app.

When the information of the purchase request is received from the smartphone 3, the smartphone app providing server 2 executes a billing process in accordance with the purchase request, and further executes a settlement process as necessary (step S92 shown in FIG. 19). There is no particular limitation on the specific process content of the billing process and the settlement process. For example, the smartphone app providing server 2 may execute a process similar to step S19 described above.

If the obtainment condition for obtaining the smartphone 3 (in other words, the user) to obtain the smartphone app is satisfied as a result of the billing process and the settlement process, the smartphone app providing server 2 transmits the data of the purchase to the smartphone 3 ((2) shown in FIG. 18, step S93 shown in FIG. 19). There is no particular limitation on the obtainment condition, but the obtainment condition is, for example, the completion of settlement (i.e., the charge has been paid) or the completion of the preparation of settlement (i.e., the preparation for direct debit for the charge has been completed), etc. While the data of the purchase is herein program data of the smartphone app, the present embodiment is not limited to this, and it may be data used by the smartphone app (e.g., data of an item, data of money used in the game, data of additional levels, etc.).

Note that the smartphone 3 executes an appropriate process based on the received data. For example, when the program data of the smartphone app is received, the smartphone 3 installs the smartphone app.

The process of steps S91 to S93 described above may be similar to processes executed on conventional app providing services.

In the present embodiment, when the obtainment condition is satisfied, the smartphone app providing server 2 transmits the purchase information to the first-party service server 1 (specifically, the management server 31) ((3) shown in FIG. 18, step S94 shown in FIG. 19). The purchase information is information relating to the purchase made for the smartphone app. In the present embodiment, the purchase information includes information of the purchase price and information representing the content of data purchased (e.g., the smartphone app ID). The purchase information also includes the ID of the third-party account used for the obtainment of the data. Note that since the purchase information is transmitted when the obtainment condition is satisfied, it can be said to be information notifying the satisfaction of the obtainment condition.

When the purchase information is received, the management server 31 awards points to the first-party account (in other words, the user) ((4) shown in FIG. 18). Specifically, first, the management server 31 identifies the first-party account corresponding to the third-party account that made the purchase of the smartphone app (step S95 shown in FIG. 19). The first-party account is identified based on the third-party account ID included in the purchase information. Herein, a described above, the management server 31 stores user management information that associates the first-party account ID and the third-party account ID with each other (see FIG. 6 and FIG. 18). In the user management information, the management server 31 identifies the first-party account represented by the first-party account ID associated with of the ID of the third-party account included in the purchase information.

Note that in other embodiments, the first-party account ID may be included in the purchase information from the smartphone app providing server 2, and the management server 31 may identify the first-party account in accordance with the first-party account ID. Then, the smartphone app providing server 2 may store information that associates the first-party account ID and the third-party account ID with each other, and identify the first-party account ID based on this information. The first-party account ID may be included in the purchase request transmitted from the smartphone 3 to the smartphone app providing server 2, and the smartphone app providing server 2 may transmit the first-party account ID included in the purchase request to the management server 31 while the first-party account ID is included in the purchase information.

Next, the management server 31 awards points to the identified first-party account (step S96 shown in FIG. 19). Herein, in the present embodiment, in the user management information stored in the management server 31, points information is associated with the first-party account ID (see FIG. 18). The points information represents points awarded to the first-party account (in other words, the user) represented by the first-party account ID associated therewith. In the process of step S96, the management server 31 updates the points information stored in the storage section. That is, the management server 31 reads out the points information from the storage section, adds the number of points to be awarded to the number of points represented by the read-out points information, and stores, as updated points information, the points information representing the number of points after the addition in the storage section.

In the present embodiment, based on the purchase information, the management server 31 determines the content (i.e., the number of points to be awarded) of points to be awarded (in other words, added). There is no particular limitation on the content of points to be awarded. In the present embodiment, the management server 31 awards the number of points in accordance with the purchase price included in the purchase information. Specifically, the number of points to be awarded is determined so that it is a predetermined percentage of the amount obtained by subtracting the fee of the service of the smartphone app providing server 2 from the purchase price. Note that the fee is a fee for the service of the third-party business entity providing a smartphone app to the user in place of the first-party business entity.

The management server 31 may award the number of points in accordance with the content of data purchased. For example, the number of points in accordance with the type of the smartphone app purchased may be awarded. That is, the management server 31 may identify the smartphone app purchased based on the smartphone app ID included in the purchase information, and may award a different amount of points depending on the smartphone app. The management server 31 may store, as the points information, the app ID of the application purchased in association with the number of points awarded.

As described above, for the points associated with the first-party account, points in accordance with the purchase for the smartphone app are managed. Herein, since points are awarded in response to purchases by the user, the points can be said to be an index representing the record of purchases. Therefore, by using the points, the first-party business entity can keep track of the purchase record of smartphone apps that the first-party business entity does not directly provide.

In the present embodiment, the first-party service server 1 awards a bonus based on the points to the user of the first-party account ((5) shown in FIG. 18). Specifically, first, the first-party service server 1 determines whether or not the points have satisfied a predetermined award condition. Then, when it is determined that the points have satisfied the predetermined award condition, the first-party service server 1 executes the process of awarding a bonus. Note that there is no particular limitation on the award condition, e.g., a condition that a predetermined number of points has been reached. Note that there may be a plurality of types of award conditions, wherein a different bonus may be associated with each award condition, and each time an award condition is satisfied, a bonus associated with the award condition satisfied may be awarded.

Herein, there is no particular limitation on the content of the bonus awarded to the user. For example, the content of the bonus may be determined based on the purchase information and, specifically, it may be determined based on the smartphone app ID included in the purchase information. That is, when the purchase information is received, the management server 31 may determined, as being the bonus, a game device app that is related to the smartphone app represented by the smartphone app ID included in the purchase information. Note that "a game device app related to a smartphone app" may be the same as that of the example described in "(3-4) Process of purchasing game device app using smartphone" above, or may be a game device app that shares the save data with the smartphone app as described in "(3-5) Process of sharing save data between smartphone app and game device app" above. The bonus may be a smartphone app.

The content of the bonus awarded to the user may be determined based on the user-related information described above. For example, the management server 31 may determined the content of the bonus by predicting the preferences of the user based on the history information included in the user-related information. The management server 31 may determine the content of the bonus by a method similar to the method for determining the content of advertisement information (see "(3-4) Process of purchasing game device app using smartphone") based on the history information of the user described above.

When the user does not own the game device 4, the management server 31 may determine the game device 4 to be the bonus. By awarding the game device 4 as the bonus to a user who does not own the game device 4, it is possible to motivate the user to purchase the game device app. Note that the determination of whether or not the user owns the game device 4 may be made based on whether or not the user management information includes a game device ID. That is, when the award condition is satisfied by the points, the management server 31 determines whether or not a game device ID is registered in the user management information for the first-party account associated with the points. The management server 31 may determined the game device 4 to be the bonus when a game device ID is not registered in the user management information, and may determine the game device app to be the bonus when a game device ID is registered in the user management information.

As described above, the bonus may be data that can be transmitted via a network, something that is not data, or a service in one form or another. When data that can be transmitted from the first-party service server 1 via a network is awarded as the bonus, the first-party service server 1 performs the process of transmitting the data as the process of awarding the bonus. For example, the game device app providing server 32 transmits data relating to the game device app to the game device 4. Note that the data to be the bonus may be program data of the game device app or may be game data used in the game device app (data such as items, money used in an app, characters, and/or additional levels). Note that the game device 4 to be the destination is determined based on the game device ID included in the same user management information as the points information that has satisfied the award condition. As described above, by awarding data relating to a game device app as the bonus, it is possible to motivate the user to use the game device app.

When the bonus is awarded, the management server 31 may execute the process of transmitting a notification relating to the bonus to the terminal (the smartphone 3 and/or the game device 4) as the process of awarding the bonus. That is, when the bonus is awarded (i.e., when the award condition is satisfied), the management server 31 transmits, to the terminal, a notification that the bonus is to be awarded. In the present embodiment, the management server 31 transmits a notification to the game device 4 when the user owns the game device 4, and transmits a notification to the smartphone 3 when the user does not own the game device 4. Then, a notification relating to the bonus can be given reliably. Note that as described above, the determination of whether or not the user owns the game device 4 may be made based on whether or not the user management information includes a game device ID. The game device 4 or the smartphone 3 to be the destination is identified by the game device ID or the smartphone ID included in the user management information.

Note that the terminal to which the notification is transmitted may be determined by any method. For example, in other embodiments, the management server 31 may transmit a notification to the smartphone 3, or may transmit a notification to both the smartphone 3 and the game device 4.

In the present embodiment, the management server 31 transmit the notification by push transmission to the terminal. Note however that in other embodiments, the management server 31 may transmit the notification to the terminal in response to an inquiry from the terminal which is made in response to an instruction from the user.

(Where Purchase is Made while App is being Executed on Smartphone)

Figure 20:
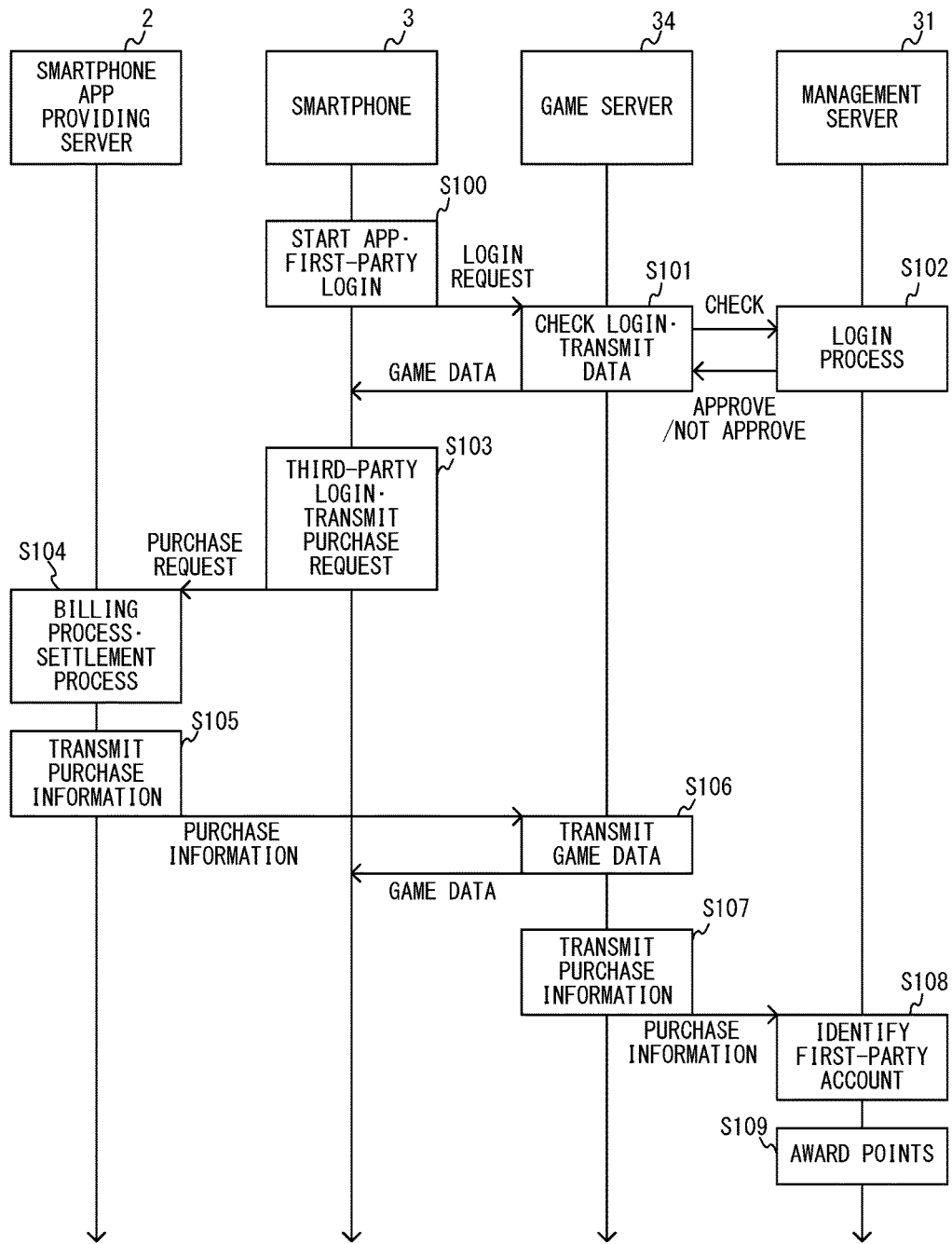
FIG. 20 is a diagram showing an exemplary flow of a process of managing points when a non-limiting smartphone obtains data from a non-limiting game server.

Next, an exemplary process where data of the purchase is provided from the game server 34 to the smartphone 3 will be described. FIG. 20 is a diagram showing an exemplary flow of a process of managing points in a case where the smartphone obtains data from the game server. For example, when obtaining game data to be used in the smartphone app (e.g., when purchasing money or items used in the game), the series of processes shown in FIG. 20 is executed.

In the series of processes shown in FIG. 20, first, the smartphone 3 starts (i.e., opens) a smartphone app in response to a start instruction from the user, and performs a login (step S100). In response to this, the game server 34 performs a login check with the management server 31 and, if the login is approved by the management server 31, transmits game data to the smartphone 3 (step S101). At this point, the management server 31 performs the login process described above (step S102). The smartphone 3 starts the game process using the received game data. Note that since the series of processes of steps S100 to S102 is the same as the series of processes of steps S11 to S13 (or steps S50 to S52 described above), detailed description thereof will be omitted.

In FIG. 20, the user performs a purchase operation for a smartphone app within a smartphone app (i.e., using the function of the smartphone app). For example, the smartphone 3 displays a purchase image for performing the purchase operation on the display section 15 at any point in time (e.g., in response to the user giving a predetermined instruction) while the smartphone app is being executed. The purchase image is an image that is displayed within a smartphone app, i.e., an image that is generated by executing the smartphone app.

Note that in other embodiments, instead of the purchase image, the smartphone 3 may accept a purchase operation on a purchase webpage which is a webpage provided by the smartphone app providing server 2. That is, in response to a predetermined user instruction within the smartphone app, the smartphone 3 transmits, to the smartphone app providing server 2, information representing a request to obtain the purchase webpage. The smartphone app providing server 2 having received the information of the request transmits the purchase webpage to the smartphone 3. The smartphone 3 displays the purchase webpage on the display section 15 using a browser app.

Figure 21:
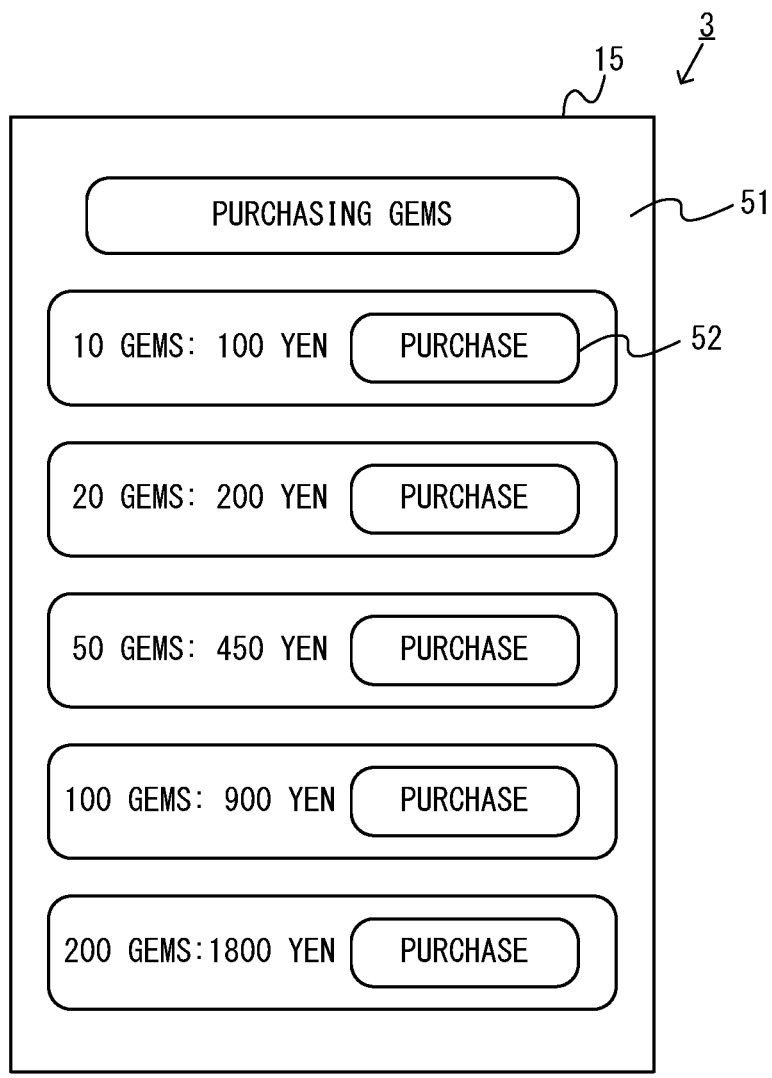
FIG. 21 is a diagram showing an exemplary purchase image displayed on a non-limiting smartphone.

FIG. 21 is a diagram showing an exemplary purchase image displayed on the smartphone 3. In FIG. 21, a purchase image 51 displayed on the display section 15 is an image for purchasing gems used in the smartphone app. The purchase image 51 includes instruction images 52 for giving an instruction to purchase gems (in FIG. 21, a plurality of instruction images each corresponding to a different number of gems to be purchased). Note that gem is an example of an item that can be purchased. For example, gems can be used in a game of a smartphone app for obtaining items or characters and for playing the game. Note that gems are obtained by being purchased by the user, or may be awarded to the user under a certain condition. For example, a predetermined number of gems may be awarded for free in response to a login, or a predetermined number of gems may be awarded for free for every passage of a predetermined period of time. The user can give an instruction to purchase gems by specifying the instruction image 52 included in the purchase image 51.

When an instruction to purchase gems is given, the smartphone 3 transmits the information of the purchase request to the smartphone app providing server 2 (step S103). Note that before the transmission of the information of the purchase request (or simultaneously with the transmission of the information of the purchase request), the smartphone 3 accesses the smartphone app providing server 2 and logs in to the service of the smartphone app providing server 2 with the third-party account ID. Note that the login to the service of the smartphone app providing server 2 may be performed at any point in time while the smartphone app is being executed or before the execution of the smartphone app. The login to the third-party service may be able to be performed by single sign-on.

When the information of the purchase request is received, the smartphone app providing server 2 executes the billing process in response to the purchase request and executes the settlement process as necessary (step S104). Also in the process of step S104, as in the process of step S92, there is no particular limitation on the specific process content of the billing process and the settlement process.

When an obtainment condition for obtaining game data (e.g., data of gems) used in the smartphone app by the smartphone 3 (in other words, the user) is satisfied as a result of the billing process and the settlement process, the smartphone app providing server 2 transmits the purchase information to the game server 34 (step S105). As described above, the purchase information includes information of the purchase price, information representing the content of the data purchased, and the third-party account ID. Herein, the information representing the content of the data purchased includes information indicating the number of gems purchased, for example.

When the purchase information is received, the game server 34 transmits game data in accordance with the purchase information to the smartphone 3 (step S106). Herein, as the game data, data for adding gems (e.g., data representing the number of gems to be added) in the game of the smartphone app of the smartphone 3 is transmitted. Note that in the process of step S106, the game server 34 may update the smartphone save file as necessary (step S74 shown in FIG. 17) and, if there is a change to the shared save data, may further update the shared save data of the game device save file (step S75 shown in FIG. 17).

The game server 34 transmits, to the management server 31, the purchase information received from the smartphone app providing server 2 (step S107). Note that the game server 34 transmits, at least to the management server 31, information of the purchase price and information of the third-party account ID, from among the received purchase information. In response to this, the management server 31 identifies the first-party account corresponding to the third-party account on which the purchase relating to the smartphone app has been made (step S108), and awards points to the identified first-party account (step S109). Note that the process of steps S108 and S109 is similar to the process of steps S95 and S96 described above.

Note that although the smartphone app providing server 2 transmits the purchase information to the game server 34 in FIG. 20, it may transmit the purchase information to the management server 31. Then, the management server 31 transmits, at least to the game server 34, information representing the content of the data purchased, from among the received purchase information. Thus, the game server 34 can transmit game data corresponding to the purchase information to the smartphone 3. In other embodiments, the smartphone app providing server 2 may transmit the purchase information to both the game server 34 and the management server 31. The smartphone app providing server 2 may transmit information representing the content of the data purchased to the game server 34, and transmit information of the purchase price and information of the third-party account ID to the management server 31.

In FIG. 20, the management server 31 may award points in accordance with the purchase relating to the smartphone app on the condition that the terminal is logged in to the first-party service. That is, in the process of step S109, the management server 31 determines whether or not the smartphone 3 is logged in with the first-party account identified by the process of step S108. This determination can be made based on the login status information described above stored in the management server 31. The management server 31 may execute the process of awarding points when it is determined that the smartphone 3 is logged in, and not execute the process of awarding points when it is determined that the smartphone 3 is not logged in. Then, it is possible to motivate the user to log in. In other embodiments, the first-party service server 1 may award more points when the smartphone 3 is logged in as compared with when the smartphone 3 is not logged in.

(Other Processes)

In addition to the series of processes shown in FIG. 19 and FIG. 20, in the present embodiment, the first-party service server 1 further obtains purchase information relating to the game device app, and awards points based on the purchase information. Specifically, the management server 31 obtains additional purchase information including information relating to the purchase of data relating to the game device app on the game device 4. For example, the additional purchase information is generated by the game device app providing server 32 based on the purchase request from the game device 4, and is transmitted from the game device app providing server 32 to the game device 4. Note that the additional purchase information includes information of the purchase price, information representing the content of the data purchased, and the first-party account ID. Based on the additional purchase information obtained, the management server 31 updates the points information associated with the first-party account ID relating to the game device 4 corresponding to the additional purchase information. Note that since the additional purchase information includes the first-party account ID, it is possible to identify points information that should be updated, from among points information that are associated with a plurality of first-party accounts stored in the management server 31, based on this first-party account ID.

The management server 31 may manage points so that points based on purchase information corresponding to smartphone apps and points based on purchase information corresponding to game device apps are added together, or may manage these two types of points separately. When the two types of points are added together, the management server 31 can manage the purchase record relating to smartphone apps and the purchase record relating to game device apps together with each other.

In the present embodiment, the points information can be viewed by the user. That is, in response to a request from a terminal (the smartphone 3 and/or the game device 4), the management server 31 may transmit, to the terminal, information representing the number of points. For example, the first-party service server 1 may allow the number of points to be viewed on a shopping website that is provided by the game device app providing server 32. Note that the first-party service server 1 receives, from the terminal, information of a view request that includes a first-party account ID and a password, and when the login with the first-party account ID and the password is approved, the first-party service server 1 may present, to the terminal, the number of points represented by the points information associated with the first-party account ID.

Note that in other embodiments, the user may not be able to view the points information. That is, the first-party service server 1 does not need to allow the smartphone 3 and the game device 4 to view the points information. For example, the points information may be used only for the purpose for the first-party business entity to keep track of the record of use (herein, purchase) of smartphone apps.

Note that in the present embodiment, when game data used for a smartphone app is obtained, the billing process (and the settlement process as necessary) is executed on the third-party service (i.e., the smartphone app providing server 2) (FIG. 20). Herein, in other embodiments, in such a case, the billing process (and the settlement process as necessary) may be executed on the first-party service server 1. Then, when game data relating to a smartphone app is purchased on the smartphone 3, as when game data relating to a game device app is purchased on the game device 4, the management server 31 may obtain purchase information from the app providing server 32 and update the points information based on the obtained purchase information.

(Functions/Effects of the Process)

As described above, in the present embodiment, the first-party service server 1 communicates with the first information processing device (i.e., the game device 4) having the platform of the first type, and communicates with the second information processing device (i.e., the smartphone 3) having the platform of the second type different from the platform of the first type. Herein, the smartphone 3 is able to obtain, from another app providing server (i.e., the smartphone app providing server 2) different from the first-party service server 1, data relating to a second application (i.e., the smartphone app) that is compatible with the platform of the second type and not compatible with the platform of the first type. The first-party service server 1 obtains app information (purchase information in the present embodiment) relating to the obtainment of data relating to the smartphone app on the smartphone 3 (step S95 shown in FIG. 19, step S108 shown in FIG. 20). The first-party service server 1 stores information (i.e., the user management information) in which first identification information (i.e., the first-party account ID) relating to the game device 4 and record information (the points information in the present embodiment) relating to the obtainment of data relating to the smartphone app are associated with each other (see FIG. 18). The first-party service server 1 identifies points information that is associated with the first-party account ID corresponding to the obtained purchase information, from among the stored points information (step S95 shown in FIG. 19, step S108 shown in FIG. 20). Note that "the first-party account ID corresponding to the obtained purchase information" refers for example to the first-party account ID set for the user identified by the obtained purchase information, in other words, the first-party account ID set for the user who has made the purchase (in other words, obtainment) represented by the purchase information. The first-party service server 1 updates the identified points information based on the obtained purchase information (step S96 shown in FIG. 19, step S109 shown in FIG. 20).

In the above description, the app information is not limited to information relating to the obtainment of data relating to the smartphone app on the smartphone 3, but may be information relating to the use of the smartphone app. Then, the record information may be information representing the record relating to the use of the smartphone app. That is, although the record relating to the obtainment of data relating to the smartphone app is managed by the first-party service server 1 in the present embodiment, the record relating to the use of the smartphone app may be managed by the first-party service server 1 in other embodiments.

The first-party service server 1 manages the record of purchase relating to the smartphone app in the present embodiment, the record managed by the first-party service server 1 is not limited to the record relating the purchases in other embodiments. That is, in other embodiments, the first-party service server 1 may manage the record relating to the obtainment of data relating to the smartphone app that is for free, or may manage the record relating to the use of data relating to the smartphone app that is for free.

With conventional information processing systems in which an application is provided from a server to a terminal-side information processing device and the application provided is used on the terminal-side information processing device, there is a demand for being able to keep track, on the server side, of the record of use of applications on the terminal side. For this, according to the embodiment described above, the use record (the purchase record in the present embodiment) of a service of the smartphone app providing server 2, which is a service different from the first-party service, can be managed by the first-party service server 1. The first-party business entity can keep track of the record relating to smartphone apps that are developed by the first-party business entity and provided by the smartphone app providing server 2.

Note that the record information (the points information in the present embodiment) can be said to be an index representing the record of use of smartphone apps by the user (the record of purchase in the present embodiment). In other embodiments, the first-party service server 1 does not need to award a bonus based on the record information, but may only use the record information as customer information within the first-party business entity.

On the other hand, when a bonus is awarded in accordance with the record information, it is possible to promote, by means of a bonus, the use of smartphone apps (hence the use of first-party services) by the user. When a bonus relating to a game device app is awarded, it is possible to promote the use of the game device app. For example, by awarding a game device app itself or a game device 4 itself as a bonus, it is possible to motivate the user to use game device apps, and to promote the use thereof.

Note that although the points information is used as the record information in the present embodiment, the record information is not limited to points information but may be any information that represents the use record of the user. For example, in other embodiments, the record information may be information representing the total sum of the amounts purchased or may be information representing the history of purchases. As described above, the record information is not limited to information relating to a purchase, but may be information representing the history relating to the use of smartphone apps for free and/or the history relating to the obtainment of data of smartphone apps for free.

In the present embodiment, the first-party service server 1 obtains second identification information (i.e., the third-party account ID) used for obtaining data (purchase of data in the present embodiment) relating to the smartphone app relating to the purchase information. Note that the third-party account ID is not limited to an ID that is used for obtaining data relating to a smartphone app, but may be used for the use of the smartphone app. The first-party service server 1 (specifically, the management server 31) stores the first-party account ID and the third-party account ID in association with each other (see FIG. 18). The first-party service server 1 identifies the points information associated with the first-party account ID associated with the third-party account ID obtained relating to the obtained purchase information.

According to the description above, by storing the first-party account ID and the third-party account ID in association with each other, the first-party service server 1 can easily identify the first-party account for which the points information should be updated based on the third-party account ID that is used for obtaining data of the smartphone app.

Note that in other embodiments, the first-party service server 1 does not need to store information in which the first-party account ID and the third-party account ID are associated with each other. For example, when the process of managing points shown in FIG. 18 to FIG. 21 is not executed by the first-party service server 1, the first-party service server 1 does not necessarily need to store this information.

In the present embodiment, the first-party service server 1 obtains purchase information transmitted from the smartphone app providing server 2 (FIG. 19, FIG. 20). Note that in other embodiments, the smartphone 3, instead of (or in addition to) the smartphone app providing server 2, may transmit the purchase information to the first-party service server 1. Then, the first-party service server 1 may obtain the purchase information transmitted from the smartphone 3. Note that when the first-party service server 1 obtains the purchase information transmitted from the smartphone app providing server 2 and manages the points using this purchase information, as in the present embodiment, it is possible to reduce the possibility that the purchase information may be doctored by the user.

In the present embodiment, the smartphone 3 transmits a request (i.e., the purchase request) associated with the third-party account ID to the smartphone app providing server 2, to thereby obtain data relating to a smartphone app from the app providing server (steps S91 and S93 shown in FIG. 19). The smartphone app providing server 2 transmits data relating to a smartphone app to the smartphone 3 in response to a request (step S93 shown in FIG. 19), and transmits the purchase information relating to the transmission of the data to the first-party service server 1 while the purchase information is associated with the third-party account ID associated with the request (with the third-party account ID included in the purchase information in the present embodiment) (step S94 shown in FIG. 19).

According to the description above, when data relating to a smartphone app from the smartphone app providing server 2 is obtained by the smartphone 3, the first-party service server 1 can easily identify the first-party account for which the points information should be updated.

In the present embodiment, the first-party service server 1 includes the game server 34 that is accessed when the smartphone 3 executes a process in a smartphone app. The smartphone 3 transmits a request to obtain data relating to a smartphone app (i.e., the purchase request) to smartphone app providing server while the request is associated with the third-party account ID (step S103 shown in FIG. 20). The first-party service server 1 receives a notification (i.e., the purchase information) that the condition relating to the obtainment of data relating to the smartphone app has been satisfied, transmitted from the smartphone app providing server 2 in response to the request (step S106 shown in FIG. 20). On the condition that a notification from the smartphone app providing server is received by the first-party service server 1 (which may be the management server 31 or may be the game server 34), the game server 34 transmits data relating to the smartphone app to the smartphone 3 (step S106 shown in FIG. 20).

According to the description above, when data relating to a smartphone app is obtained by the smartphone 3 from the game server 34, the first-party service server 1 can easily identify the first-party account for which the points information should be updated. After confirming that the condition relating to the obtainment of data relating to the smartphone app has been satisfied, the first-party service server 1 can transmit the data to the smartphone 3.

In the present embodiment, the first-party service server 1 further includes an app transmission unit (i.e., the game device app providing server 32) for transmitting, to the game device 4, a first application (i.e., a game device app) that is compatible with the platform of the first type and not compatible with the platform of the second type.

According to the description above, the first-party service server 1 can manage the use record relating to a smartphone app while the use record is associated with a user who uses a service relating to a game device app. As described above, by using such a use record, it is possible to promote the use of game device apps.

The first-party service server 1 can also use such a use record for marketing relating to game device apps. For example, the use record (i.e., the points information) may be used in the process of transmitting an advertisement for a game device app to the smartphone 3 described in "(3-4) Process of purchasing game device app using smartphone" above. That is, the management server 31 may determine the content of advertisement information based on the points information.

In the present embodiment, the first-party service server 1 further obtains additional purchase information representing the record relating to the obtainment of data relating to the game device app (which may be a record relating to the use of the game device app) on the game device 4. Based on the obtained additional purchase information, the first-party service server 1 updates the points information associated with the first-party account ID relating to the game device 4 corresponding to this additional purchase information.

According to the description above, the first-party service server 1 can manage the use record relating to smartphone apps and the use record relating to game device apps together with each other.

In the present embodiment, in response to the content of the points information stored in the management server 31 satisfying a predetermined condition (i.e., the obtainment condition), the first-party service server 1 transmits, to the game device 4, data relating to the game device app (which may be program data of the game device app itself or may be game data used in the game device app).

According to the description above, as a bonus based on the use record relating to smartphone apps, data relating to a game device app is awarded to the user. Thus, the first-party service server 1 can promote, by means of the bonus, the use of game device apps.

In the present embodiment, in response to the content of the points information stored in the management server 31 satisfying a predetermined condition (i.e., the obtainment condition), the first-party service server 1 gives a notification to the game device 4 corresponding to the first-party account ID associated with the points information. Note that this notification in the present embodiment is a notification of awarding a bonus in response to satisfaction of the predetermined condition.

According to the description above, the first-party service server 1 can notify the user that the use record relating to smartphone apps has satisfied the predetermined condition. For example, when the notification is a notification of awarding a bonus, it is possible to notify the user that the bonus is awarded.

In the present embodiment, when obtaining data relating to a smartphone app and/or when using a smartphone app on the smartphone 3, the first-party service server 1 determines whether or not a condition relating to a predetermined process based on the first-party account ID (specifically, a login process performed in response to an instruction from the user) has been satisfied (i.e., whether or not a login has been done), and varies the content of the update of the points information depending on the determination result (e.g., the points information is updated when the login has been done and the points information is not updated when the login has not been done).

According to the description above, when the predetermined process is a login process, it is possible to motivate the user to log in.

In the present embodiment, the use record of smartphone apps on a smart device (i.e., the smartphone 3) which is an information processing device that is more prevalent is managed on the first-party service for the game device 4 which is an information processing device that is less prevalent. Then, the first-party service server 1 can obtain more use records (as compared with a case where only the use record of game device apps is obtained), and it is possible to obtain useful information that can be used for marketing and awarding bonuses.

(Variation)

The description above is directed to an example where the exemplary process shown in FIG. 18 to FIG. 20 is applied to a system for a service of providing applications such as the smartphone app providing server 2. Herein, in other embodiments, the exemplary process described above can be applied not only to systems for providing applications but also to systems for selling goods. For example, the exemplary process described above may be used so that the use record (specifically, the purchase record) on a first sales service system (e.g., a shop server for providing a shopping website for selling goods) that manages a user with a first account is managed on a second service system (which may be a server providing any service) that manages a user with a second account.

(3-7) Process of Sharing Friend List Between Smartphone and Game Device

Next, referring to FIG. 22 to FIG. 27, a process in which a friend list is shared between the smartphone 3 and the game device 4 will be described. In the present embodiment, the terminal (the smartphone 3 and/or the game device 4) stores a friend list that is used in an application. In the present embodiment, a friend list is shared between the smartphone 3 and the game device 4 (i.e., the same friend list is used by the smartphone 3 and the game device 4). Therefore, in the present embodiment, when a certain user is registered as a friend on the smartphone 3, the user is registered as a friend also on the game device 4. Thus, it is possible to improve the convenience with friends registered on terminals. A user who is registered as a friend on one terminal is treated as a friend also on another terminal (under a certain condition as will be described below), and it is therefore possible to promote interactions with other users. Thus, for users who use either smartphone apps or game device apps, it is possible to promote the use of the other type of applications. The process of sharing a friend list will now be described in detail.

Herein, a friend list is a list of other users registered as friends of the user of the terminal (in other words, the user of the first-party account). A friend refers to another user that the user can interact with in an application executed on the smartphone 3 or the game device 4. For example, the user can exchange messages, still images, videos and/or sounds with users who are friends, and can play a game in cooperation with other users who are friends. A user who is a friend may be given more privileges than a user who is not registered as a friend. For example, personal information (e.g., age, address, etc.) relating to a user may be allowed to be viewed only by other users who are friends of the user.

Figure 22:
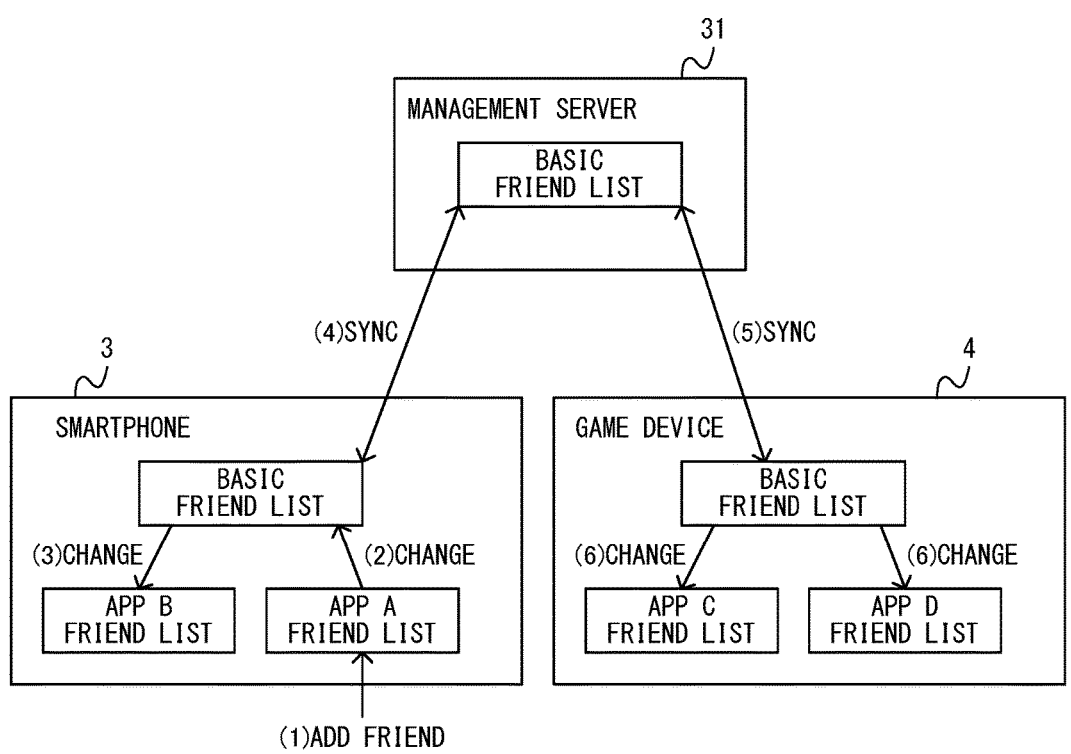
FIG. 22 is a diagram showing an exemplary outline of a process of sharing a friend list between a non-limiting smartphone and a non-limiting game device.
Figure 23:
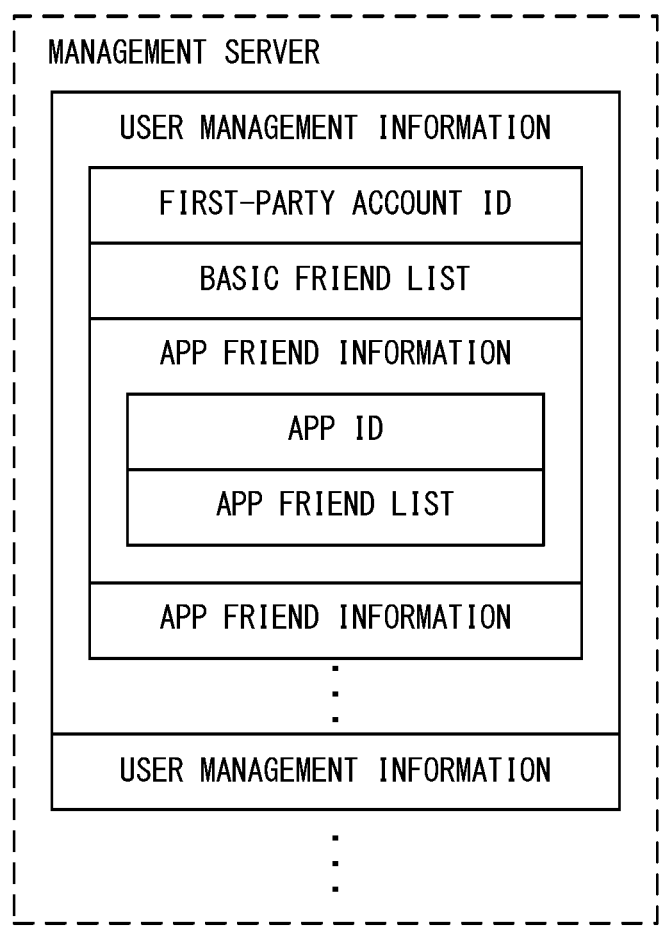
FIG. 23 is a diagram showing an example of user management information stored on a non-limiting management server.

FIG. 22 is a diagram showing an exemplary outline of a process of sharing a friend list between a smartphone and a game device. FIG. 23 is a diagram showing an example of user management information stored on a management server. Note that FIG. 23 only shows information used in this exemplary process, from among various information included in the user management information.

(Configuration of Friend List)

As shown in FIG. 22, in the present embodiment, there are two types of friend lists, i.e., a basic friend list and an app friend list.

A basic friend list is a list of friends relating to the user of the first-party account. In the present embodiment, the basic friend list is stored in each terminal (FIG. 22). The basic friend list is stored also in the management server 31. As shown in FIG. 23, the basic friend list is stored, in the user management information, in association with the first-party account ID.

On the other hand, an app friend list is set for each application (a smartphone app or a game device app), and is a friend list used in the application. That is, in the present embodiment, in each application, friend-related processes are executed by using the app friend list set for that application, not the basic friend list.

As described above, in the present embodiment, an app friend list is set for each application. Then, it is possible to register friends for each application, and it is therefore possible to improve the convenience with friends. Herein, it is believed that the plurality of applications of the first-party service include various types of applications, and the method of using friends and the purpose of using friends may differ for each application. For example, in an application such as a racing game, a friend is merely an opponent in the game, whereas in an application whose objective is to interact with other users, the user is sometimes able to chat with friends.

Thus, it is believed that what the user considers a qualification "to be a friend" may differ for each application. That is, the user may not like to register someone, who is registered as a friend in one application, as a friend in another application. For example, while for the user, a certain user may be acceptable as an opponent in a particular game application, the user may not like to chat with the certain user in another application.

Therefore, in the present embodiment, the first-party service server 1 employs a configuration in which an app friend list is set for each application. Then, for example, a user who is acceptable as an opponent in a racing game may be registered as a friend only in an app friend list of that racing game application while not registered as a friend in other app friend lists. Thus, with the configuration in which friends can be set for each application, it is possible to improve the convenience with friend setting.

Note that in other embodiments, some predetermined sets of applications, from among the plurality of applications of the first-party service, may each share an app friend list. For example, such a set of applications may be a set of a smartphone app and a game device app that share save data, or a plurality of applications belonging to the same series (e.g., a certain game application and a game application that is a sequel to the game application), etc. Note that there is no particular limitation on the method by which app friend lists are shared. The first-party service server 1 may store one app friend list for a set of applications as described above, or may set an app friend list for each application included in the set so that the app friend lists are synced with each other.

As shown in FIG. 22, the smartphone 3 stores app friend lists corresponding to smartphone apps. The game device 4 stores app friend lists corresponding to game device apps. Moreover, although not shown in FIG. 22, the management server 31 stores app friend information including app friend lists corresponding to smartphone apps and game device apps, as shown in FIG. 23. Specifically, the user management information stored in the management server 31 includes app friend information for each application. The app friend information includes the app ID of the application and the app friend list of the application. Note that the app friend information is stored for each application that can be executed on a terminal that corresponds to the first-party account associated therewith.

Note that the smartphone 3 stores the basic friend list and the app friend lists in the storage section 14. The game device 4 stores the basic friend list and the app friend lists in the storage section 25. The management server 31 stores the basic friend list and the app friend lists in the storage section thereof.

Note that information of a friend included in a friend list (a basic friend list or an app friend list) includes the first-party account ID of a user who is the friend.

In the present embodiment, because the basic friend list is stored in the management server, the basic friend list in the smartphone 3 and the basic friend list in the game device 4 are synced together, the details of which will be described later. When a friend is added to any app friend list, the addition of the friend is also reflected in the basic friend list under a certain condition. Moreover, when there is a change to the basic friend list, the change to the basic friend list is also reflected to other app friend lists under a certain condition.

(Specific Exemplary Process of Changing Friend List)

Figure 24:
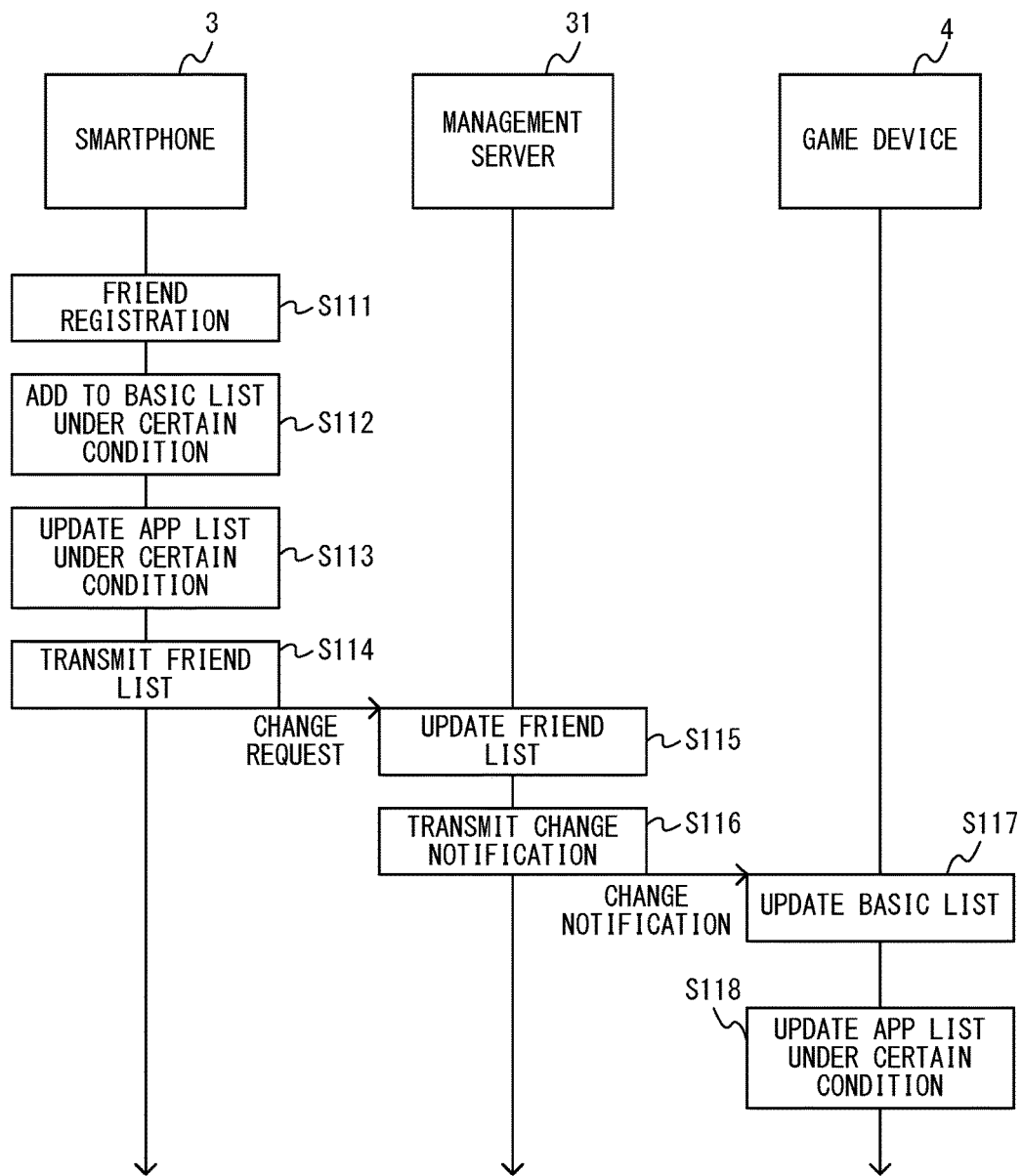
FIG. 24 is a diagram showing an exemplary flow of a process of changing a friend list.

Next, referring to FIG. 22 and FIG. 24, an exemplary process executed when changing a friend list. FIG. 24 is a diagram showing an exemplary flow of a process of changing a friend list. The description below is directed to an example where in response to a new registration of a friend in a certain smartphone app A on the smartphone 3, the basic friend list and another app friend list (an app friend list of another smartphone app other than the smartphone app A) are changed.

In this exemplary process, first, the smartphone 3 registers a new friend in a certain smartphone app A ((1) shown in FIG. 22, step S111 shown in FIG. 24). Specifically, the app friend list of the smartphone app A ("app A friend list"

shown in FIG. 22) stored in the storage section 14 is updated so that the first-party account ID of the new friend is added thereto.

Herein, there is no particular limitation on the method for registering (in other words, adding) a friend in an application (a smartphone app and/or a game device app). For example, a friend is registered as follows:

(a) By Friend Requests from Other Users

Where an application has the function of making a friend request to other users, if a user approves a friend request from another user, the other user is registered as a friend.

(b) By Exchanging Information

When a terminal of a user communicates, and exchanges information relating to the first-party account (e.g., the first-party account ID), with the terminal of another user, the other user is registered as a friend.

(c) By Contact List

Other users included in the contact list stored in the smartphone 3 (i.e., users whose phone numbers are registered in the contact list) may be registered as friends under a predetermined condition. For example, in response to the user specifying another user included in the contact list, the other specified user may be registered as a friend. Herein, the management server 31 obtains and stores information of the contact list stored in the smartphone 3. Thus, based on the phone number of the other specified user, the management server 31 can identify the first-party account ID of the other user. For example, when users are each registered in the contact list of the other, the management server 31 may register each user as a friend of the other user. Note that the function of registering friends from the contact list of the smartphone 3 may be implemented on the smartphone 3 by an application (i.e., a smartphone app) that corresponds to the app friend list to which the friend is added, or may be implemented on the smartphone 3 by another application.

(d) Based on Friend Relationship of Another Network Service

Another user who is registered as a friend on another network service (e.g., an SNS, etc.) different from the first-party service may be registered as a friend under a predetermined condition. In such a case, the management server 31 stores information representing the association between a first-party account and an account of another network service. For example, the management server 31 registers, as a friend, a user of a friend who is specified by the user from among friends of another network service. For example, the management server 31 obtains information representing the friend relationship on another network service, and when users are registered as friends with each other on the other network service, the management server 31 may register the other user as a friend. On Twitter (registered trademark), for example, if users are following each other, one user may register the other user as a friend. Note that the function of registering a friend of another network service may be implemented on the terminal by an application that corresponds to the app friend list to which the friend is added, or may be implemented on the terminal by another application.

In the process of step S111, the smartphone 3 stores obtaining method information representing the method of obtaining information for performing friend registration. The information for performing friend registration is the first-party account ID in the methods (a) and (b) above, information of the phone number in the method (c) above, the account information on another network service in the method (d) above, etc.

Specifically, when the friend registration method is the method (a) above, the smartphone 3 stores, as the obtaining method information, information indicating that it is a friend request within an application, or the app ID of the application (i.e., the smartphone app).

When the friend registration method is the method (b) above, the smartphone 3 stores, as the obtaining method information, the method by which information is exchanged (e.g., the communication method, etc.). For example, when the exchange of information relating to the first-party account is done by short-range communication such as infrared communication or Bluetooth (registered trademark), the smartphone 3 stores, as the obtaining method information, information representing the method using the short-range communication. On the other hand, when the exchange of information relating to the first-party account is done by communication via a wide area network such as the Internet or a mobile communications network, the smartphone 3 stores, as the obtaining method information, information representing the method using the communication via a wide area network.

When the exchange of information is performed by a method such that a pairing operation is required, the smartphone 3 stores, as the obtaining method information, information representing the method requiring pairing. For example, when this exchange of information is done, there is a method that requires users to perform, as a pairing operation, an operation of lightly bumping the smartphones 3 against each other in order to identify two smartphones 3 to be a pair for exchanging information. With this method, each smartphone 3 detects the bumping by an acceleration sensor, or the like, for example, and information is exchanged between a pair of two smartphones 3 that detect the bumping at the same time. When the exchange of information is done by such a method, it can be assumed that the users are face-to-face.

When the smartphone 3 is capable of detecting position information, the smartphone 3 may generate the obtaining method information based on the position information. That is, the smartphone 3 may store, as the obtaining method information, information representing the positional relationship between the smartphones 3 when the exchange of information is done. For example, the obtaining method information may be information representing the positions of the smartphones 3 when the exchange of information is done, or may be information representing whether or not the positions of the smartphones 3 are within a predetermined distance.

Note that the method that requires pairing may be a method of identifying a pair that exchange information with each other based on the position information in addition to the detection result of the pairing operation. For example, the smartphone 3 may identify two smartphones that satisfy a condition as the pair, wherein the condition is that the bumping of the smartphones is detected at the same time and the positions of the smartphones are within a predetermined distance from each other at the time of bumping. Note that then, the smartphone 3 may store, as the obtaining method information, information representing the method that requires pairing, or may store, as the obtaining method information, information representing the positional relationship.

When the friend registration method is the method (c) above, the smartphone 3 stores, as the obtaining method information, information representing a method that uses a contact list.

When the friend registration method is the method (d) above, the smartphone 3 stores, as the obtaining method information, information representing another network service.

Figure 25:
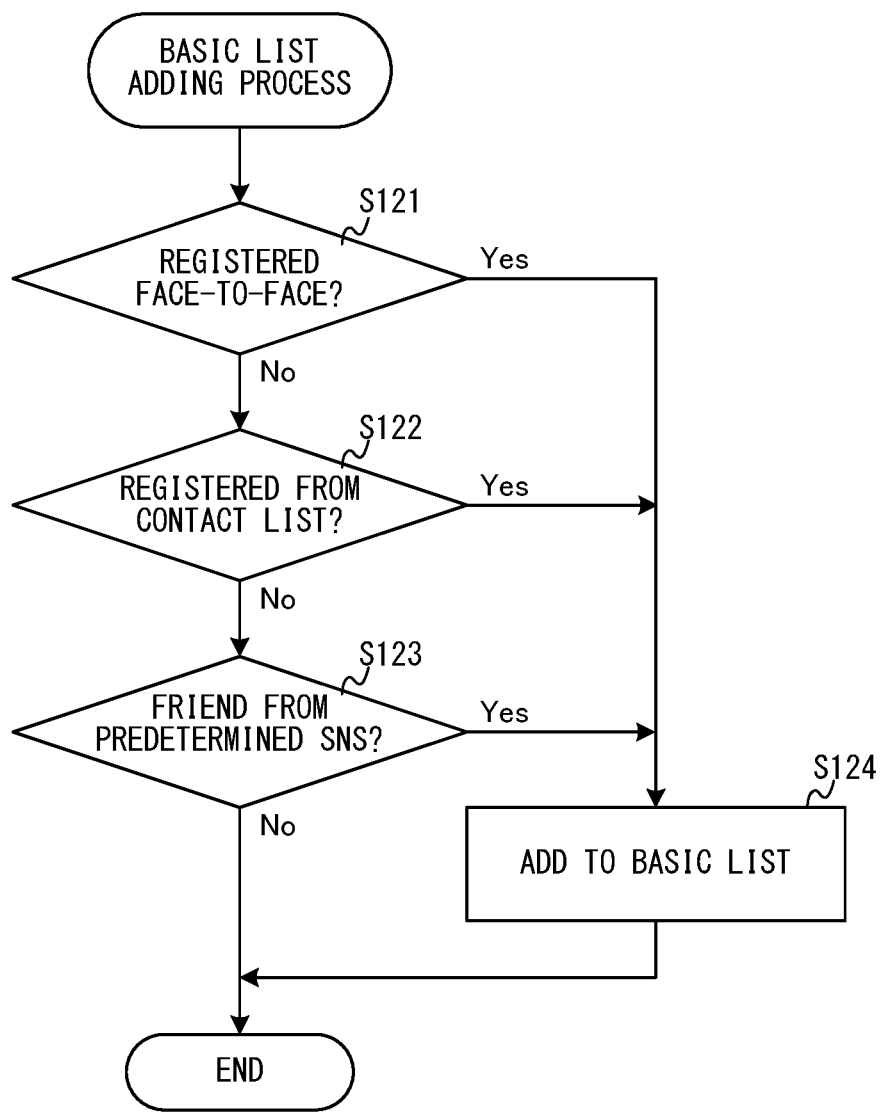
FIG. 25 is a flow chart showing an exemplary flow of a basic list adding process.

Following step S111, the smartphone 3 adds a friend added to the app friend list in step S111 (hereinafter, referred to as the "added friend") to the basic friend list under a certain condition (step S112). Referring to FIG. 25, the process of adding a friend of an app friend list to the basic friend list (the basic list adding process) will now be described in detail.

FIG. 25 is a flow chart showing an exemplary flow of the basic list adding process. Although it is assumed in the present embodiment that the processing section 13 (specifically, the CPU) of the smartphone 3 executes the processes of the various steps shown in FIG. 25, the processes of some of the steps in the flow chart may be executed by a processor other than the CPU or a dedicated circuit.

The processes of the steps of the flow chart shown in FIG. 25 (this similarly applies to the flow chart of FIG. 26 to FIG. 28 to be described below) are merely illustrative, and the order of steps to be performed may be switched around and different processes may be executed in addition to (or instead of) the processes of the steps, as long as similar results are obtained.

In the basic list adding process shown in FIG. 25, first, the smartphone 3 determines whether or not the friend registration has been performed while two users (i.e., a user corresponding to the basic friend list and a user corresponding to the added friend) are face-to-face (step S121). The determination process of step S121 is made based on the obtaining method information. Herein, when the friend registration is performed while the users are face-to-face, it can be said that the users know each other and therefore the user of the added friend is a person who can be trusted. The process of step S121 is a process for determining whether or not the users know each other, in other words, a process for determining whether or not the user of the added friend is a person who can be trusted.

Specifically, when the obtaining method information is information indicating that it is a friend request within an application (i.e., when information is obtained by the method (a) above), it can be assumed that the user of the added friend is merely one of many users who use the application and that the possibility that the friend registration was performed while the users were face-to-face is low. Therefore, in such a case, the smartphone 3 determines that the friend registration was not performed face-to-face.

When the obtaining method information indicates a method using the short-range communication, it can be assumed that the users exchanged information via communication while they were close to each other. Therefore, in such a case, the smartphone 3 determines that the friend registration has been performed face-to-face.

On the other hand, when the obtaining method information indicates a method using communication via a wide area network, it can be assumed that the users exchanged information via communication while they were remote from each other. Therefore, in such a case, the smartphone 3 determines that the friend registration was not performed face-to-face.

When the obtaining method information indicates a method that requires pairing, it can be assumed that the users exchanged information via communication while they were close to each other. Therefore, in such a case, the smartphone 3 determines that the friend registration has been performed face-to-face.

When the obtaining method information indicates the positional relationship between the smartphones 3, the smartphones 3 can predict based on the information whether or not the two users were close to each other when they exchanged information (i.e., whether they exchanged information via communication face-to-face). Therefore, based on whether or not the two users were close to each other when they exchanged information, the smartphone 3 determines whether or not the friend registration was performed face-to-face.

When it is determined in the determination of step S121 that the friend registration was performed face-to-face, the process of step S124 to be described below is executed. On the other hand, when it is determined in the determination of step S121 that the friend registration was not performed face-to-face, the process of step S122 is executed.

In step S122, the smartphone 3 determines whether or not the added friend is a user who has been added from the contact list of the smartphone 3. The determination of step S122 is made based on whether or not the obtaining method information indicates a method using the contact list. Herein, it can be assumed that the user registered in the contact list of the smartphone 3 is a user who the user of the smartphone 3 knows, and such a user can be said to be a person who can be trusted. The process of step S122 is a process of determining whether or not the users know each other, in other words, a process of determining whether or not the user of the registered friend is a person who can be trusted.

When the determination result of step S122 is affirmative, the process of step S124 to be described below is executed. On the other hand, when the determination result of step S122 is negative, the process of step S123 is executed.

In step S123, the smartphone 3 determines whether or not the added friend is a friend who has been added from a predetermined network service. The determination of step S122 is made based on whether or not the obtaining method information is information indicating the predetermined network service. Herein, a predetermined network service is a network service on which users are registered under their real names, for example. Therefore, when the added friend is a friend who has been added from a network service on which users are registered under their real names, the determination result of step S122 is affirmative, whereas when the added friend is a friend who has been added from a network service on which users are not registered under their real names, the determination result of step S122 is negative. Herein, the real name of the user of the added friend is known, it can be said that such a user is a person who can be trusted. The process of step S123 is a process of determining whether or not the user of the registered friend is a person who can be trusted.

When the determination result of step S123 is affirmative, the process of step S124 to be described below is executed. On the other hand, when the determination result of step S123 is negative, the smartphone 3 ends the basic list adding process. In this case, the added friend is not registered in the basic friend list, and no change is made to the basic friend list.

In step S124, the smartphone 3 adds the added friend to the basic friend list. Specifically, the smartphone 3 updates the basic friend list stored in the storage section 14 so that the first-party account ID of the added friend is added thereto. Thus, the basic friend list stored in the smartphone 3 is changed in response to the change to the app friend list of the smartphone app A ((2) shown in FIG. 22). After step S124, the smartphone 3 ends the basic list adding process.

As described above, in the present embodiment, the process of determining whether or not to add the added friend to the basic friend list is performed by determining whether or not the user of the registered friend is a person who can be trusted. Herein, the determination process may be performed by another method. For example, in other embodiments, the smartphone 3 may inquire the user as to whether or not to add the added friend to the basic friend list, and may determine whether or not to add in accordance with an instruction from the user.

Depending on a particular application, it may be possible to assume that the user knows a friend on the particular application. An example of such a particular application is an application in which the app friend list is generated from the contact list of the smartphone 3, for example. In such a case, the smartphone 3 stores the app ID of the application as the obtaining method information in the process of step S111. Then, in the process of step S112, when the app ID represented by the obtaining method information corresponds to the particular application, the smartphone 3 may determine to add the added friend to the basic friend list. Thus, the smartphone 3 may perform the determination process of whether or not to add the added friend to the basic friend list based on whether or not the application to which the friend is to be added is a particular application.

Note that when a friend is removed from the app friend list, the smartphone 3 may remove the friend also from the basic friend list if the removed friend is included in the basic friend list. In other embodiments, in such a case, the smartphone 3 may not change the basic friend list.

Referring back to FIG. 24, following step S112, the smartphone 3 changes another app friend list under a certain condition in response to the change to the basic friend list ((3) shown in FIG. 22, step S113 shown in FIG. 24). Herein, another app friend list is an app friend list of a smartphone app other than the smartphone app A on which the friend has already been added, from among the smartphone apps installed on the smartphone 3 (e.g., the "app B friend list" shown in FIG. 22).

In the present embodiment, when a predetermined condition is satisfied, the other app friend list is changed in response to the change to the basic friend list. Herein, there is no particular limitation on the predetermined condition. In the present embodiment, the smartphone 3 makes a change to the app friend list of a predetermined application, from among the smartphone apps installed on the smartphone 3. For example, the smartphone 3 stores, as information representing the predetermined application, setting information for each application, wherein the setting information indicates whether or not to change the app friend list in response to the change to the basic friend list. Then, in the process of step S113, the smartphone 3 determines whether or not it is a predetermined application based on the setting information. Note that the predetermined application may be pre-set (or programmed) on the smartphone 3 or may be set by the user. That is, the setting information may be pre-stored in the storage section 14 of the smartphone 3 or may be set by the user.

In other embodiments, the predetermined condition may be the same as the condition (or a part thereof) that is used for changing the basic friend list in response to the addition of a friend to the app friend list. The smartphone 3 may perform at least one of the determination processes of steps S121 to S123 described above, and change the other app friend list when the determination result is affirmative. Then, the predetermined condition may be set for each application installed on the smartphone 3.

In other embodiments, the smartphone 3 may change the other app friend list unconditionally in response to the change to the basic friend list. Then, the content of the basic friend list will match the content of the app friend list.

Note that in the present embodiment, when the basic friend list is not changed in the process of step S112, the other app friend list is not changed in the process of step S113. Note however that in other embodiments, even when the basic friend list is not changed in the process of step S112, if a friend is added to the app friend list in the process of step S111, the smartphone 3 may reflect the friend addition to the other app friend list under a certain condition.

When a friend is removed from an app friend list, the smartphone 3 may removed the friend also from another app friend list if the removed friend is included in the other app friend list. In other embodiments, the smartphone 3 may not change the other app friend list in such a case.

There is no particular limitation on the point in time at which to change the app friend list in response to the change to the basic friend list. In the present embodiment, the smartphone 3 may change the app friend list at a point in time when the shared friend list is changed, or may change the app friend list of a smartphone app at a point in time when the smartphone app is started, or may change the app friend list at a point in time when the app friend list is used while the smartphone app is being executed.

Next, the smartphone 3 transmits, to the management server 31, information of the friend list (the basic friend list and/or the app friend list) that has been changed in the process of steps S111 to S113 (step S114). Specifically, the smartphone 3 transmits, to the management server 31, information of a change request to change a friend list. The information of the change request includes content-of-change information representing the content of change, the first-party account ID, and the app ID representing the changed app friend list (when the app friend list is changed). Note that the content-of-change information may be information representing the whole of the changed friend list (i.e., all friends) or may be information representing the changed portion of the friend list.

Note that there is no particular limitation on the point in time when the process of steps S111 to S114 is executed. For example, when step S111 is executed while the smartphone app A is being executed, the process of steps S112 to S114 may also be executed (e.g., following the process of step S111) while the smartphone app A is being executed. For example, the process of step S111 and step S112 may be executed while the smartphone app A is being executed, while the process of step S113 relating to another smartphone app may be executed when the other smartphone app is started. Then, the process of step S114 may be executed after the process of step S113 as well as after the process of step S112.

The process of making a change to the basic friend list may be executed by a dedicated application (referred to as a "friend list change app"), rather than a smartphone app corresponding to the app friend list (i.e., the change may be realized by the smartphone 3 executing a dedicated application). On the other hand, the process of making a change to the app friend list may be executed by a smartphone app corresponding to the app friend list or may be executed by the friend list change app.

The management server 31 having received the information of the change request updates the friend list stored in the storage section thereof (step S115). That is, when there is a change to the basic friend list, the management server 31 updates the basic friend list that is stored while being associated with the first-party account ID included in the change request, based on the content-of-change information included in the change request. Then, the management server 31 stores the updated basic friend list in the storage section. Thus, the content of the basic friend list stored in the smartphone 3 is synced with the content of the basic friend list stored in the management server 31 ((4) shown in FIG. 22).

When there is a change to the app friend list, the management server 31 updates an app friend list that is associated with the app ID included in the change request, from among app friend lists stored while being associated with the first-party account ID included in the change request, based on the content-of-change information included in the change request. Then, the management server 31 stores the updated app friend list in the storage section. Note that when the change request includes information relating to a plurality of smartphone apps, the management server 31 updates each of the app friend lists of the plurality of smartphone apps. Thus, the content of the app friend list stored in the smartphone 3 is synced with the content of the app friend list stored in the management server 31.

When the basic friend list stored in the management server 31 is updated, the management server 31 transmits, to the game device 4, information of a change notification indicating that there is a change to the basic friend list (step S116). The information of the change notification includes content-of-change information indicating the content of change relating to the basic friend list. Note that the management server 31 can identify the destination to which the information of the change notification is transmitted based on the game device ID included in the same user management information as the changed basic friend list.

Note that there is no particular limitation on the point in time when the management server 31 transmits the information of the change notification. The management server 31 may transmit the information of the change notification to the game device 4 by push notification (i.e., a notification by push transmission). The management server 31 may transmit the information of the change notification to the game device 4 in response to a request (e.g., the login request described above) from the game device 4.

When the information of the change notification is received, the game device 4 updates the basic friend list stored in the storage section 25 of the game device 4 based on the information of the change notification (step S117). That is, the game device 4 updates the basic friend list in accordance with the content-of-change information included in the information of the change notification, and stores the updated basic friend list in the storage section 25. Thus, the content of the basic friend list stored in the management server 31 is synced with the content of the basic friend list stored in the game device 4 ((5) shown in FIG. 22).

When the basic friend list is changed on the game device 4, the game device 4 changes the app friend list (the "app C friend list" and the "app D friend list" shown in FIG. 22) under a certain condition in response to the change to the basic friend list ((6) shown in FIG. 22, step S118 shown in FIG. 24). Herein, there is no particular limitation on the condition as to whether or not the game device changes the app friend list in response to the change to the basic friend list. In the present embodiment, the process of step S118 on the game device 4 may be executed by a method similar to the process of step S113 on the smartphone 3. That is, the game device 4 may make a change to the app friend list of a predetermined application from among the game device apps installed on the game device 4. The game device 4 may determine whether or not to make a change to the app friend list using the same condition as the condition (or a part thereof) that is used when changing the basic friend list in response to the addition of a friend to the app friend list. The condition used by the smartphone 3 and the condition used by the game device 4 may be the same or different from each other.

In step S118, the game device 4 may change the app friend list of a game device app related to a smartphone app (i.e., the smartphone app A described above) for which a friend has been added on the smartphone 3. Herein, for example, a game device app related to a smartphone app may be a game device app whose advertisement information is presented while the smartphone app is being executed (see "(3-4) Process of purchasing game device app using smartphone" above), or a game device app that is capable of sharing save data with the smartphone app (see "(3-5) Process of sharing save data between smartphone app and game device app" above).

As described above, in the series of processes shown in FIG. 24, when the basic friend list is changed on the smartphone 3, the basic friend list is changed also on the game device 4. In the present embodiment, also when the basic friend list is changed on the game device 4, the basic friend list is changed on the smartphone 3. That is, when a friend is added to the app friend list of a certain game device app on the game device 4, the game device 4 adds the friend to the basic friend list under a certain condition. The game device 4 adds a friend who has been added to the basic friend list to another app friend list under a certain condition. Moreover, the game device 4 transmits, to the management server 31, information of a change request relating to the information of the changed friend list (the basic friend list and/or the app friend list). The management server 31 changes the friend list stored in the management server 31 based on the information of the change request, and transmits a change notification relating to the basic friend list to the smartphone 3 corresponding to the game device 4. The smartphone 3 changes the basic friend list stored in the smartphone 3 based on the information of the change notification.

Note that the condition for determining whether or not to change the basic friend list in response to a change to the app friend list and the condition for determining whether or not to change the app friend list in response to a change to the basic friend list may the same or different between the smartphone 3 and the game device 4.

In the present embodiment, the basic friend list is changed by a change operation to the basic friend list performed by the user, in addition to being changed in response to the change to the app friend list. In the present embodiment, the terminal (i.e., the smartphone 3 and/or the game device 4) allows the user to make a change directly to the basic friend list by means of the friend list change app described above. Note that the addition of a friend to the basic friend list is done by the methods (b) to (d) described above.

In the present embodiment, the management server 31 may present, to the subject user, another user to be a candidate to be registered as a friend. Specifically, the management server 31 obtains in advance, from terminals owned by a plurality of users, information of friends registered in the contact list information and/or on other network services. Then, at a predetermined point in time, the management server 31 selects another user from among the users registered in the contact list of the user who satisfies the condition that "the subject user is registered in the contact list of the other user (i.e., the users are registered in each other's contact lists)". The selection process may be performed for al the other users registered in the contact list of the subject user, for example. Then, the management server 31 notifies the subject user's terminal of the selected user as being a candidate friend. Also with friends registered on another network service, as with the contact list, the management server 31 selects another user who satisfies the condition that "the users are registered as each other's friends on the other network service", and notifies the subject user's terminal of the selected user as being a candidate friend. These notifications may include the first-party account ID relating to the user being a candidate friend and further include information such as the nickname of the subject user.

There is no particular limitation on the method for giving the notification described above. For example, the management server 31 may transmit the notification by push transmission to the terminal owned by the user. Although there is no particular limitation on the predetermined point in time described above, the management server 31 may transmit the notification to the terminal owned by the user at a point in time when a predetermined application is started, for example. Note that the predetermined application may be the friend list change app described above or a predetermined application (that is different from the friend list change app), or may be all applications that are installed on the terminal and that correspond to the first-party service. In the process of step S111, the smartphone 3 may receive the notification from the management server 31, and register a new friend based on the candidate friend presented by the received notification.

The terminal having received the notification accepts an input instruction to specify a user to be registered as a friend, from among other users presented as candidate friends. Then, the terminal registers one of the other users who is specified by the subject user as a friend. Note that the friend list with which the user is registered as a friend may be the basic friend list or the app friend list, or the friend list with which the user is registered as a friend may be specified by the subject user. In other embodiments, the management server 31 may register, as a friend, one of the other users who is selected by the selection process described above, automatically (in other words, irrespective of the presence/absence of an instruction from the subject user).

According to the description above, the subject user can register, as friends, other users who are registered in the contact list and/or other network services. Thus, it is possible to simplify the friend registration operation by the subject user.

The determination process of whether or not to change the basic friend list (step S112) may be performed on the server side (e.g., the management server 31). Then, when there is a change to the app friend list on one of the smartphone 3 and the game device 4, that terminal transmits, to the management server 31, information of a notification indicating that there is a change. Similar to the information of the change request described above, the information of the notification includes content-of-change information representing the content of change, the first-party account ID, and the app ID representing the changed app friend list (when the app friend list has been changed). When this information is received, the management server 31 determines whether or not to change the basic friend list based on the received information, and changes the basic friend list in accordance with the determination result. Note that the condition for changing the basic friend list may be similar to the process of step S112. When the basic friend list is changed, the management server 31 transmits, to the other terminal, the information of the change notification described above.

Moreover, the management server 31 may execute a determination process of whether or not to change the app friend list (step S113). That is, the management server 31 changes the app friend list in response to the change to the basic friend list by a method similar to step S113. The app friend list changed may be both or one of the app friend list of the smartphone app and the app friend list of the game device app. When the app friend list of the smartphone app is updated, the management server 31 transmits the information of the change notification to the smartphone 3. When the app friend list of the game device app is updated, the management server 31 transmits the information of the change notification to the game device 4.

The management server 31 may determine whether or not to change a friend list based on the user-related information described above. For example, when adding a friend to a basic friend list relating to a certain user (in other words, a certain first-party account), the management server 31 may make the determination above based on the region of the certain user (i.e., the region or country in which the user lives) and the region of the friend to be added. Specifically, when the two users are from the same region, the management server 31 may determine to add the friend, and when the two users are from different regions, the management server 31 may determine not to add the friend. For example, the management server 31 may determine whether or not to change the app friend list in response to the change to the basic friend list based on the information of the history of use of applications included in the user-related information. For example, the management server 31 may determine the frequency with which applications are used based on the information of the history of use, and may make a change to the app friend list of an application that is used with a high frequency.

(Functions/Effects of the Process)

As described above, in the present embodiment, information processing system includes a first information processing device having a platform of a first type (i.e., the smartphone 3) and a second information processing device having a platform of a second type different from the first type (i.e., the game device 4). The information processing system (specifically, the management server 31) stores a basic user list (i.e., the basic friend list) that is a user list representing information of other users registered while being associated with information of the subject user and that can be used by the smartphone 3 and the game device 4 (FIG. 22). The management server 31 changes the basic friend list in response to a list change notification (i.e., the change request) from the smartphone 3 ((4) shown in FIG. 22, step S115 shown in FIG. 24). Based on the basic friend list, the game device 4 sets the content of the app user list (i.e., the app friend list) used in a predetermined application executed on the game device 4 ((6) shown in FIG. 22, step S118 shown in FIG. 24).

With conventional information processing systems in which other users with whom the subject user performs communication, etc., on an application are registered as friends, there is a demand for improving the convenience with friends to be registered. For this, in the information processing system according to the embodiment described above, the basic friend list that can be used by the smartphone 3 and the game device 4 is provided separately from app friend lists. With the basic friend list, it is possible to share a friend list between different terminals, and to reflect a change to one friend list to the other friend list. For example, when a friend is newly registered on the smartphone 3, the friend is registered as a friend also on the game device 4. Thus, it is possible to improve the convenience with friends to be registered on different terminals.

According to the description above, by providing an app friend list separately from the basic friend list, it is possible to set a friend list based on the basic friend list for each application. For example, even if a friend is registered on one application, the user may not want to register the friend on another application. For this, according to the embodiment described above, it is possible to set a friend for each application, and it is therefore possible to improve the convenience with friends for different applications.

Note that in the embodiment described above, the basic friend list is stored in the management server 31 so that the basic friend list is synced between the smartphone 3 and the game device 4. Herein, in other embodiments, the basic friend list may be synced between the smartphone 3 and the game device 4 without storing the basic friend list on the server side. That is, when there is a change to the basic friend list on one of the smartphone 3 and the game device 4, the one terminal transmits the information of the change request to the other terminal. Note that the information of the change request may be transmitted from the first terminal to the second terminal via a server. The second terminal having received the information of the change request changes the basic friend list stored in the second terminal based on the information of the change request. Thus, in other embodiments, the information processing system may manage the basic friend list in such a manner that the basic friend list is not stored on the server side.

In the present embodiment, the app friend list on the game device 4 is changed in accordance with the basic friend list on the smartphone 3, and the app friend list on the smartphone 3 is changed in accordance with the basic friend list on the game device 4. That is, the management server 31 changes the basic friend list in response to a list change notification from the game device 4 (in addition to changing the basic friend list in response to a list change notification from the smartphone 3). Then, based on the basic friend list, the smartphone 3 sets the content of the app user list used in a predetermined application executed on the smartphone 3.

According to the description above, app friend lists both on the smartphone 3 and on the game device 4 are set based on the basic friend list.

In the present embodiment, the information processing system can be said to include a first information processing device (i.e., the smartphone 3) that is a smart device having a communication function via a mobile telephone network, and a second information processing device (i.e., the game device 4) that is a game device that includes a direction instruction section for performing game operations and that is capable of executing game applications. Herein, the information processing system (specifically, the management server 31) stores a basic user list (i.e., the basic friend list) that is a user list representing information of other users registered while being associated with information of the subject user and that can be used on the smartphone 3 and the game device 4 (FIG. 22). The management server 31 changes the basic friend list in response to a list change notification from the smartphone 3 and/or the game device 4 (i.e., the change request described above) ((4) shown in FIG. 22, step S115 shown in FIG. 24).

According to the description above, in the information processing system, the basic friend list that can be used by the smartphone 3 and the game device 4 is provided, and it is therefore possible to share friend lists between different types of terminals and to reflect a change made to one friend list to another friend list, as described above. Thus, it is possible to improve the convenience with friends registered on terminals.

In the present embodiment, the information processing system can be said to include a first information processing device having a platform of a first type (i.e., the smartphone 3) and a second information processing device having a platform of a second type different from the first type (the game device 4). The information processing system includes a basic user list (i.e., the basic friend list) that is a user list representing information of other users registered while being associated with information of the subject user and that can be used on the smartphone 3 and the game device 4 (FIG. 22). When a new user (i.e., a friend) is added to an app user list (i.e., the app friend list) that is used in a predetermined application executed on the smartphone 3 and/or the game device 4, the information processing system obtains information relating to the new friend (the obtaining method information in the present embodiment), and determines whether or not a predetermined condition relating to the method for obtaining information relating to the new friend is satisfied (step S112 shown in FIG. 24, FIG. 25). When it is determined that the predetermined condition is satisfied, information of the new friend is added to the basic friend list (step S124).

According to the description above, in the information processing system, the basic friend list that can be used by the smartphone 3 and the game device 4 is provided, and it is therefore possible to share friend lists between different types of terminals and to reflect a change made to one friend list to another friend list, as described above. Thus, it is possible to improve the convenience with friends registered on terminals. According to the description above, when a new friend is added to the app friend list, the addition of the friend is reflected also to the basic friend list depending on the predetermined condition relating to the method for obtaining information relating to the friend. Therefore, it is possible to manage the basic friend list so that the content thereof is appropriate depending on the information obtaining method.

In the present embodiment, information of a new user is added to the basic friend list when a predetermined condition is satisfied, wherein the predetermined condition is that the method for obtaining information relating to the new friend is a predetermined method such that it can be assumed that the new friend can be trusted.

According to the description above, when it is assumed that the new friend can be trusted, the new friend is reflected to the basic friend list. Therefore, it is possible to reduce the possibility that a friend who has been registered in some app friend lists and who may possibly be not trustworthy is reflected to the basic friend list.

Note that one possible specific example of the predetermined condition is a condition that "the method for obtaining information relating to the new friend is a predetermined method such that it can be assumed that the subject user knows this new user".

More specifically, the predetermined condition may include at least one of the following conditions:

A condition relating to the communication method used when obtaining information relating to the new user (e.g., whether it is short-range communication or communication via a wide area network).

A condition relating to the position of the smartphone 3 and/or the game device 4 and the position of the device of the communication partner (e.g., whether or not their positions are included within a predetermined distance) when obtaining information relating to the new user.

A condition relating to another user list from which information relating to the new user is obtained (e.g., whether or not the other user list is a contact list stored on the smartphone 3 or a user list on a network service on which users are registered under their real names).

Using the conditions described above, it is possible to easily determine whether or not the new friend can be trusted.

In the present embodiment, the basic user list includes a shared user list that is used commonly for the smartphone 3 and the game device 4 (the basic friend list shown in FIG. 22 in the present embodiment). Then, basic friend lists of the same content can be used by the smartphone 3 and the game device 4.

Note that in other embodiments, the basic friend list used by the smartphone 3 and the basic friend list used by the game device 4 do not need to be synced with each other so that the content thereof match each other, and a change to one basic friend list may be reflected to the other basic friend list under a certain condition. For example, the basic friend list may include a first partial list used by the smartphone 3 and a second partial list used by the game device 4. Then, the first partial list is changed in response to satisfaction of a predetermined condition (e.g., the app friend list has been changed) on the smartphone 3, and the second partial list is changed in response to satisfaction of a predetermined condition on the game device 4. Then, when one of the first partial list and the second partial list is changed, the content of change is reflected to the other partial list under a predetermined condition (it may be reflected unconditionally in other embodiments). Note that the predetermined condition may be a condition similar to that used when the change to the app friend list is reflected to the basic friend list in the embodiment described above (i.e., the condition used in the determination process of steps S121 to S123).

According to the description above, the basic friend list used by the smartphone 3 and the basic friend list used by the game device 4 can be managed separately and they may be managed so that their content differ from each other.

In the present embodiment, the information processing system includes the first-party service server 1 (more specifically, the management server 31) that can communicate with the smartphone 3 and can communicate with the game device 4. The management server 31 stores the basic friend list in association with identification information (i.e., the first-party account ID) (FIG. 23). The smartphone 3 transmits the first-party account ID to the management server 31 (step S114). The management server 31 changes the basic friend list associated with the first-party account ID received from the smartphone 3 in response to the list change notification from the smartphone 3 (step S115).

According to the description above, by using the identification information, the basic friend list can be managed on the management server 31 for each identification information (in other words, for each first-party account).

In the present embodiment, each terminal registers a friend by exchanging identification information (in other words, the account information; specifically, the first-party account ID) with another terminal. That is, when the smartphone 3 (this similarly applies to the game device 4) obtains the first-party account ID of another user different from the user of this smartphone 3 from another smartphone 3 different from this smartphone 3, the basic friend list is changed based on the obtained identification information under a predetermined condition (the method (b) above).

According to the description above, friend registration can be done easily by exchanging account information.

In the present embodiment, when an app user list (the app friend list in the present embodiment) that is used by a predetermined application executed on the smartphone 3 (this similarly applies to the game device 4), the smartphone 3 transmits a list change notification under a predetermined condition (step S114).

According to the description above, a change to the app friend list can be reflected to the basic friend list.

In the present embodiment, when a the smartphone 3 (this similarly applies to the game device 4) transmits a list change notification when a change operation is performed for adding information of a new friend to the basic friend list on the smartphone 3.

According to the description above, the content of the basic friend list can be changed directly (in other words, as opposed to changing the basic friend list in response to a change to the app friend list) by the user.

In the present embodiment, friend registrations on the smartphone 3, which is a smart device that is assumed to be always carried by the user, are reflected to the friends of the app friend list on the game device 4. Therefore, even when the user does not carry the game device 4, it is possible to increase friends on the game device 4 by increasing friends on the smartphone 3. Thus, the user can register more friends.

The information processing system of the present embodiment stores a first basic user list (i.e., the basic friend list stored on the smartphone 3 or the basic friend list stored on the management server 31) that can be used on the smartphone 3 and that is a user list indicating information of other users who are registered while being associated with information of the subject user. The information processing system stores a second basic user list (i.e., the basic friend list stored on the game device 4 or the basic friend list stored on the management server 31) that can be used on the game device 4 and that is a user list indicating information of other users who are registered while being associated with information of the subject user. When there is a change to the first basic user list, the information processing system changes the second basic user list in response to the change (step S115 or step S117 shown in FIG. 24).

According to the description above, with the information processing system, since a user list that can be used by the smartphone 3 and the game device 4 is provided, it is possible to share the user list between different types of terminals, or a change to one user list can be reflected to the other user list. Thus, it is possible to improve the convenience with friends registered on terminals.

In other embodiments, when a new user is added to the first basic user list (which can be said to be the first partial list), the information processing system may obtain information relating to the new user (e.g., the obtaining method information) and determine whether or not a predetermined condition relating to the method for obtaining the information relating to the new user is satisfied. When it is determined that the predetermined condition is satisfied, the information processing system may add information of the new user to the second basic user list (which can be said to be the second partial list). Note that the predetermined condition may be a condition similar to that used when the change to the app friend list is reflected to the basic friend list in the embodiment described above (i.e., the condition used in the determination process of steps S121 to S123).

According to the description above, when a new user is added to one basic user list, the addition of the friend is reflected also to the other basic friend list based on a predetermined condition relating to the method for obtaining information relating to the subject user. Therefore, it is possible to manage the basic friend lists so as to have content appropriate for the information obtaining method.

The information processing system of the present embodiment is an information processing system storing a user list (i.e., a friend list) representing information of other users who are registered while being associated with information of the subject user. The information processing system (e.g., the smartphone 3 or the game device 4) stores a first user list (specifically, the app friend list) and a second user list (specifically, the basic friend list). When the condition for adding information of a new user is satisfied (e.g., when the friend has been registered in the app friend list), the information processing system classifies the information of the new user as being either information that should be added at least to the app friend list or information that should be added at least to the basic friend list (steps S112 and S113).

According to the description above, it is possible to classify a new friend and register the new friend to a plurality of friend lists.

[4. Specific Examples of Processes on Various Devices]

Next, specific examples of processes on various devices (i.e., various servers and various terminals) included in the information processing system of the present embodiment will be described. Hereinbelow, specific examples of processes on various devices when the processes of (3-1) to (3-7) above are executed.

(4-1) Process Performed on Smartphone 3

Figure 26:
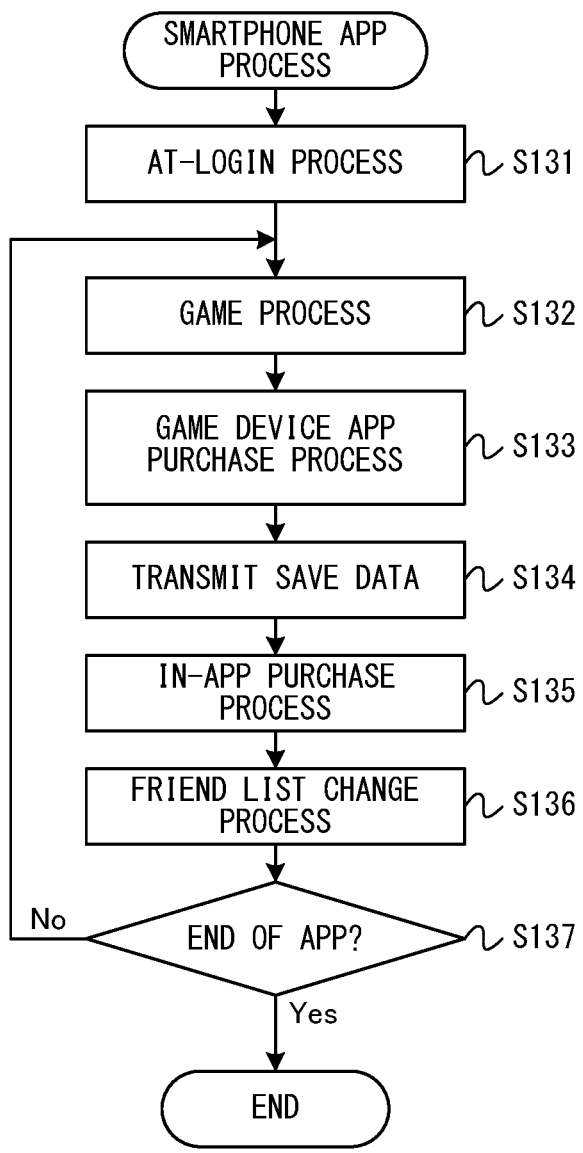
FIG. 26 is a flow chart showing an exemplary flow of a process on a smartphone when a non-limiting smartphone app is executed.

First, a specific example of a process on the smartphone 3 of the present embodiment will be described. FIG. 26 is a flow chart showing an exemplary flow of a process on the smartphone 3 when a smartphone app is executed. The series of processes shown in FIG. 26 is started in response to the start of the smartphone app on the smartphone 3. Although the processing section 13 (specifically, the CPU) of the smartphone 3 executes the smartphone app, thereby executing the processes of the steps shown in FIG. 26, in the present embodiment, the processes of some of the steps of the flow chart may be executed by a processor other than the CPU or a dedicated circuit.

First, in step S131, the processing section 13 executes the process of steps S12 and S16 described above as an at-login process. By the at-login process, data that is needed to start the process (herein, the game process) of the smartphone app is obtained, and the process is started. Following step S131, the process of step S132 is executed. The series of processes of steps S132 to S138 is executed repeatedly until the smartphone app is ended.

In step S132, the processing section 13 executes the game process of step S17 described above. Note that the content of the game process is different for each smartphone app. The game proceeds as the game process is executed repeatedly. After the process of step S132, the process of steps S133 to S137 is executed when a condition is satisfied. Note that the process of steps S133 to S137 may be executed when the condition for executing these processes is satisfied, and does not need to be executed for each iteration of the process loop of steps S132 to S137.

In step S133, the processing section 13 executes a game device app purchase process. The game device app purchase process is a process of displaying an advertisement of a game device app, and purchasing the game device app in response to an instruction from the user. Specifically, the process of steps S54, S55, S57, S58 and S61 is executed as necessary as the game device app purchase process. That is, the processing section 13 displays an advertisement relating to a game device app in response to satisfaction of a condition for displaying an advertisement image (step S54). Then, when an operation of obtaining a purchase webpage is performed by the user, the processing section 13 transmits information of a request to obtain a purchase webpage to the game device app providing server 32 (step S55), and displays the purchase webpage on the display section 15 (step S57). Moreover, when a purchase operation is performed by the user, the information of the purchase request to purchase the game device app is transmitted to the game device app providing server 32 (step S58), and the process of the smartphone app is resumed in response to a notification from the game device app providing server 32 (step S61).

In step S134, the processing section 13 executes a save data transmitting process. Specifically, when the condition for transmitting save data is satisfied, the processing section 13 executes the process of step S73 described above, i.e., the process of transmitting game data to the game server 34.

In step S135, the processing section 13 executes an in-app purchase process. The in-app purchase process is a process for purchasing game data, etc., within a smartphone app. Specifically, as the in-app purchase process, the process of step S103 is executed as necessary. That is, when a game data purchase instruction is given by the user, the processing section 13 transmits the information of the purchase request to the smartphone app providing server 2 and then receives game data transmitted from the game server 34 in response to the purchase.

In step S136, the processing section 13 executes the friend list change process. The friend list change process is a process of changing the basic friend list and/or the app friend list. Specifically, as the friend list change process, the process of steps S111 to S114 described above is executed as necessary. That is, when an operation of changing friends is performed by the user, the processing section 13 changes friends in the app friend list of the smartphone app being executed. Moreover, the processing section 13 reflects a change to the app friend list to the basic friend list under a certain condition, and reflects a change to the basic friend list to another app friend list under a certain condition.

In step S137, the processing section 13 determines whether or not to end the smartphone app being executed. For example, the processing section 13 determines whether or not there is a user instruction to end the smartphone app. When the determination result of step S137 is negative, the process of step S132 is executed again. In such a case, in step S137, the series of processes of steps S132 to S137 is executed repeatedly until it is determined to end the smartphone app. On the other hand, when the determination result of step S137 is affirmative, the processing section 13 ends the process shown in FIG. 26.

Note that other than the process shown in FIG. 26, separate from the process performed by the smartphone app, the processing section 13 executes the process for setting the first-party account (steps S1 and S4 described above), the process (step S91 described above) for obtaining (e.g., purchasing) data relating to a smartphone app from the smartphone app providing server 2, the process for receiving various information from the first-party service server 1 (e.g., the process of receiving a notification relating to a bonus, and the process of receiving information of the change notification relating to the basic friend list), etc.

(4-2) Process Performed on Game Device 4

Figure 27:
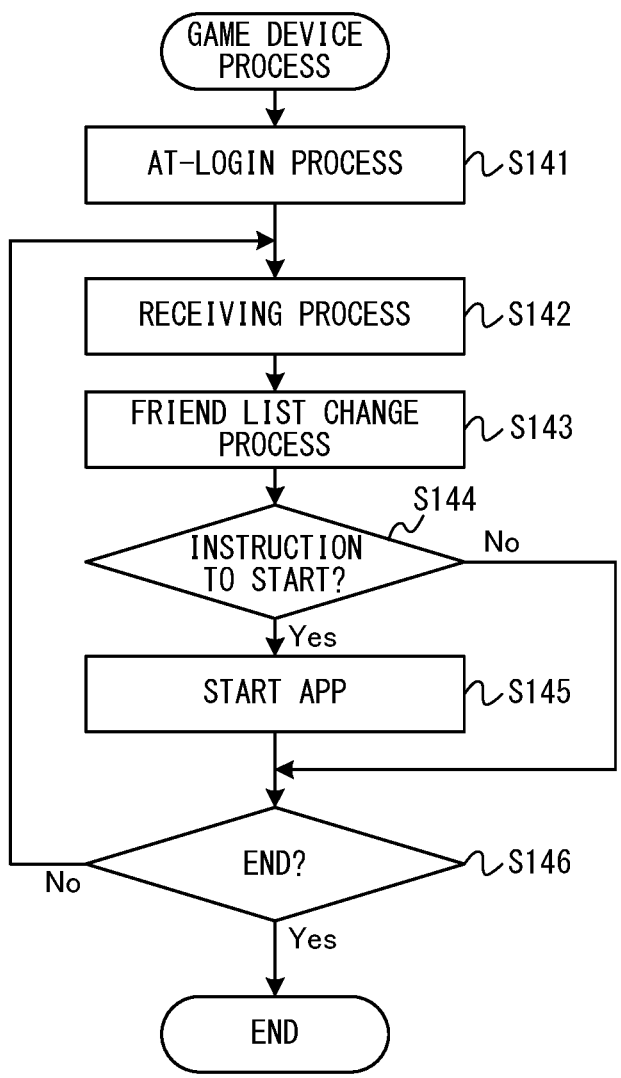
FIG. 27 is a flow chart showing an exemplary flow of a process on a non-limiting game device.

Next, specific examples of processes on the game device 4 in the present embodiment will be described. FIG. 27 is a flow chart showing an exemplary flow of a process on the game device 4. The series of processes shown in FIG. 27 is started in response to the game device 4 being started (specifically, when it is switched on or when it resumes from sleep). Although the processing section 24 (specifically, the CPU) of the game device 4 is assumed to execute the processes of the steps shown in FIG. 27 in the present embodiment, the processes of some of the steps in the flow chart may be executed by a processor other than the CPU or a dedicated circuit. Note that in the present embodiment, the series of processes shown in FIG. 27 is executed by the CPU executing the OS stored in the storage section 14 of the game device 4, for example.

First, in step S141, the processing section 24 executes the process of step S31 described above as the at-login process. Following step S141, the process of step S142 is executed. The series of processes of steps S142 to S146 is executed repeatedly until the process on the game device 4 is ended (i.e., until the determination result of step S146 is affirmative).

In step S142, the processing section 24 executes the receiving process. Herein, in the present embodiment, various information are transmitted by push transmission from the first-party service server 1 to the game device 4. For example, the game device app providing server 32 transmits, to the game device 4, data of the game device app described in "(3-4) Process of purchasing game device app using smartphone" above. The management server 31 also transmits, to the game device 4, a notification relating to a bonus described in "(3-6) Process of managing points on first-party service server 1 in accordance with use of services provided by smartphone apps" above, and transmits, to the game device 4, a change notification relating to the basic friend list described in "(3-7) Process of sharing friend list between smartphone and game device" above. In the receiving process, the processing section 24 receives these information (also called data) from the first-party service server 1.

Specifically, the processing section 24 transmits a request to obtain information to the first-party service server 1 (e.g., the management server 31 and/or the game device app providing server 32). Then, the processing section 24 receives various information transmitted from the first-party service server 1 in response to this request. Note that in the present embodiment, the receiving process is executed irrespective of the presence/absence of a user instruction (in other words, automatically).

In step S143, the processing section 24 executes the friend list change process. The friend list change process is a process of changing the basic friend list and/or the app friend list. Specifically, as the friend list change process, the process of steps S117 to S118 described above is executed as necessary. That is, when the information of the change notification is received from the management server 31 in the process of step S142, the processing section 24 updates the basic friend list based on the information of the change notification (step S117). Moreover, the processing section 24 reflects the change to the basic friend list to the app friend list under a certain condition (step S118).

In step S144, the processing section 24 determines whether or not there is an instruction to start a game device app. Specifically, the processing section 24 displays a menu screen for executing game device apps on the display section 28, and accepts an input specifying an icon representing a game device app included in the menu screen. When an icon is specified, the processing section 24 determines that there is an instruction to start the specified icon. When the determination result of step S144 is affirmative, the process of step S145 is executed. On the other hand, when the determination result of step S144 is negative, the process of step S146 to be described below is executed.

In step S145, the processing section 24 starts a game device app that has been instructed by the user to be started in step S144. Then, the processing section 24 transmits information of the app start notification to the management server 31 (step S33). The process of step S145 starts the execution of the process (herein, the game process) whose content is in accordance with the game device app.

While the game device app is being executed, the processing section 24 communicates with the first-party service server 1 as necessary. For example, the processing section 24 obtains a save file from the save data server 33 and transmits save data to the save data server 33. When there is a change to the app friend list on the game device app being executed, the processing section 24 reflects the change to the app friend list to the basic friend list under a certain condition, and reflects the change to the basic friend list to another app friend list under a certain condition. Moreover, when there is a change to a friend list, the processing section 24 transmits information of the change request to the management server 31.

The game device app started in step S145 is ended in response to a user instruction to end the game device app, for example. Then, the processing section 24 transmits information of the end notification to the management server 31 (step S38). When the execution of the game device app is ended, the process of step S146 is executed.

In step S146, the processing section 24 determines whether or not to end the operation of the game device 4. For example, when the operation of switching the game device 4 off is performed or when the operation of putting the game device 4 on the sleep mode is performed, the processing section 24 determine that the operation of the game device 4 is to be ended. When the determination result of step S146 is negative, the process of step S142 is executed again. In this case, the series of processes of steps S142 to S146 is executed repeatedly until it is determined in step S146 that the operation of the game device 4 is to be ended. On the other hand, when the determination result of step S146 is affirmative, the processing section 24 ends the process shown in FIG. 27.

Note that other than the process shown in FIG. 27, the processing section 24 executes the process for setting the first-party account (steps S1, S4 and S6 described above), the process for obtaining (e.g., purchasing) data relating to a game device app from the game device app providing server 32, etc. These processes are executed in response to an instruction from the user.

(4-3) Process Performed on Management Server 31

Figure 28:
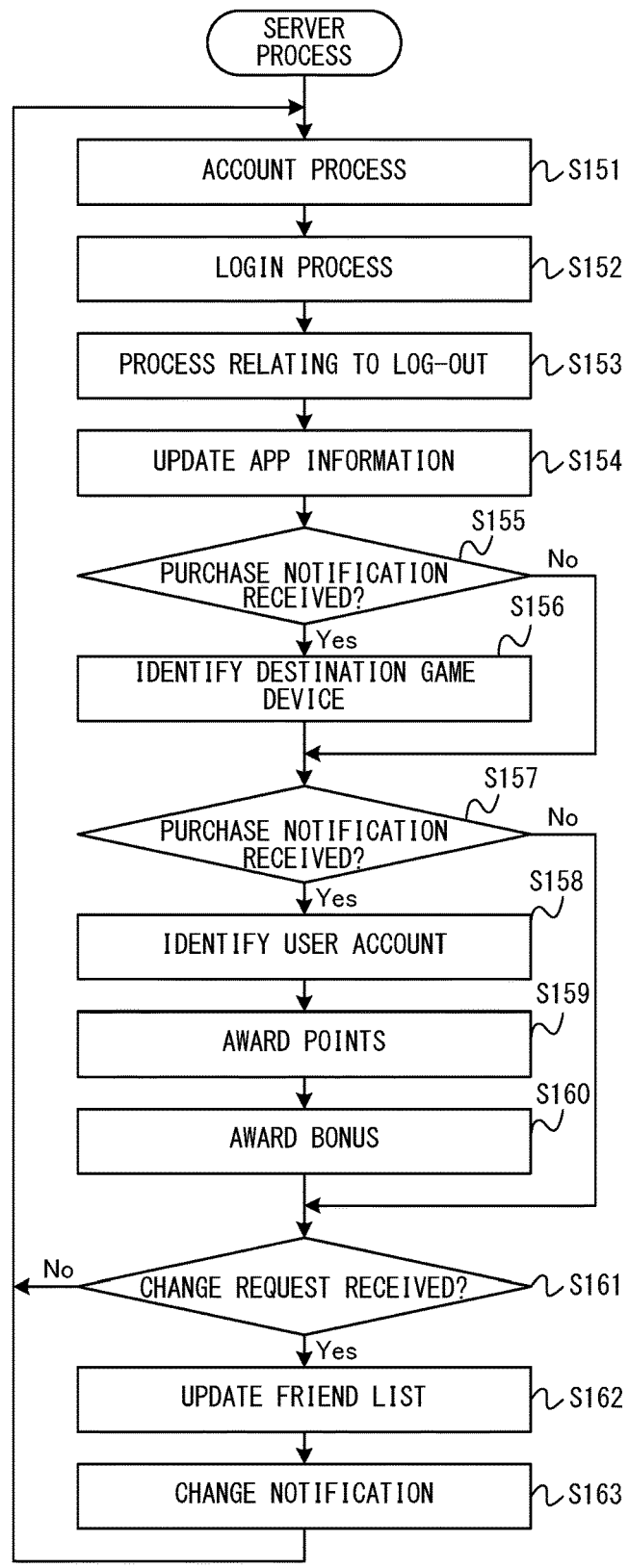
FIG. 28 is a flow chart showing an exemplary flow of a process on a non-limiting management server.

Next, specific examples of processes on the management server 31 of the present embodiment will be described. FIG. 28 is a flow chart showing an exemplary flow of a process on the management server 31. The series of processes shown in FIG. 28 is executed continuously while the management server 31 is in operation. Although it is assumed that the processes of the steps shown in FIG. 28 are executed by the processing section (specifically, the CPU) of the management server 31 in the present embodiment, the processes of some of the steps in the flow chart may be executed by a processor other than the CPU or a dedicated circuit. Note that in the present embodiment, the series of processes shown in FIG. 28 is executed by the CPU executing a predetermined program stored in the storage section of the management server 31, for example.

First, in step S151, the processing section executes an account process. The account process is a process of setting a first-party account in response to a request from the terminal. That is, when a request to set an account is received from the terminal, the processing section executes the process for setting the first-party account (steps S2, S3 and S5). When a registration request to register the terminal with the first-party account is received from the terminal, the processing section executes the process of registering the terminal with the first-party account (step S7).

In step S152, the processing section executes a login process shown in steps S14 and S32, etc., described above. That is, when the information of the login check request is received from the game server 34 in response to a login request from the smartphone 3, or when the information of the login request is received from the game device 4, the processing section executes a login process.

In step S153, the processing section executes the process relating to the logout shown in steps S21, S41 and S42, etc., described above. That is, when the information of the log-out notification is received from the game server 34, the processing section executes the log-out process of step S21. When a check is performed as to whether or not the game device 4 has been logged out and it is determined in the process of step S41 that the game device 4 has logged out, the processing section executes the log-out process of step S42.

In step S154, the processing section executes an update process of updating app execution information shown in steps S34 and S39, etc., described above. That is, when the information of the app start notification or the information of the end notification is received from the game device 4, the processing section updates the app execution information stored in the processing section based on the received information (steps S34 and S39).

Note that the process of steps S151 to S154 is only required to be executed when a condition for executing these processes is satisfied, and does not need to be executed for each iteration of the process loop of steps S151 to S163.

In step S155, the processing section determines whether or not the information of the purchase notification has been received from the game device app providing server 32. When the information of the purchase notification has been received, the process of step S156 is executed. On the other hand, when the information of the purchase notification has not been received, the process of step S157 to be described below is executed, skipping the process of step S156.

In step S156, the processing section executes the process of identifying the destination game device of the purchased game device app (step S60). That is, the processing section identifies the destination game device, and transmits information representing the identified game device to the game device app providing server 32.

In step S157, the processing section determines whether or not purchase information representing a purchase relating to a smartphone app has been received from the smartphone app providing server 2 or the game server 34. When the purchase information has been received, the process of steps S158 to S160 is executed. On the other hand, when the purchase information has not been received, the process of step S161 to be described below is executed, skipping the process of steps S158 to S160.

In step S158, the processing section identifies the first-party account corresponding to the third-party account with which the purchase relating to the smartphone app has been made (step S95 or S108). In step S159, the processing section awards points to the identified first-party account (step S96 or S109). Moreover, in step S160, when the points that have been awarded satisfy the award condition described above, the processing section executes the process of awarding a bonus to the user of the first-party account ((5) shown in FIG. 18).

In step S161, the processing section determines whether or not the information of the change request for changing the friend list has been received from the terminal. When the information of the change request has been received, the process of steps S162 and S163 is executed. On the other hand, when the information of the change request has not been received, the process of step S151 is executed again, skipping the process of steps S162 and S163.

In step S162, the processing section updates the friend list stored in the storage section based on the received information of the change request (step S115). Moreover, in step S163, when the basic friend list stored in the storage section is updated, the processing section transmits the information of the change notification to the terminal (step S116). Herein, the other terminal refers to one of the smartphone 3 and the game device 4 that is not the terminal that has transmitted the information of the change request.

After step S162, the process of step S151 is executed again. The management server 31 repeatedly executes the series of processes of steps S151 to S162.

[5. Variations]

(Variation Relating to Exemplary Process Described Above)

The embodiment described above is directed to an example where the exemplary processes of (3-4) to (3-7) described above are executed on the information processing system. Herein, in other embodiments, the information processing system may execute only some of the exemplary processes of (3-4) to (3-7).

(Variation Relating to Smartphone App Providing Server)

In other embodiments, the information processing system may be configured to include a plurality of smartphone app providing servers. For example, the information processing system may be configured to include a first smartphone app providing server for providing a first app providing service (e.g., the service of "Google play (registered trademark)"), and a second smartphone app providing server for providing a second app providing service (e.g., the service of "APP STORE (registered trademark)"). Then, the management server 31 stores a first third-party account ID used to log in to the first app providing service and a second third-party account ID used to log in to the second app providing service while they are associated with the first-party account ID. Thus, third-party accounts for the two app providing services can each be associated with the first-party account.

(Variation Relating to First-Party Account)

In other embodiments, the account used by the smartphone 3 to log in to the first-party service and the account used by the game device 4 to log in to the first-party service may be separate from each other. That is, the smartphone 3 may log in to the first-party service using a smartphone first-party account ID, and the game device 4 may log in to the first-party service using a game device first-party account ID.

Then, the first-party service server 1 stores, in the storage section of the first-party service server 1, information in which the smartphone first-party account ID and the game device first-party account ID are associated with each other, instead of the first-party account ID of the embodiment described above. With this information, the first-party service server 1 can identify the correspondence between smartphones 3 and game devices 4 (in other words, a pair of a smartphone 3 and a game device 4 owned by the same user).

The information stored while being associated with the first-party account ID on the servers 31 to 34 is stored while being associated with the smartphone first-party account ID and the game device first-party account ID. Thus, the servers 31 to 34 can identify the correspondence between the terminal (the smartphone 3 or the game device 4) and information relating to the terminal.

(Variation in which First-Party Service is Shared Between a Plurality of Users)

In other embodiments, the first-party service server 1 may provide a first-party service that is shared between a plurality of users having different first-party accounts. That is, the first-party service server 1 may be capable of setting one group for a plurality of first-party accounts (in other words, users). Then, the user management information may be associated with a group ID that represents the group to which the first-party account represented by the user management information belongs. The group may be a household, for example, and the user can set the first-party accounts of a plurality of users of the same household so that the first-party accounts are included in one group. Then, (some of) the first-party services may be shared between users within the group. Specifically, payments for the accounts included in one group may be made collectively by a predetermined user in the group. The use of the content (e.g., applications, music, videos, etc.) provided by the first-party service may be permitted by the unit of groups. That is, when a certain user purchases content on a first-party service, other users included in the same group as the certain user may be allowed to use that content.

In the process of purchasing a game device app using a smartphone (see FIG. 10), the user who requests to purchase using the smartphone and the user who receives game device app of the purchase may be different users belonging to the same group. That is, when a purchase request is made from the smartphone in this process, the first-party service server 1 may transmit the game device app of the purchase to a game device corresponding to a first-party account belonging to the same group as the first-party account corresponding to the smartphone from which the purchase request is made.

In the process of sharing save data between a smartphone app and a game device app (see FIG. 15), save data for a predetermined application may be shared between a plurality of first-party accounts belonging to the same group.

In the process of managing points on the first-party service server 1 in response to the use of a service provided by a smartphone app (see FIG. 18), the awarded points may be shared between a plurality of first-party accounts belonging to the same group.

In the process of sharing a friend list between a smartphone and a game device (see FIG. 22), the basic friend list and/or an app friend list relating to a predetermined application may be shared between a plurality of first-party accounts belonging to the same group.

(Variation Relating to Processes on Server and Terminal)

In other embodiments, some of the processes executed on the server side (i.e., on the first-party service server 1 and/or the smartphone app providing server 2) in the embodiment described above may be executed on the terminal side (i.e., on the smartphone 3 and/or the game device 4). In other embodiments, some of the processes executed on the terminal side in the embodiment described above may be executed on the server side.

The embodiment described above is applicable to an information processing system for executing applications on a smartphone and a game device, with the aim of improving the convenience of applications used on the terminal and/or the playability of the applications.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A server comprising:
   a communication circuitry configured to communicate with a first information processing device having a platform of a first type and communicate with a second information processing device having a platform of a second type different from the platform of the first type;
   a memory configured to store at least shared game data, the shared game data representing game content that can be used in a first game application that is compatible with the first information processing device and not compatible with the second information processing device and that can be used in a second game application that is compatible with the second information processing device and not compatible with the first information processing device; and
   at least one computer system including at least one computer processor, wherein:
   the computer system is configured to:
      obtain game data generated by executing the first game application on the first information processing device and update the shared game data based on the obtained game data; and
      transmit at least a part of the shared game data updated based on the game data generated by executing the first game application to the second information processing device via the communication circuitry for being used by the second game application.

2. The server according to claim 1, wherein:
   the computer system obtains game data generated by executing the second game application on the second information processing device and updates the shared game data based on the obtained game data; and
   the computer system transmits at least a part of the shared game data updated based on the game data generated by executing the second game application to the first information processing device for being used by the first game application.

3. The server according to claim 2, wherein:
   the memory stores first application data including the shared game data and second application data including the shared game data; and
   the computer system transmits at least a part of the first application data to the first information processing device for being used by the first game application, and transmits at least a part of the second application data to the second information processing device for being used by the second game application.

4. The server according to claim 3, wherein:
   the first application data further includes first game data that can be used in the first game application; and
   the second application data further includes second game data that can be used in the second game application.

5. The server according to claim 4, wherein the computer system:
   obtains game data generated by executing the first game application on the first information processing device and updates the first application data based on the obtained game data and further updates the shared game data included in the second application data based on the obtained game data; and obtains game data generated by executing the second game application on the second information processing device and updates the second application data based on the obtained game data and further updates the shared game data included in the first application data based on the obtained game data.

6. The server according to claim 2, wherein:

the memory stores first game data that can be used in the first game application, second game data that can be used in the second game application, and the shared game data; and the computer system transmits the first game data and the shared game data to the first information processing device for being used by the first game application, and transmits the second game data and the shared game data to the second information processing device for being used by the second game application.

7. The server according to claim 6, wherein the computer system:

when game data generated by executing the first game application on the first information processing device is obtained, updates the first game data and the shared game data based on the obtained game data; and when game data generated by executing the second game application on the second information processing device is obtained, updates the first game data and the shared game data based on the obtained game data.

8. The server according to claim 1, wherein the computer system transmits at least a part of the shared game data to the second information processing device in response to a request given from the second information processing device after the shared game data is updated.

9. The server according to claim 1, wherein the server comprises:

a save data server configured to store the shared game data; and a game process server provided separately from the save data server and configured to be accessed when the first information processing device executes a game process of the first game application.

10. The server according to claim 1, wherein:

the first information processing device is a smart device; and the second information processing device is a game device.

11. The server according to claim 1, wherein the first game application is a simpler game application than the second game application.

12. The server according to claim 1, wherein:

the first game application is an application that requires a condition that the first information processing device is able to access the server at the time of starting the first game application on the first information processing device; and the second game application is an application that does not require a condition that the second information processing device is able to access the server at the time of starting the second game application on the second information processing device.

13. The server according to claim 1, wherein:

the memory stores information representing each pair of a first game application and a second game application that use shared game data of the same content; and the shared game data includes data that can be used commonly between each pair of game applications.

14. An information processing system comprising a first information processing device having a platform of a first type, a second information processing device having a platform of a second type different from the platform of the first type, and a server configured to communicate with the first information processing device and communicate with the second information processing device, wherein:

the server stores at least shared game data representing game content that can be used in a first game application that is compatible with the first information processing device and not compatible with the second information processing device and that can be used in a second game application that is compatible with the second information processing device and not compatible with the first information processing device; and the information processing system is configured to:

obtain game data generated by executing the first game application on the first information processing device and update the shared game data based on the obtained game data; and transmit at least a part of the shared game data updated based on the game data generated by executing the first game application to the second information processing device for being used by the second game application.

15. A non-transitory computer-readable storage medium storing an information processing program to be executed on a computer system of a server configured to communicate with a first information processing device having a platform of a first type and communicate with a second information processing device having a platform of a second type different from the platform of the first type, wherein:

the server stores at least shared game data representing game content that can be used in a first game application that is compatible with the first information processing device and not compatible with the second information processing device and that can be used in a second game application that is compatible with the second information processing device and not compatible with the first information processing device; and the information processing program causes the computer system to:

obtain game data generated by executing the first game application on the first information processing device and update the shared game data based on the obtained game data; and transmit at least a part of the shared game data updated based on the game data generated by executing the first game application to the second information processing device for being used by the second game application.

16. An information processing method to be executed on a server configured to communicate with a first information processing device having a platform of a first type and communicate with a second information processing device having a platform of a second type different from the platform of the first type, wherein:

the server stores at least shared game data representing game content that can be used in a first game application that is compatible with the first information processing device and not compatible with the second information processing device and that can be used in a second game application that is compatible with the second information processing device and not compatible with the first information processing device; and the server:
  obtains game data generated by executing the first game application on the first information processing device and updates the shared game data based on the obtained game data; and
  transmits at least a part of the shared game data updated based on the game data generated by executing the first game application to the second information processing device for being used by the second game application.

* * * * *